(12) United States Patent
Davis

(10) Patent No.: US 12,422,073 B1
(45) Date of Patent: Sep. 23, 2025

(54) QUICK-CONNECT COUPLER APPARATUS

(71) Applicant: Colburn D. Davis, Edmonds, WA (US)

(72) Inventor: Colburn D. Davis, Edmonds, WA (US)

( * ) Notice: Subject to any disclaimer, the term of this patent is extended or adjusted under 35 U.S.C. 154(b) by 0 days.

(21) Appl. No.: 18/679,430

(22) Filed: May 30, 2024

(51) Int. Cl.
*F16L 37/23* (2006.01)

(52) U.S. Cl.
CPC .................................. *F16L 37/23* (2013.01)

(58) Field of Classification Search
CPC .................................. F16L 37/23; F16L 37/22
See application file for complete search history.

(56) References Cited

U.S. PATENT DOCUMENTS 5,230,538 A * 7/1993 Kobayashi ............. F16L 37/23
285/321

\* cited by examiner

*Primary Examiner* — Aaron M Dunwoody
(74) *Attorney, Agent, or Firm* — LORUSSO & ASSOCIATES

(57) ABSTRACT

A quick-connect coupler having a radially-expandable retaining ring to eliminate the need for a compression spring to set a retraction sleeve in a resting locked position. A fluid delivery quick-connect coupler includes a male insertion member and a female retaining coupler formed with a series of corresponding apertures, chamfered surfaces and radially extending flanges to produce a mechanical interference fit to releasably lock the male insertion member to the female retaining coupler with a retraction sleeve superposed about the female retaining coupler. Non-fluid variants of the quick-connect coupler have a female retaining coupler with a male member retaining bore. Opposing ends of the quick-connect couplers are formed with a variety of attachment means such as threaded and barbed segments, and segments with eyelets.

20 Claims, 23 Drawing Sheets

QUICK-CONNECT COUPLER APPARATUS

CROSS-REFERENCE TO RELATED APPLICATIONS

None.

FIELD OF THE INVENTION

This disclosure relates generally to couplers for joining tubes or objects. More particularly, the disclosure relates to quick-connect couplers that simplify the connection and disconnection of tubes and other objects.

BACKGROUND OF THE DISCLOSURE

Quick-connect connectors are ubiquitous and are applied in multiple different applications from tube and hose connector applications to key-chain connectors. Many of these connectors can be found in big-box construction supply stores and are constructed from the same basic components and conform to a common structure. For couplers designed to handle fluid transmission, a cylindrical male insert is formed with a through-aperture and a radial flange, and is inserted into, and releasably secured to, a cylindrical female coupler defining a main aperture structured to receive the male insert and to provide fluid communication with the male insert through-aperture. For couplers that do not handle fluid transmission, the male insert may not have a through-aperture and the female coupler may have a bore instead of a main aperture.

The female coupler is formed commonly with a channel on its outer surface that has a series of ball-bearing seats in the form of apertures arranged in a circle within the channel. A single ball bearing in placed in each aperture. These apertures permit a portion of the ball bearings to extend through the apertures such that the ball bearings are partially in the female coupler main aperture. To maintain the ball bearings in the ball bearing seats, a retractable outer sleeve is positioned about the female coupler. A first portion of the retractable outer sleeve has an annular channel that when positioned over the ball bearings, allows the ball bearing to migrate radially outwardly away from the ball bearing seats. A second portion of the retractable sleeve has a cross-sectional diameter slightly larger than the cross-sectional diameter of the female coupler. This portion of the female coupler, when positioned over the ball bearings, urges the ball bearings into the ball-bearing seats such that the ball bearings extend into the female coupler main aperture.

The retractable sleeve is maintained commonly in a "closed" position with the use of a compression spring. The compression spring is positioned about the female coupler and within the retractable sleeve. Stop shoulders formed on the female coupler and on an inside edge of the retractable sleeve keep the spring in place. The compression spring is sized such that it is under constant compression so as to maintain the retraction sleeve in a closed position. In the closed position, the second portion of the retractable sleeve is over the ball bearings and urges them into the ball-bearing seats.

To insert the male insert into the female coupler, the retractable sleeve has to be retracted and held in an "open" position so the first portion of the retractable sleeve is over the ball bearings. By retracting and holding the outer sleeve, the spring is compressed and the annular channel formed in the sleeve shifts position over the ball bearings and permits the ball bearings to migrate radially outwardly, which thereby permits an increase of the functional diameter of the female port/main aperture when an internal force is applied to the ball bearings, such as insertion of the male insert. Once the male insert is fully seated in the female coupler, with the annular flange axially past the ball bearings, the retractable sleeve is released and allowed to return to its closed position. This urges the ball bearings into the ball-bearing seats. The portions of the ball bearings that extend into the main aperture, register against a trailing surface of the male insert flange and provide a locking means to prevent retraction and/or removal of the male insert from the female coupler. To remove the male insert, the retractable sleeve has to be retracted again to the open position to allow the male insert to be removed. One or more O-rings are used to create an air-tight and/or fluid-tight seal between the male insert and the female coupler when connected.

One of the significant problems with a common quick-connect coupler is the fatigue and eventual failure of the compression spring component. By design, the compression spring is set in an axial compression state with the retractable sleeve in a first, closed position. Thus, with the quick-connect coupler in its resting position, the spring is under constant compression. The compressive force is increased temporarily when the retractable sleeve is translated axially or laterally along the female coupler to the open position. With many cycles of opening and closing the retractable sleeve, the compression spring loses its resiliency and does not maintain the retractable sleeve in a full closed position. With a fluid load on the coupler, such as when the coupler is used with an air compressor, the resulting loose fitting of the retractable sleeve due to spring fatigue leads to air leaking from the coupler. Over time, the spring will lose enough resiliency such that the coupler will leak continually. This is a problem common to quick-connect couplers that use compression springs. Moreover, the use and need for a compression spring makes miniaturization of a quick-connect coupler more difficult. When a compression spring is used, miniaturization results in a much less robust coupler and one that is difficult to actuate.

What is needed is a quick coupler that eliminates the problems associated with incorporating a compression spring into a quick coupler. More particularly, what is needed is a simplified quick coupler that performs that same function as the described prior-art couplers without the problems associated with spring-biased retraction sleeves that require springs to be maintained in constant axial compression. Such an apparatus should be easy to assemble and require a minimum of time to assemble, be scalable for different applications, be lightweight, be easy to actuate, have a minimal number of parts, be low-cost, require little or no maintenance, be easily adaptable to multiple applications and be durable. Moreover, what is needed is a quick-connect coupler that uses a detented sleeve to effectuate locked and unlocked coupler conditions that facilitates miniaturization without compromising the strength of the coupler and without compromising ease of use. These and other objects of the disclosure will become apparent from a reading of the following summary and detailed description of the disclosure.

SUMMARY OF THE DISCLOSURE

In one aspect of the disclosure, a quick-connect coupler is formed with a two-position retraction sleeve along with a male insertion member and a female retaining coupler. The retraction sleeve is superposed about the female retaining coupler. The female retaining coupler defines a main coupler aperture that extends from a leading end of the coupler to a trailing end. The male insertion member defines a male aperture that extends from a leading end to a trailing end of the male insertion aperture. In one position, the retraction sleeve locks the male insertion member to the female retaining coupler. In a second position, the retraction sleeve permits the insertion or removal of the male insertion member into or from the female coupler, respectively.

The retraction sleeve is formed with an annular retaining-ring groove or slot extending radially outwardly from an inner surface of the retraction sleeve. An annular ball-bearing-receiving channel is formed on the inner surface of the retraction sleeve adjacent the retaining-ring groove/slot and is defined by a front shoulder and a back shoulder. A leading edge of the ball-bearing-receiving channel is formed with a taper or chamfer to provide a smooth transition from the annular ball-bearing-receiving channel to the primary inner surface of the retraction sleeve.

An annular coupler retaining-ring travel-limiting channel is formed on an outer annular surface of the female retaining coupler. A leading channel shoulder and a trailing channel shoulder define the travel-limiting channel. Formed about a bottom surface of the coupler retaining-ring travel-limiting channel are a plurality of ball-bearing seat through-bores spaced substantially equally about the channel. Each ball-bearing seat opens into the main coupler aperture. A portion of an inner wall of the female retaining coupler that defines the main coupler aperture has an annular radially extended seal-receiving groove for receiving an O-ring or similar sealing element. A leading end of the seal-receiving groove may be formed with a taper or chamfered surface for receiving a leading end of the male insertion member and to transition to an aperture formed by a leading end segment of the female retaining coupler.

The female retaining coupler further has a radially-extended male-member receiving channel adjacent a trailing end to receive the male insertion member. A leading edge of the male-member receiving channel may be tapered or chamfered to correspond to similarly shaped features of the male insertion member. A leading end segment of the female retaining coupler may be formed with one or more attachment elements such as barbs, threading or ring couplers (eyelets) as illustrative, non-limiting examples.

An annular spring-like internal retaining ring is positioned in the retaining-ring slot/groove of the retraction sleeve with an inner annular surface of the retaining ring registered against the bottom surface of the retaining-ring travel-limiting channel. The depth of the retaining-ring slot/groove is dimensioned to permit the retaining ring to expand radially outwardly from a resting position. Each ball-bearing seat has a ball bearing positioned on the seat such that a portion of the outer surface of each ball bearing extends through the seat and into the main coupler aperture.

The male insertion member has a first annular radially-extended retention flange that may include radiused leading and trailing edges. The retention flange is positioned proximal to a leading end of the male insertion member. An annular registration flange extends radially outwardly from an axially central region of the male insertion member to function as a primary stop surface that limits the insertion distance the male insertion member can be inserted into the female retaining coupler by registering against a corresponding surface inside the female retaining coupler. A leading end of the male insertion member may be formed with a chamfered tip to register against the corresponding chamfered surface of the seal-receiving channel leading end and to facilitate the formation of a seal engagement. A trailing end of the male insertion member may be formed with barbs, threading (external or internal) or ring couplers (eyelets) as illustrative, non-limiting examples.

In another aspect of the disclosure, a quick-connect coupler designed to connect two objects together is formed with a two-position retraction sleeve along with a solid male insertion member and a female retaining coupler. The retraction sleeve is superposed about the female retaining coupler. The female retaining coupler defines a main coupler partial bore that extends from a trailing end of the coupler partially into the body of the coupler. The solid male insertion member has features to releasably lock the male member to the female retaining coupler.

The retraction sleeve of this embodiment is the same as the retraction sleeve described for the prior embodiment including the retaining ring. The female retaining coupler has a retaining-ring travel-limiting channel extending radially inwardly from an outer surface of the coupler. Formed along the bottom surface of the retaining-ring travel-limiting channel are a plurality of ball-bearing seat through-bores dimensioned to receive the radiused surfaces of ball bearings such that a portion of the ball-bearing surfaces extend down into the partial bore. A leading channel shoulder and a trailing channel shoulder define the edges of the retaining-ring travel-limiting channel.

The male insertion member may have a rounded or chamfered leading edge. An annular male ball-bearing receiving channel extends radially inwardly from an outer surface of the male insertion member, proximal to, but set back from, the leading edge of the male insertion member. The male ball-bearing receiving channel may have a radiused leading shoulder that registers against ball-bearings positioned in the ball-bearing seats to releasably lock the male insertion member inside the female retaining coupler.

In a yet further aspect of the disclosure, the previously-described quick-connect coupler, described beginning in paragraph [009] above, may have a leading end of the female retaining coupler formed with an eyelet to permit attachment to additional components such as rings. The trailing end of the male insertion member also may be formed with an eyelet. These and other aspects of the disclosure will become apparent from a review of the appended drawings and a reading of the following detailed description of the disclosure.

DETAILED DESCRIPTION OF THE DISCLOSURE

Figure 1:
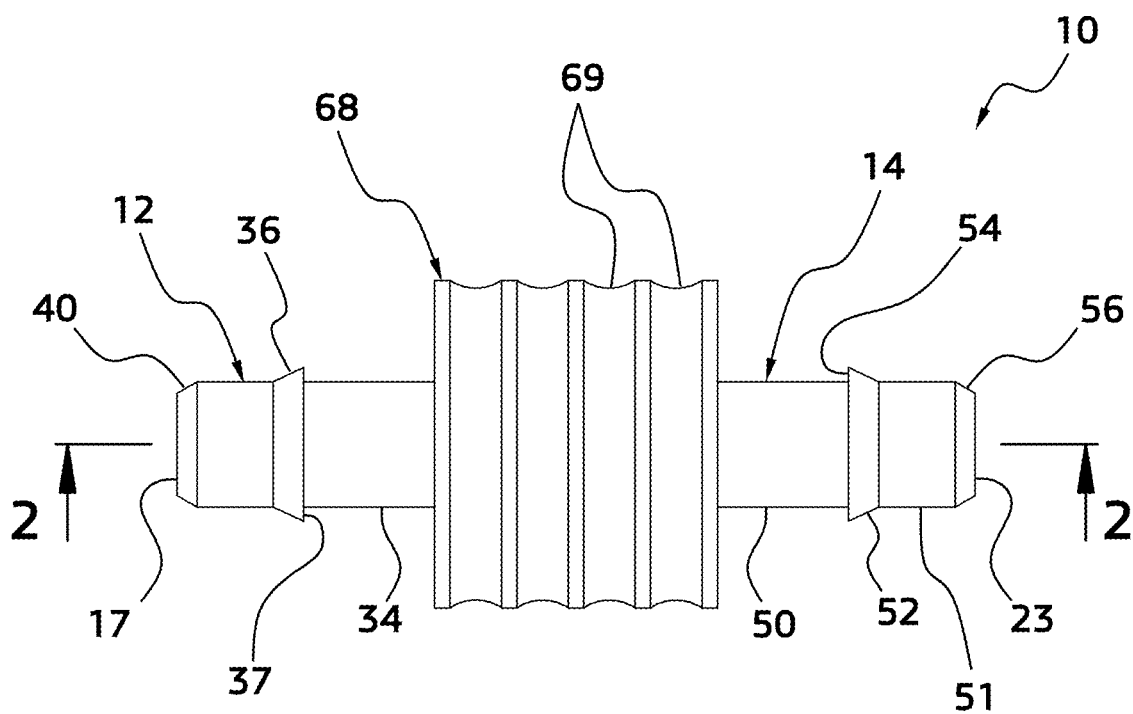
FIG. 1 is a side view of an assembled, locked quick connector according to one embodiment of the disclosure.
Figure 2:
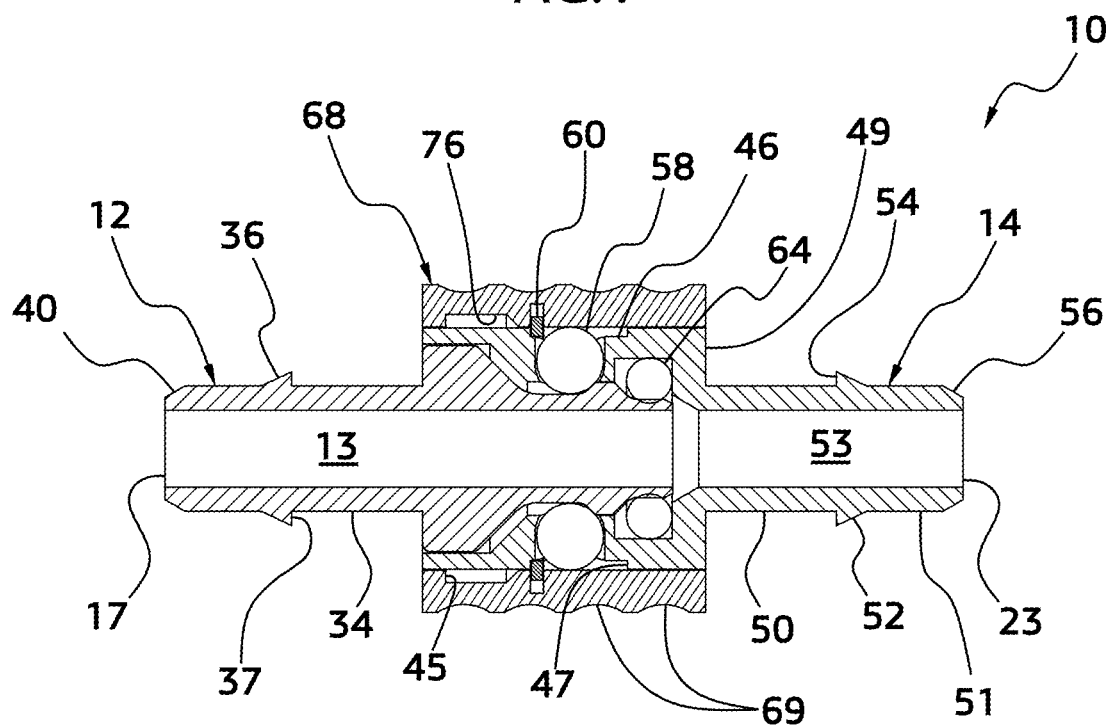
FIG. 2 is a side, sectional view of the quick connector shown in FIG. 1.
Figure 3:
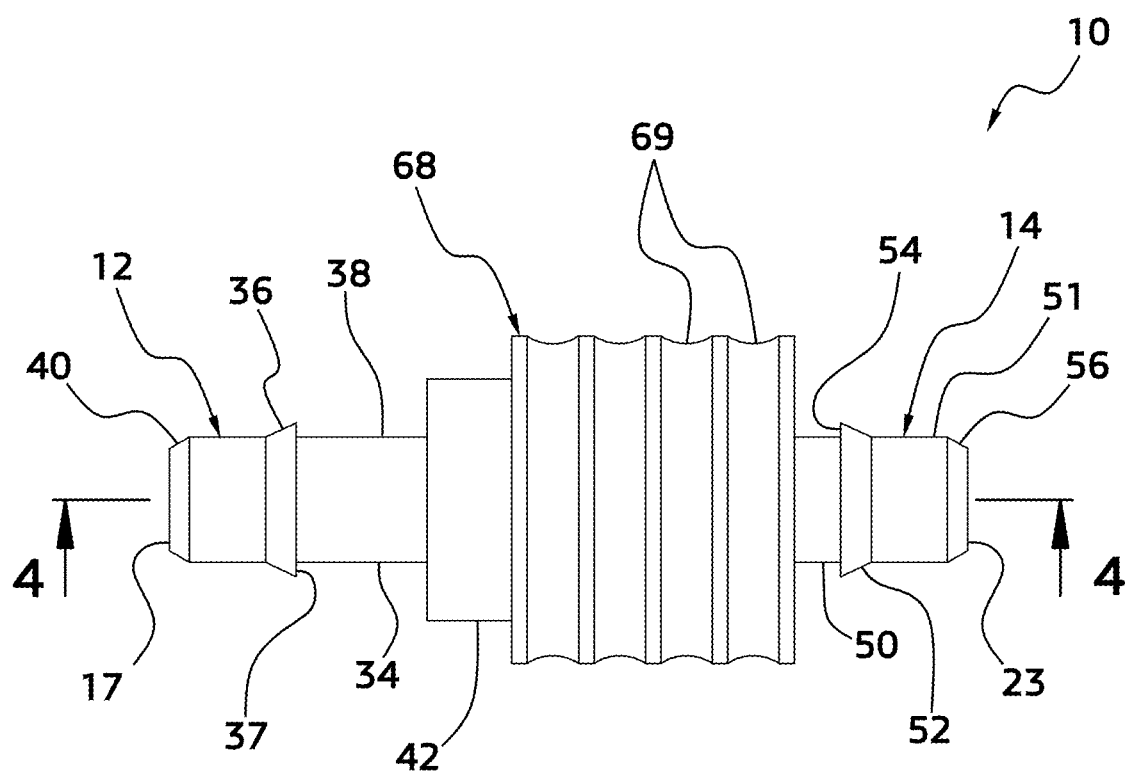
FIG. 3 is a side view of the quick connector shown in FIG. 1 in an unlocked condition.
Figure 4:
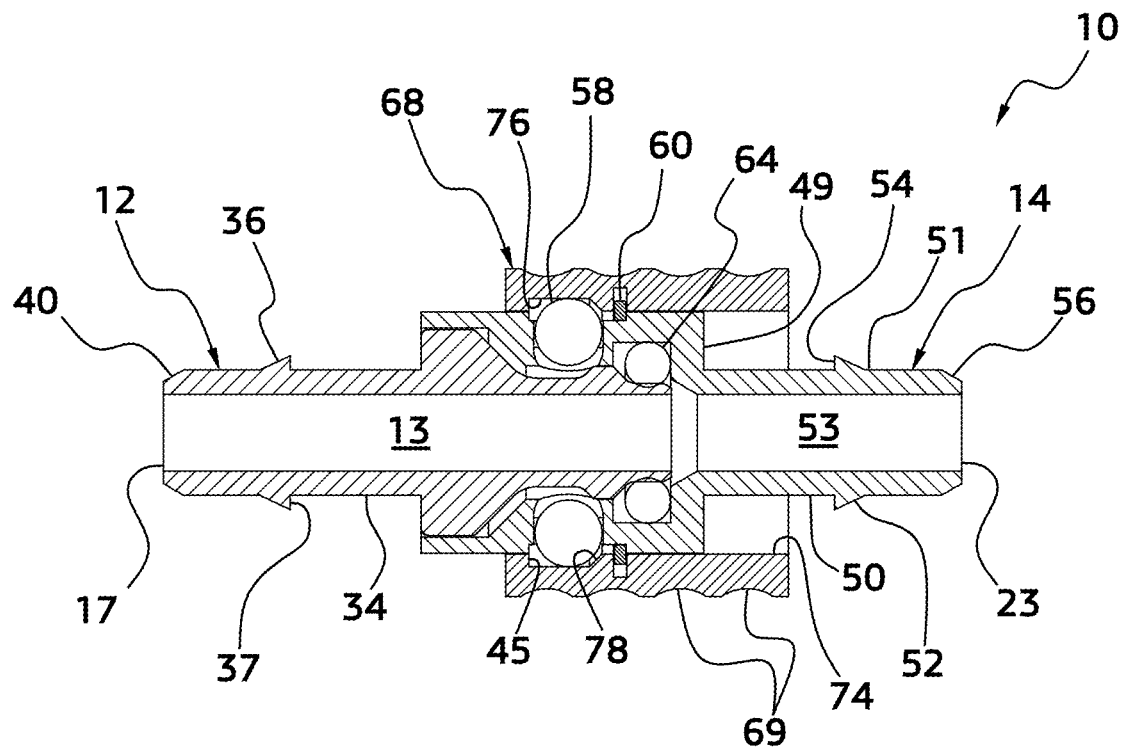
FIG. 4 is a side, sectional view of the quick connector shown in FIG. 1 in an unlocked condition.
Figures 5, 6, 7:
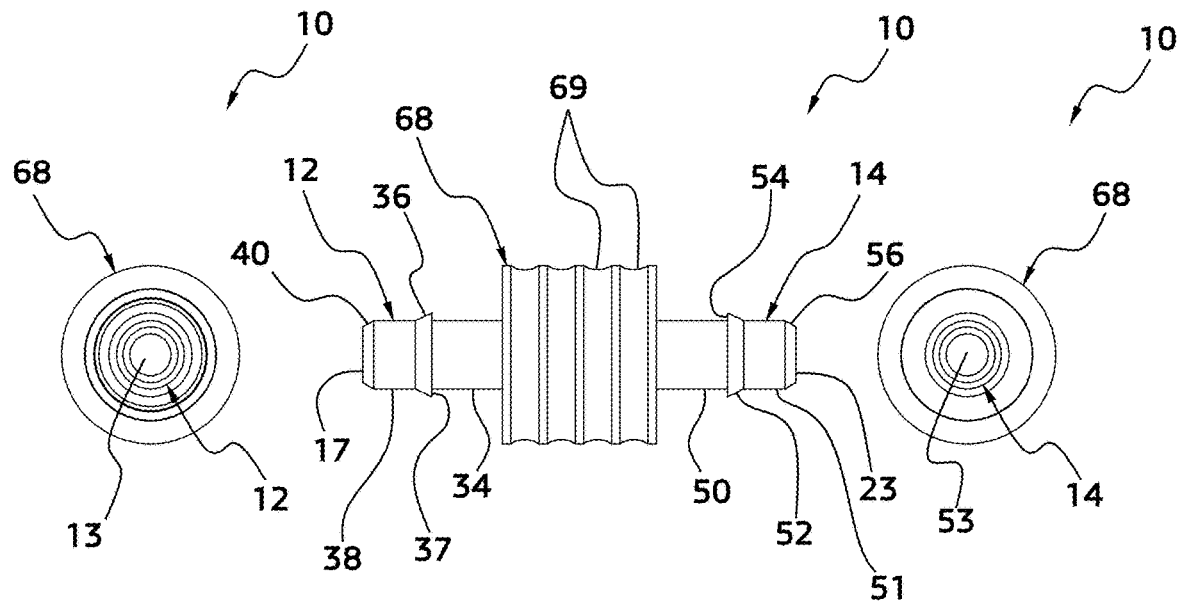
FIG. 5 is a side view of the quick connector shown in FIG. 1 in a locked position.
FIG. 6 is an end view of the quick connector shown in FIGS. 1 and 5 from a trailing end.
FIG. 7 is an end view of the quick connector shown in FIGS. 1 and 5 from a leading end.
Figures 8, 9, 10:
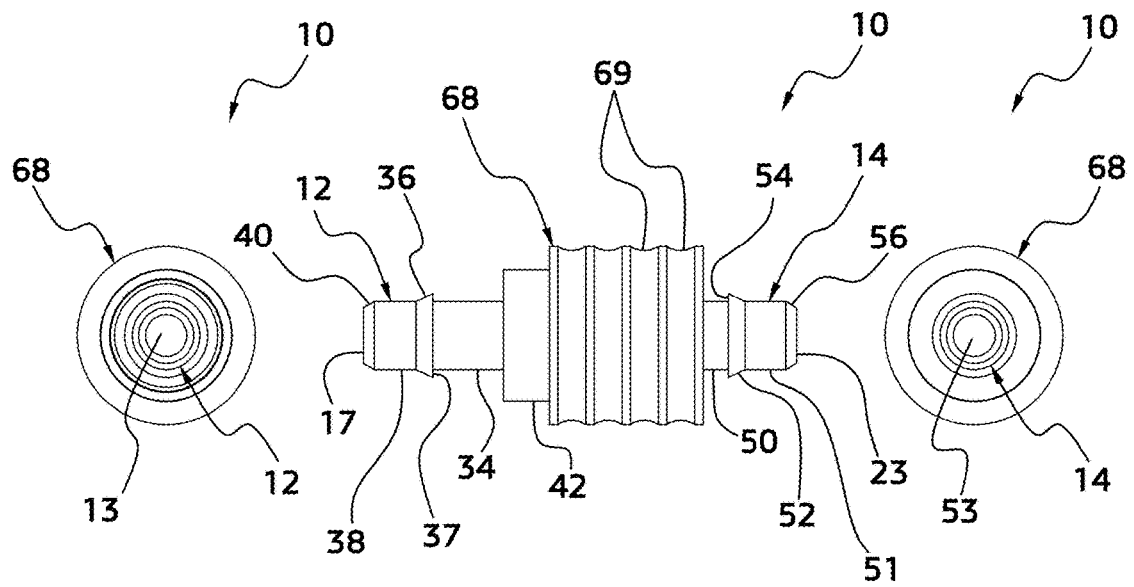
FIG. 8 is a side view of the quick connector shown in FIG. 1 in an unlocked position.
FIG. 9 is an end view of the quick connector shown in FIGS. 1 and 8 from a trailing end.
FIG. 10 is an end view of the quick connector shown in FIGS. 1 and 8 from a leading end.
Figure 11:
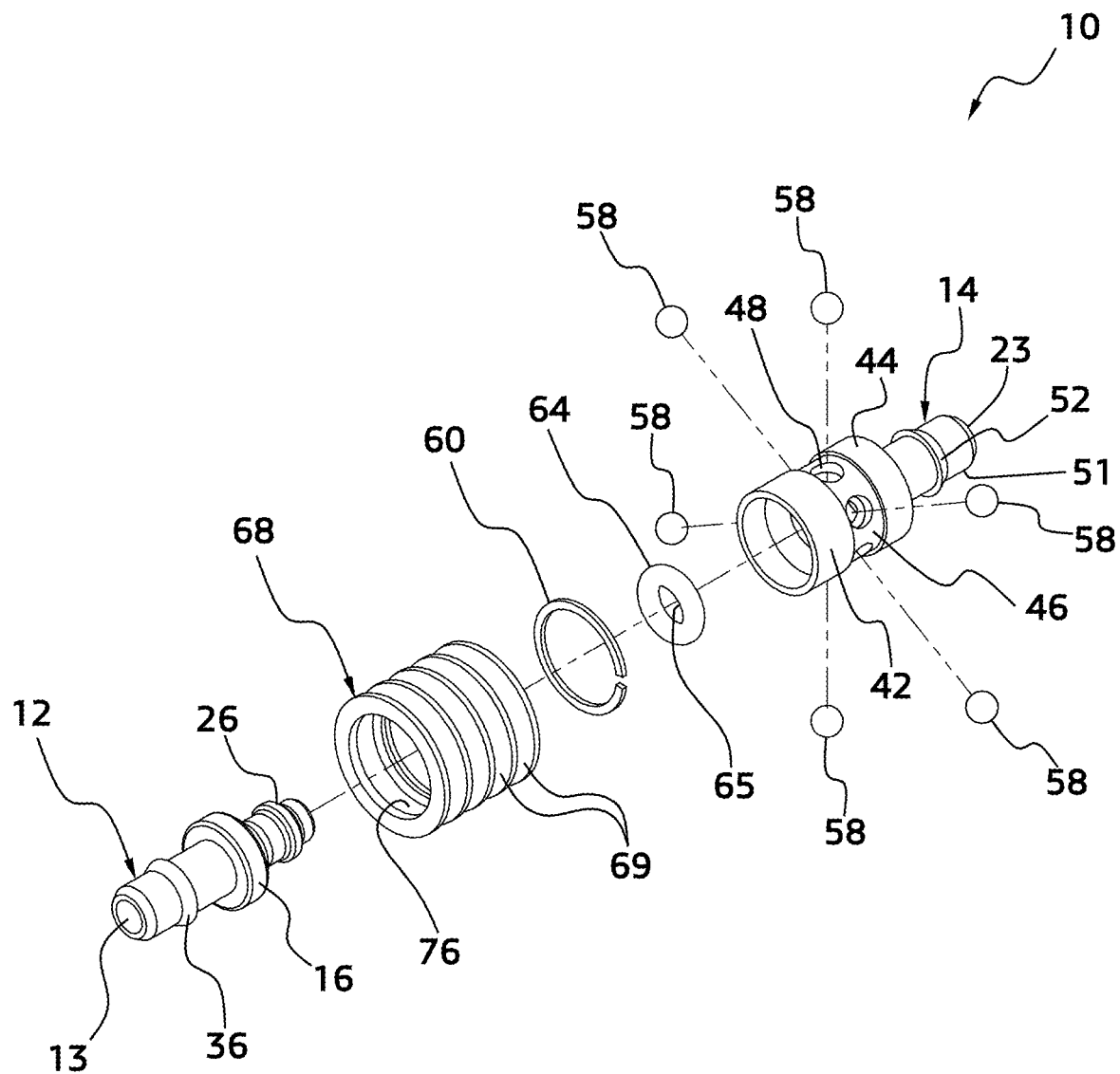
FIG. 11 is an exploded view of the quick connector shown in FIG. 1.
Figure 12:
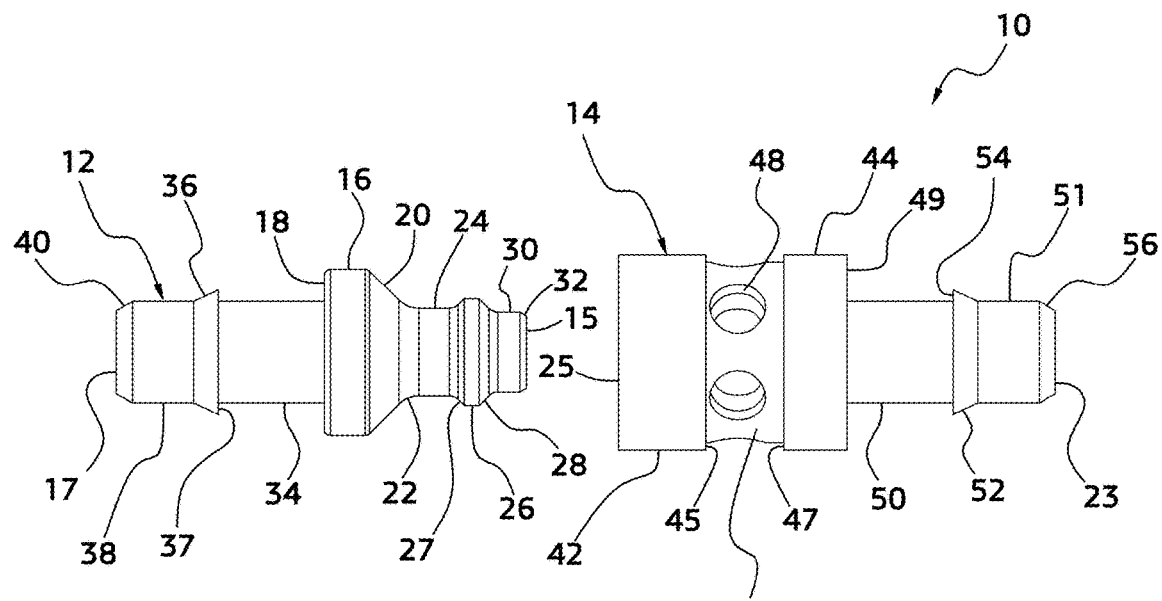
FIG. 12 is a side view of a separated male insertion member and a female retaining coupler according to the embodiment of the disclosure shown in FIG. 1.
Figure 13:
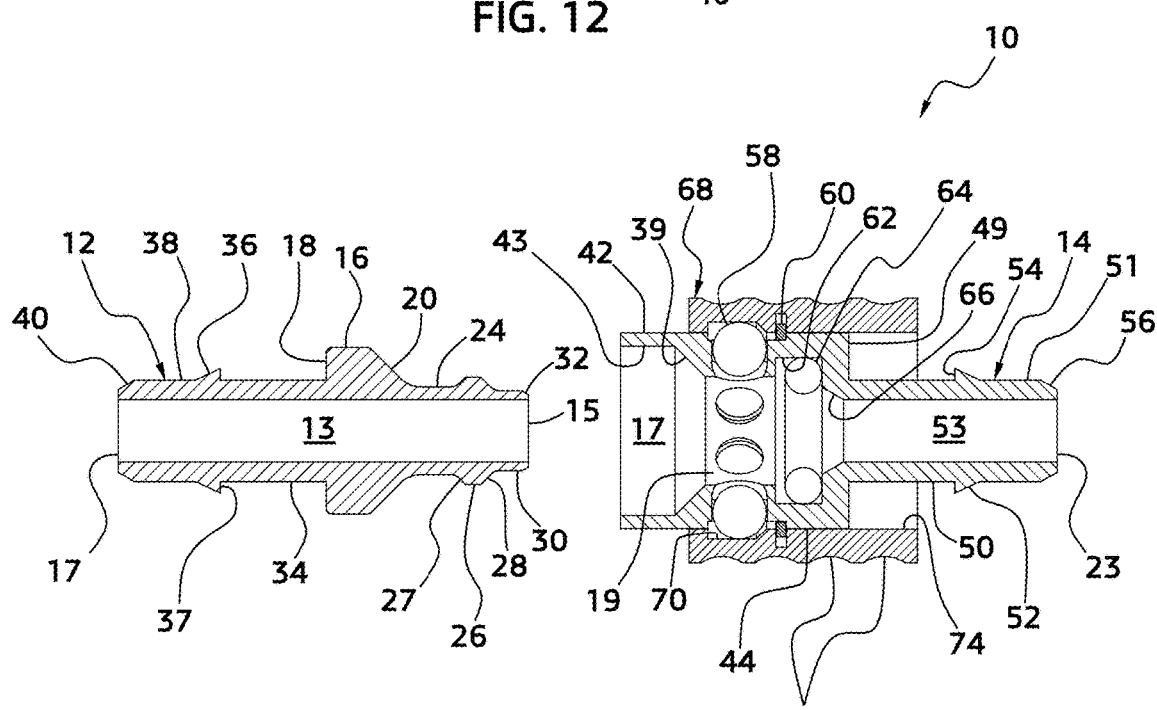
FIG. 13 is a side, sectional view of a separated male insertion member and a female retaining coupler according to the embodiment of the disclosure shown in FIG. 1.

Referring to FIGS. 1-14, a quick-connect coupler, shown generally as 10, includes in its most general aspect a male insertion member 12 and a female retaining coupler 14. Male insertion member 12 defines a generally elongate, substantially cylindrical shape and has portions defining a male insertion member through-aperture 13, as shown with particularity in FIG. 13. Male insertion member 12 further includes a male member leading end 15 and a male member trailing end 17. A radially-extending annular seat flange 16 includes an annular tapered or radiused leading edge 20 and is positioned between the leading and trailing ends. An optional annular secondary slope 22 transitions sloped leading edge 20 into a leading segment 24 disclosed in more detail below. A back end of annular seat flange 16 defines a seat-flange shoulder 18 that functions as a stop for a tube secured to, or extending from, the trailing end of male insertion member 12.

Extending axially from seat flange 16 and toward leading end 15 is a substantially cylindrically-shaped, reduced-diameter male insertion member leading segment 24. The cross-sectional diameter of leading segment 24 is smaller than the cross-sectional diameter of seat flange 16 taken at its apex or widest diameter. A secondary annular locking flange 26 extends radially outwardly from leading segment 24 between seat flange 16 and leading end 15. The cross-sectional diameter of secondary annular locking flange 26, taken at its apex, is smaller than the cross-sectional diameter of seat flange 16, also taken at its apex, and larger than the cross-sectional diameter of leading segment 24.

A leading edge of locking flange 26 may have an annular taper or radius 28. Slope 28, if present, may function as a secondary sealing surface as disclosed in more detail herein. A trailing side of locking flange 26 may be formed with an annular trailing taper or radius 27 similar to, or the same as, radius 28. If present, trailing taper 27 functions as a registration surface for ball bearings, disclosed in more detail herein, to maintain the axial location of male insertion member 12 within female retaining coupler 14, also as disclosed in more detail herein. A proximal male insertion member segment 30 extends axially from locking flange 26 to leading end 15, is substantially cylindrical in shape, and has substantially the same or smaller cross-sectional diameter as leading segment 24. Leading end 15 may have an annular chamfer 32 to facilitate insertion into female retaining coupler 14 and to facilitate the formation of a seal between male insertion member 12 and female retaining coupler 14.

Extending axially from a trailing end of seat-flange shoulder 18 is a substantially cylindrically-shaped intermediate male-member segment 34, which is further substantially circular in cross-sectional shape. The cross-sectional diameter of intermediate male-member segment 34 may be the same as the cross-sectional diameter of leading segment 24 or may be formed with a different cross-sectional diameter to accommodate a wide range of tube sizes. An annular male barb 36 extends radially outwardly from male insertion member 12 from a trailing end of intermediate male-member segment 34 and between trailing end 17 and seat flange 16. Male barb 36 has a tapered or sloped trailing end that slopes upwardly toward its leading end to form an annular male barb shoulder 37. Male barb 36 enhances the registration and mechanical grasp of a tube superposed about male insertion member 12. A substantially cylindrically-shaped male insertion member trailing-end segment 38 of male insertion member 12 extends axially from a trailing end of male barb 36. Trailing-end segment 38 ends at trailing end 17 that may be formed with an annular trailing end chamfer 40 to facilitate the attachment of a tube to male insertion element 12.

Female retaining coupler 14 has a substantially cylindrical trailing end segment 42 that has portions that define a first male-member retaining aperture 43. A front or leading end of first male-member retaining aperture 43 optionally may be formed with an annular radiused or tapered retaining aperture slope 39 that transitions first male retaining aperture 43 to a second male-member retaining aperture 19 that has a smaller cross-sectional diameter than first male-member retaining aperture 43. Formed within the inner wall of female retaining coupler 14 that defines second male-member retaining aperture 19 are a plurality of ball-bearing seat apertures 48. The cross-sectional diameter of ball-bearing seat apertures 48 are set to be smaller than the cross-sectional diameter of ball-bearings 58, described in more detail below, positioned in the ball-bearing seat apertures from an outside surface of female retaining member 14. With this dimensional relationship, portions of the ball bearings, when seated in seat apertures 48, extend into the space defined by second male-member retaining aperture 19. The importance of this configuration is explained in detail below.

Female retaining coupler 14 has a female coupler leading end 23 and a female coupler trailing end 25. A substantially annular female coupler leading end segment 44 has portions that define an annular sealing-ring channel 62 that extends radially outwardly from an inner surface of leading segment 44. An outer annular surface of sealing-ring channel 62 may be flat or have a radiused/concave profile in cross-section to accommodate the outer surface of a sealing ring disclosed in more detail herein. The cross-sectional diameter of sealing-ring channel 62 is set to be larger than the cross-sectional diameter of second male-member retaining aperture 19. This provides a space to insert a sealing ring 64, such as an O-ring, in such a manner that the annular walls that define sealing-ring channel 62 are spaced to receive the sealing ring and to prevent anything more than minimal lateral translation of sealing ring 64 relative to the axial axis of female retaining coupler 14. Once inserted into the sealing-ring channel, sealing ring 64 will remain in the channel despite any insertion or retraction of male insertion member 12 into or out of female retaining coupler 14.

Sealing ring 64 has an inner opening 65 dimensioned to have a cross-sectional diameter smaller than the cross-sectional diameter of proximal segment 30. When male insertion member 12 is inserted into female retaining coupler 14, an inner sealing ring surface that defines inner opening 65 registers against the outer surface of proximal segment 30 to create a fluid-tight and/or air-tight seal between the sealing ring 64 and male insertion member 12. In coordination with the inner sealing ring surface, an outer sealing ring surface that defines the outer perimeter of sealing ring 64 registers against the outer annular surface of sealing-ring channel 62 to provide a fluid-tight and/or air-tight seal between sealing ring 64 and female retaining coupler 14. The combination of the fluid-tight seal between male insertion member 12 and sealing ring 64 and the fluid-tight seal between female retaining coupler 14 and sealing ring 64 creates a fluid-tight seal between male insertion member 12 and female retaining coupler 14.

Female retaining coupler 14 has further portions that define an annular retaining ring travel-limiting channel 46 that extends radially inwardly from an outer surface of female retaining coupler 14. Retaining ring travel-limiting channel 46 is bordered by trailing end segment 42 and leading segment 44 that has the same cross-sectional diameter as trailing end segment 42. The junction of trailing end segment 42 and retaining ring travel-limiting channel 46 forms an annular trailing retaining ring travel-limiting channel shoulder 45. The junction of leading end segment 44 and retaining ring travel-limiting channel 46 forms an annular leading retaining ring travel-limiting channel shoulder 47. The planes occupied by both shoulders 45 and 47 may be substantially orthogonal to an axial axis of quick-connect coupler 10, or may have a tapered or radiused profile. The former orthogonal configuration of the shoulders provides positive end-stops for the travel of a retraction sleeve disclosed in more detail below.

Extending axially from a leading end of leading end segment 44 is a substantially cylindrically-shaped female coupler intermediate segment 50. Intermediate segment 50 has a cross-sectional diameter smaller than the cross-sectional diameter of leading end segment 44. The junction of intermediate segment 50 and leading end segment 44 forms a female tube-stop shoulder 49 that functions as an end-stop for a tube or similar element superposed about female coupler intermediate segment 50. A female barb 52 extends radially outwardly from a leading end of intermediate segment 50 and has an annular tapered or sloped leading end that slopes upwardly toward its trailing end to form an annular female barb shoulder 54. Female barb 52 enhances the registration and mechanical grip of a tube superposed about female intermediate segment 50.

A substantially cylindrically-shaped female leading segment 51 extends axially from the leading end of female barb 52 and ends at female coupler leading end 23 that may be formed with an annular female leading end chamfer 56 to facilitate the attachment of a tube to female retaining coupler 14. The outer cross-sectional diameters of female intermediate segment 50 and female leading segment 51 are set to be substantially the same. The combination of female intermediate segment 50 and female leading segment 51 define a female leading end aperture 53 that is in fluid communication with sealing-ring aperture 62, second male-member retaining aperture 19 and first male-member retaining aperture 43. A leading end of sealing-ring aperture 62 may be formed with a male-insertion-member-receiving chamfer 66 that transitions the cross-sectional diameter of sealing-ring aperture 62 to the smaller cross-sectional diameter of female leading end aperture 51. Male-insertion-member receiving chamfer 66 further functions as a registration surface or seat for male insertion member leading end 15. When male insertion member 12 is secured to female retaining coupler 14, female leading end aperture 53 is in fluid communication with male insertion member through-aperture 13.

As previously described, ball-bearing seat apertures 48 are formed within the inner wall of female retaining coupler 14 that defines second male-member retaining aperture 19. The location of seat apertures 48 also are positioned within retaining ring travel-limiting channel 46 and are arranged in a circular pattern about travel-limiting channel 46 in a substantially equally spaced arrangement to evenly disperse the forces imparted on male insertion member 12 and female retaining coupler 14 when connected. The axial location of ball-bearing seat apertures 48 may be biased toward trailing retaining ring travel-limiting channel shoulder 45 that represents the locked side of ball bearings 58 as explained in more detail herein. It should be understood that the spatial orientation of the ball-bearing seat apertures relative to trailing retaining ring travel-limiting channel shoulder 45 and leading retaining ring travel-limiting channel shoulder 47 may be varied including being situated equidistant from the shoulders and remain within the scope of the disclosure.

To maintain ball bearings 58 in ball-bearing seat apertures 48, a retraction sleeve 68 is superposed about female retaining coupler 14. Retraction sleeve 68 is substantially cylindrical in shape and dimensioned to have an inner wall diameter larger than the outer diameter of trailing end segment 42 and leading end segment 44. As shown with particularity in FIG. 14, retraction sleeve 68 is formed with a series of annular undulating outer surface structures 69, which also may be knurled, that facilitate digital grasp of the retraction sleeve for axial movement along, and relative to, female retaining coupler 14. A trailing end of retraction sleeve 68 defines an annular retraction sleeve trailing end aperture 75 dimensioned to have a cross-sectional diameter to fit snuggly over the circumferences of trailing end segment 42 and leading end segment 44 without impeding the axial translation of the retraction sleeve relative to the female retaining coupler.

The length of retraction sleeve 68 can be the same as, longer than, or shorter than, the length of female retaining coupler 14. If made longer than the axial length of the body of female retaining coupler 14, i.e., the distance between trailing end 25 and female tube stop shoulder 49, when positioned in either a locked or unlocked position, a trailing end of retraction sleeve 68 may be coplanar with trailing end 25 or a leading end of retraction sleeve 68 will be coplanar with female tube stop shoulder 49. This provides a visual aid to let the user know in which position, locked or unlocked, the retraction sleeve is in. It also facilitates grasping the retraction sleeve as the end of the retraction sleeve that extends beyond the body of female retaining coupler 14 allows fingers to overhang the extended edge without contacting the female retaining coupler to facilitate axial movement of the retraction sleeve to the other extreme position. Once in the other position, the end that was pushed will now be coplanar with an end of the female retaining coupler and the other end of the retraction sleeve will overhang the other end of the female retaining coupler to again alert the user as to which position the retraction sleeve is in.

Formed adjacent to, and in fluid communication with, trailing end aperture 75 is an annular retraction sleeve ball-bearing expansion channel 76. Expansion channel 76 extends radially outwardly from an inner wall of retraction sleeve 68 and has a cross-sectional diameter greater than the cross-sectional diameter of retraction sleeve trailing end aperture 75. A retraction sleeve transition shoulder 81 formed by the junction of retraction sleeve trailing end aperture 75 and retraction sleeve ball-bearing expansion channel 76 transitions the aperture to the channel. The cross-sectional diameter of retraction sleeve ball-bearing expansion channel 76, when positioned radially above ball bearings 58, permits the ball bearings to move radially outwardly from ball-bearing seat apertures 48 so as to move out of second male-member receiving aperture 19. This permits male insertion member 12 to be fully inserted into female retaining coupler 14 with secondary annular locking flange 26 being able to move axially past the ant-apex point of the ball bearings into the fully-seated, locking position.

A leading end of retraction sleeve ball-bearing expansion channel 76 is formed with an annular expansion channel slope or chamfer 78 that facilitates axial movement of retraction sleeve 68 over ball bearings 58 from an unlocked position to a locked position. Chamfer 78 transitions expansion channel 76 to an annular main retraction sleeve channel 77 defined by a retraction sleeve inner wall 74. Main retraction sleeve channel 77 has substantially the same cross-sectional diameter as retraction sleeve trailing end aperture 75. The retraction sleeve material that forms chamfer 78 also functions as a retaining-ring retention wall as explained in more detail below.

Extending radially outwardly from retraction sleeve inner wall 74 is an annular retaining-ring slot 72, also referred to herein as a retaining ring groove/slot or a retaining-ring groove. Retaining-ring slot 72 is positioned proximal to the leading end of chamfer 78 and extends radially outwardly beyond the leading end of chamfer 78. The width and diameter of retaining-ring slot 72 is set to receive a retaining ring 60 so as to limit the axial or lateral displacement of the retaining ring within retraction sleeve 68 and to permit the retaining ring to expand radially outwardly in the slot. In a relaxed positioned, the outer diameter of retaining ring 60 will be smaller than the cross-sectional diameter of retaining-ring slot 72 and larger than the cross-sectional diameter of main retraction sleeve channel 77. The thickness of retaining ring 60 is set such that retaining ring 60 will at least loosely register against annular retaining-ring walls, a trailing retaining-ring wall 71 and a leading retaining-ring wall 73 that define slot 72.

The retaining-ring walls function as retaining-ring lateral restriction surfaces to maintain retaining ring 60 in a substantially stable lateral orientation relative to retraction sleeve 68 regardless whether retaining ring 60 is in either a relaxed or a radially expanded state. The looseness of the registration of retaining ring 60 with the retaining-ring walls is to ensure the retaining ring can freely expand radially and retract radially without the walls forming any type of restriction or impediment to these retaining-ring functions.

Retaining ring 60 is a thin, substantially circular or spiral metallic or polymer ring that has certain resiliency and deflection characteristics such as high tensile strength and fatigue resistance. Any metal and/or polymer commonly known in the art for the manufacture of springs may be used. Moreover, any material described as suitable for making retaining ring 60 may be used for any retaining ring embodiment disclosed herein. Retaining ring 60 is a discontinuous ring (circular or spiral) as there is a break in the ring that permits the ring to be flexed and placed over a cylindrical body such as female retaining coupler 14. The retaining ring may have an inner diameter substantially the same as the cross-sectional diameter of retaining ring travel-limiting channel 46. The inner diameter may also be larger so as not to create any radial expansion via the female retaining coupler or may have a smaller diameter to be under constant radial stress when placed over retaining ring travel-limiting channel 46. If the inner diameter of retaining ring 60 is set to be in constant registration with retaining channel 46 without any radial stress imparted by registration against retaining channel 46, the function of the retraction sleeve/retaining ring/retaining channel combination can be optimized for purposes of reliability, durability and usability.

Trailing retaining ring travel-limiting channel shoulder 45 and leading retaining ring travel-limiting channel shoulder 47 that define the lateral borders of retaining channel 46, further function as lateral axial stops for retaining ring 60. By fixing the lateral orientation of retaining ring 60 to retraction sleeve 68, movement of the retraction sleeve will result in a corresponding lateral movement of retaining ring 60 relative to female retaining coupler 14. Because quick-connect coupler 10 is constructed without an axial compression spring, the relative lateral position of retraction sleeve 68 to female coupler 14 can be set to one of two positions.

In a first, unlocked position, retraction sleeve 68 is positioned such that retaining ring 60 is positioned adjacent to and/or registered against, leading retaining ring travel-limiting channel shoulder 47. In this position, retaining ring 60 will be in a relaxed, unstrained condition. Retraction sleeve ball-bearing expansion channel 76 will be positioned about, and in the same plane occupied by, ball bearings 58. With ball bearings 58 aligned with expansion channel 76, the ball bearings will be free to migrate out of ball-bearing seat apertures 48. This will enable male insertion member 12 to be freely inserted into, or retracted from, the internal apertures/channels of female retaining coupler 14.

Operationally, with retraction sleeve 68 in the first, unlocked position, male insertion member 12 can be inserted into female retaining coupler 14 until chamfer 32 of leading end 15 registers against male-insertion-member-receiving chamfer 66 and/or tapered or radiused leading edge 20 registers against trailing retaining ring travel-limiting channel shoulder 45 to seat the male insertion member to the female retaining coupler. As male insertion member 12 is inserted into female retaining coupler 14, proximal segment 30 of male insertion member 12 slides within sealing ring 64 to create a seal. Also, when male insertion member 12 is fully seated inside female retaining coupler 14, ball bearings 58 will reseat in ball-bearing seat apertures 48 depending upon gravitational effects on the ball bearings. Those vertically above the male insertion member will drop and register against leading segment 24 of male insertion member 12. Those below will remain registered against the surface of retraction sleeve ball-bearing expansion channel 76.

To lock male insertion member 12 to female retaining coupler 14, retraction sleeve 68 is urged toward trailing end 25 of the female retaining coupler. As the retraction sleeve is advanced toward the trailing end, chamfer 78 will register against ball bearings 58 and urge the ball bearings into fully seated positions in ball-bearing seat apertures 48. The chamfered surface facilitates the movement of the ball bearings radially inwardly as the lateral movement of retraction sleeve 68 advances. In this position, ball bearings 58 will essentially be positioned registered against, or adjacent to, leading segment 24 and positioned between seat flange 16 and secondary annular locking flange 26. The combination of the flanges and the force applied to the ball bearings by chamfer 78 wedges the ball bearings between the flanges to lock the lateral orientation of male insertion member 12 to female retaining coupler 14. This combination of features creates a mechanical restriction to keep male insertion member 12 fully seated inside female retaining coupler 14 so that sealing ring 64 remains registered against proximal segment 30 to create the fluid-tight and/or air-tight seal between male insertion member 12 and female retaining coupler 14.

To maintain the locked condition of the components, retraction sleeve 68 is advanced further toward female coupler trailing end 25 so that retaining ring 60 registers against the radiused surfaces of ball bearings 58. The lateral force applied to the retraction sleeve causes retaining ring 60 to radially expand within retaining-ring slot 72 to pass over the apexes of ball bearings 58. When passing over the ball-bearing apexes, the radial expansion of retaining ring 60 provides a detent-like effect that creates tactile feedback. This functionality also applies to the retaining rings of any of the other quick-connect coupler embodiments disclosed herein. As retaining ring 60 passes the ball-bearing apexes, the retaining ring follows the radiused contours of the ball bearings down to its relaxed dimensional state. At this point, retaining ring 60 is located between trailing retaining ring travel-limiting channel shoulder 45 and ball bearings 58. This is the second position of retraction sleeve 68. In this position, the apexes of ball bearings 58 are now registered against retraction sleeve inner wall 74 that urges the ball bearings into a fully seated position in ball-bearing seat apertures 48. In this orientation, ball bearings 58 create a mechanical restriction between male insertion member 12 and female retaining coupler 14 to maintain the two components in a locked configuration.

To unlock quick-connect coupler 10, retraction sleeve 68 is urged laterally toward female coupler leading end 23 to essentially reverse the locking process. Because a compression spring is not used to set the lateral resting position of the retraction sleeve, a positive lateral force has to be applied to retraction sleeve 68 to force registration of the leading surface of retaining ring 60 against the trailing radiused surfaces of ball bearings 58. As the retraction sleeve is advanced further toward female coupler leading end 23, retaining ring 60 is forced to expand radially outwardly over the ball bearing surfaces and within retaining-ring slot 72. After passing the apexes of the ball bearings, retaining ring 60 will follow the leading radiused surface of ball bearings 58 back to an unexpanded relaxed condition between the ball bearings and leading retaining ring travel-limiting channel shoulder 47. In this position, retraction sleeve ball-bearing expansion channel 76 will now again be positioned in alignment with the plane occupied by ball bearings 58 that permits the ball bearings to move radially outwardly away from ball-bearing seat apertures 48. Male insertion member 12 can now be freely removed from within female retaining coupler 14.

Referring now to FIGS. 15-25, in another aspect of the disclosure, a quick-connect coupler, shown generally as 10', includes in its most general aspect, a male insertion member 12' and a female retaining coupler 14'. As used herein, identical reference characters having differently primed or unprimed variations and assigned to features of the disclosure are intended to identify different embodiments of the same feature. Quick-connect coupler 10' is designed to function purely as a quick-connect coupler for applications that do not involve fluid transmission but simply involve the connection of two objects. As such, the quick-connect coupler does not require any fluid-tight or air-tight sealing components.

Male insertion member 12' defines a generally elongate cylindrical shape and includes a male member leading end 15' and a male member trailing end 17'. An annular ball-bearing receiving channel 24' is formed proximal to leading end 15'. Ball-bearing receiving channel 24' has a cross-sectional diameter smaller than the cross-sectional diameter of the main body of male insertion member 12'. Leading and trailing ends of ball-bearing receiving channel 24' may form shoulders orthogonal to the axial axis of male insertion member 12' or may be formed with sloped or radiused surfaces to provide a smooth transition from the outer surface of male insertion member 12' to the surface of ball-bearing receiving channel 24'. Leading end 15' may have an annular chamfer or radius 32' to facilitate insertion into female retaining coupler 14'. Trailing end 17' may have a chamfer, but one is not required.

Female retaining coupler 14' has a substantially cylindrical trailing end segment 42' and a substantially cylindrical leading end segment 44' along with a female coupler leading end 23' and a female coupler trailing end 25'. The cross-sectional diameters of trailing end segment 42' and leading end segment 44' are substantially the same. These trailing and leading end segments combine with an intermittent retaining ring travel-limiting channel 46', described in more detail below, to define a male-member retaining bore 43' that does not extend through the entire length of female retaining coupler 14'. Male-member retaining bore 43' ends within leading end segment 44'. It should be understood that the depth of the bore can be altered to varying depths and remain within the scope of the disclosure.

Formed in a circular pattern within the inner wall of female retaining coupler 14' that defines male-member retaining bore 43' are a plurality of ball-bearing seat apertures 48'. The cross-sectional diameter of ball-bearing seat apertures 48' are set to be smaller than the cross-sectional diameter of ball-bearings 58', described in more detail below, positioned in the ball-bearing seat apertures from an outside surface of female retaining member 14'. With this dimensional relationship, portions of the ball bearings, when seated in seat apertures 48', extend into the space defined by second male-member retaining bore 43'. The importance of this configuration is explained in detail below.

Female retaining coupler 14' has further portions that define a retaining ring travel-limiting channel 46' that extends radially inwardly from an outer surface of female retaining coupler 14'. Retaining ring travel-limiting channel 46' is bordered by trailing end segment 42' and leading end segment 44'. The junction of trailing end segment 42' and retaining ring travel-limiting channel 46' forms an annular trailing retaining ring travel-limiting channel shoulder 45'. The junction of leading end segment 44' and retaining ring travel-limiting channel 46' forms an annular leading retaining ring travel-limiting channel shoulder 47'. The planes occupied by both shoulders 45' and 47' may be substantially orthogonal to an axial axis of quick-connect coupler 10', or may have a tapered or radiused profile. The former orthogonal configuration of the shoulders provides positive end-stops for the travel of a retraction sleeve/retaining ring combination disclosed in more detail below.

As previously described, ball-bearing seat apertures 48' are formed within the inner wall of female retaining coupler 14' that defines male-member retaining bore 43'. The location of seat apertures 48' also are positioned within retaining ring travel-limiting channel 46' and are arranged in a circular pattern about retaining ring travel-limiting channel 46' in a substantially equally spaced arrangement to evenly disperse the forces imparted on male insertion member 12' and female retaining coupler 14' when connected. The location of ball-bearing seat apertures 48' may be biased toward trailing retaining ring travel-limiting channel shoulder 45' that represents the locked side of ball bearings 58' as explained in more detail herein. It should be understood that the spatial orientation of the ball-bearing seat apertures relative to trailing retaining ring travel-limiting channel shoulder 45' and leading retaining ring travel-limiting channel shoulder 47' may be varied including being situated equidistant from the shoulders and remain within the scope of the disclosure.

To maintain ball bearings 58' in ball-bearing seat apertures 48', a retraction sleeve 68' is superposed about female retaining coupler 14'. Retraction sleeve 68' is substantially cylindrical in shape and dimensioned to have an inner wall diameter larger than the outer diameter of trailing end segment 42' and leading end segment 44'. Similar to retraction sleeve 68 shown in FIG. 14, retraction sleeve 68' is formed with a series of annular undulating outer surface structures 69', which also may be knurled, that facilitate digital grasp of the retraction sleeve for axial movement along female retaining coupler 14'. A trailing end of retraction sleeve 68' defines a retraction sleeve trailing end aperture 75' dimensioned to have a cross-sectional diameter to fit snuggly over the circumferences of trailing end segment 42' and leading end segment 44' without impeding the axial translation of the retraction sleeve relative to the female retaining coupler.

The length of retraction sleeve 68' can be the same as, longer than, or shorter than, the length of female retaining coupler 14'. If made longer than the axial length of the body of female retaining coupler 14', i.e., the distance between trailing end 25' and female tube stop shoulder 49', when positioned in either a locked or unlocked position, a trailing end of retraction sleeve 68' may be coplanar with trailing end 25' or a leading end of retraction sleeve 68' will be coplanar with female tube stop shoulder 49'. This provides a visual aid to let the user know in which position, locked or unlocked, the retraction sleeve is in. It also facilitates grasping the retraction sleeve as the end of the retraction sleeve that extends beyond the body of female retaining coupler 14' allows fingers to overhang the extended edge without contacting the female retaining coupler to facilitate axial movement of the retraction sleeve to the other extreme position. Once in the other position, the end that was pushed will now be coplanar with an end of the female retaining coupler and the other end of the retraction sleeve will overhang the other end of the female retaining coupler to again alert the user as to which position the retraction sleeve is in.

Formed adjacent to, and in fluid communication with, trailing end aperture 75' is a retraction sleeve ball-bearing expansion channel 76'. Expansion channel 76' extends radially outwardly from an inner wall of retraction sleeve 68' and has a cross-sectional diameter greater than the cross-sectional diameter of retraction sleeve trailing end aperture 75'. A retraction sleeve transition shoulder 81' formed by the junction of retraction sleeve trailing end aperture 75' and retraction sleeve ball-bearing expansion channel 76' functions to limit the axial travel of ball bearings 58' relative to female retaining coupler 14'. The cross-sectional diameter of retraction sleeve ball-bearing expansion channel 76', when positioned radially above ball bearings 58', permits the ball bearings to move radially outwardly from ball-bearing seat apertures 48' so as to move out of male-member retaining bore 43'. This permits male insertion member 12' to be fully inserted into female retaining coupler 14' with leading end 15 being able to move axially past the ant-apex point of the ball bearings into the fully-seated, locking position.

A leading end of retraction sleeve ball-bearing expansion channel 76' is formed with a slope or chamfer 78' that facilitates axial movement of retraction sleeve 68' over ball bearings 58' from an unlocked position to a locked position. Chamfer 78' transitions expansion channel 76' to a main retraction sleeve channel 77' defined by retraction sleeve inner wall 74'. Main retraction sleeve channel 77' has substantially the same cross-sectional diameter as retraction sleeve trailing end aperture 75'. The retraction sleeve material that forms chamfer 78' also functions as a retaining-ring retention wall as explained in more detail below.

Extending radially outwardly from retraction sleeve inner wall 74' is an annular retaining-ring slot 72'. Retaining-ring slot 72' is positioned proximal to the leading end of chamfer 78' and extends radially outwardly beyond the leading end of chamfer 78'. It should be understood that expansion channel 76' can extend radially outwardly beyond the radially outer surface of retaining-ring slot 72'. The width and diameter of retaining-ring slot 72' is set to receive a retaining ring 60' so as to limit the axial or lateral displacement of the retaining ring within retraction sleeve 68' and to permit the retaining ring to expand radially outwardly in the slot. In a relaxed positioned, the outer diameter of retaining ring 60' will be smaller than the cross-sectional diameter of retaining-ring slot 72' and larger than the cross-sectional diameter of main retraction sleeve channel 77'. The thickness of retaining ring 60' is set such that retaining ring 60' will at least loosely register against annular retaining-ring walls, a trailing retaining-ring wall 71' and a leading retaining-ring wall 73' that define slot 72'.

The retaining-ring walls function as retaining-ring lateral restriction surfaces to maintain retaining ring 60' in a substantially stable lateral orientation relative to retraction sleeve 68' regardless whether retaining ring 60' is in either a relaxed or a radially-expanded state. The looseness of the registration of retaining ring 60' with the retaining-ring walls is to ensure the retaining ring can freely expand radially and retract radially without the walls forming any type of restriction or impediment to these retaining-ring functions.

Like retaining ring 60, retaining ring 60' is a thin, substantially circular or spiral metallic or polymer ring that has certain resiliency and deflection characteristics such as high tensile strength and fatigue resistance. Retaining ring 60' is a discontinuous ring (circular or spiral) as there is a break in the ring that permits the ring to be flexed and placed over a cylindrical body such as female retaining coupler 14'. The retaining ring may have an inner diameter substantially the same as the cross-sectional diameter of retaining ring travel-limiting channel 46'. The inner diameter may also be larger so as not to create any radial expansion via the female retaining coupler or may have a smaller diameter to be under constant radial stress when placed over retaining ring travel-limiting channel 46'. If the inner diameter of retaining ring 60' is set to be in constant registration with retaining channel 46' without any radial stress imparted by registration against retaining channel 46', the function of the retraction sleeve/retaining ring/retaining channel combination can be optimized for purposes of reliability and durability.

Trailing retaining ring travel-limiting channel shoulder 45' and leading retaining ring travel-limiting channel shoulder 47' that define the lateral borders of retaining channel 46', further function as lateral axial stops for retaining ring 60'. By fixing the lateral orientation of retaining ring 60' to retraction sleeve 68', movement of the retraction sleeve will result in a corresponding lateral movement of retaining ring 60' relative to female retaining coupler 14'. Because quick-connect coupler 10' is constructed without an axial compression spring, the relative lateral position of retraction sleeve 68' to female coupler 14' can be set to one of two positions.

In a first, unlocked position, retraction sleeve 68' is positioned such that retaining ring 60' is positioned adjacent to and/or registered against, leading retaining ring travel-limiting channel shoulder 47'. In this position, retaining ring 60' will be in a relaxed, unstrained condition. Retraction sleeve ball-bearing expansion channel 76' will be positioned about, and in the same plane occupied by, ball bearings 58'. With ball bearings 58' aligned with expansion channel 76', the ball bearings will be free to migrate out of ball-bearing seat apertures 48'. This will further enable male insertion member 12' to be freely inserted into, or retracted from, the internal apertures of female retaining coupler 14'.

Operationally, with retraction sleeve 68' in the first, unlocked position, male insertion member 12' can be inserted into female retaining coupler 14' until ball-bearing receiving channel 24' aligns with ball-bearings 58'. When this alignment is achieved, ball bearings 58' will reseat in ball-bearing seat apertures 48' depending upon gravitational effects on the ball bearings. Those vertically above the male insertion member will drop and register against ball-bearing receiving channel 24' of male insertion member 12'. Those below will remain registered against the surface of retraction sleeve ball-bearing expansion channel 76'.

To lock male insertion member 12' to female retaining coupler 14', retraction sleeve 68' is urged toward trailing end 25' of the female retaining coupler. As the retraction sleeve is advanced toward the trailing end, chamfer 78' will register against ball bearings 58' and urge the ball bearings into a fully seated position in ball-bearing seat apertures 48'. The chamfered surface facilitates the movement of the ball bearings radially inwardly as the lateral movement of retraction sleeve 68' advances. In this position, ball bearings 58' will essentially be positioned registered against, or adjacent to, ball-bearing receiving channel 24'. The shape of channel 24' and the force applied to the ball bearings by chamfer 78' wedges the ball bearings between the leading and trailing ends of ball-bearing receiving channel 24' to lock the lateral orientation of male insertion member 12' to female retaining coupler 14'. This combination of features creates a mechanical restriction to keep male insertion member 12' fully seated inside female retaining coupler 14'.

To maintain the locked condition of the components, retraction sleeve 68' is advanced further toward female coupler trailing end 25' so that retaining ring 60' registers against the radiused surfaces of ball bearings 58'. The lateral force applied to the retraction sleeve causes retaining ring 60' to radially expand within retaining-ring slot 72' to pass over the apexes of ball bearings 58'. As retaining ring 60' passes the ball-bearing apexes, the retaining ring follows the radiused contours of the ball bearings down to its relaxed dimensional state. At this point, retaining ring 60' is located between trailing retaining ring travel-limiting channel shoulder 45' and ball bearings 58'. This is the second position of retraction sleeve 68'. In this position, the apexes of ball bearings 58' are now registered against retraction sleeve inner wall 74' that urges the ball bearings into a fully seated position in ball-bearing seat apertures 48'. In this orientation, ball bearings 58' create a mechanical restriction between female retaining coupler 14' and male insertion member 12' via a mechanical interference with ball-bearing receiving channel 24' to maintain the two components in a locked configuration.

In similar fashion to quick-connect coupler 10, to unlock quick-connect coupler 10', retraction sleeve 68' is urged laterally toward female coupler leading end 23' to essentially reverse the locking process. Because a compression spring is not used to set the lateral resting position of the retraction sleeve, a positive lateral force has to be applied to retraction sleeve 68' to force registration of the leading surface of retaining ring 60' against the trailing radiused surfaces of ball bearings 58'. As the retraction sleeve is advanced further toward female coupler leading end 23', retaining ring 60' is forced to expand radially outwardly within retaining-ring slot 72' over the ball bearing surfaces. After passing the apexes of the ball bearings, retaining ring 60' will follow the leading radiused surface of ball bearings 58' back to an unexpanded relaxed condition between the ball bearings and leading retaining ring travel-limiting channel shoulder 47'. In this position, retraction sleeve ball-bearing expansion channel 76' will now again be positioned in alignment with the plane occupied by ball bearings 58' that permits the ball bearings to move radially outwardly away from ball-bearing seat apertures 48'. Male insertion member 12' can now be freely removed from within female retaining coupler 14'. Retraction sleeve 68' can remain in its current position without imparting any radial stress on retaining ring 60'.

Referring now to FIGS. 26-37, in another aspect of the disclosure, a quick-connect coupler, shown generally as 10", includes in its most general aspect a male insertion member 12" and a female retaining coupler 14". Quick-connect coupler 10" has many of the same features as quick-connect coupler 10' with some additional modifications to female retaining coupler 14" and a retraction sleeve 68", described in more detail below. Like quick-connect coupler 10', quick-connect coupler 10" is designed to function purely as a quick-connect coupler for applications that do not involve fluid transmission but simply involve the connection of two objects. As such, quick-connect coupler 10" does not require any fluid-tight or air-tight sealing components.

Male insertion member 12" defines a generally elongate cylindrical shape and includes a male member leading end 15" and a male member trailing end 17". Male insertion member 12" may be hollow or solid. An annular ball-bearing receiving channel 24" is formed proximal to leading end 15". Ball-bearing receiving channel 24" has a cross-sectional diameter smaller than the cross-sectional diameter of the main body of male insertion member 12". Leading and trailing ends of ball-bearing receiving channel 24" may form shoulders orthogonal to the axial axis of male insertion member 12" or may be formed with sloped or radiused surfaces to provide a smooth transition from the outer surface of male insertion member 12" to the surface of ball-bearing receiving channel 24". Leading end 15" may have an annular chamfer or radius 32" to facilitate insertion into female retaining coupler 14". Tailing end 17" may have a chamfer, but one is not needed.

Female retaining coupler 14" has an overall substantially stepped cylindrical shape with a substantially cylindrical trailing end segment 42" and a substantially cylindrical leading end segment 44" along with a female coupler leading end 23" and a female coupler trailing end 25". In this embodiment, the cross-sectional diameter of trailing end segment 42" is larger than the cross-sectional diameter of leading end segment 44". These trailing and leading end segments combine with an intermittent retaining ring travel-limiting channel 46", described in more detail below, to define a male-member retaining bore 43" that does not extend through the entire length of female retaining coupler 14". Male-member retaining bore 43" ends within leading end segment 44". It should be understood that the depth of bore 43" can be modified and remain within the scope of the disclosure. Formed in a circular pattern within the inner wall of female retaining coupler 14" that defines male-member retaining bore 43" are a plurality of ball-bearing seat apertures 48". The cross-sectional diameter of ball-bearing seat apertures 48" are set to be smaller than the cross-sectional diameter of ball-bearings 58", described in more detail below, positioned in the ball-bearing seat apertures from an outside surface of female retaining member 14". With this dimensional relationship, portions of the ball bearings, when seated in seat apertures 48", extend into the space defined by male-member retaining bore 43". The importance of this configuration is explained in detail below.

Female retaining coupler 14" has further portions that define retaining ring travel-limiting channel 46" that extends radially inwardly from an outer surface of female retaining coupler 14". Retaining ring travel-limiting channel 46" is bordered by trailing end segment 42" and leading end segment 44". The junction between trailing end segment 42" and retaining ring travel-limiting channel 46" is formed as an annular sloped or chamfered surface 49" that transitions the larger-diameter trailing end segment to the smaller cross-sectional diameter retaining ring travel-limiting channel 46". A leading end of chamfered surface 49" forms an annular trailing retaining ring travel-limiting channel shoulder 45". The junction of leading segment 44" and retaining ring travel-limiting channel 46" forms an annular leading retaining ring travel-limiting channel shoulder 47". The planes occupied by both shoulders 45" and 47" may be substantially orthogonal to an axial axis of quick-connect coupler 10", or may have a tapered or radiused profile. The former orthogonal configuration of the shoulders provides positive end-stops for the travel of a retraction sleeve disclosed in more detail below.

As previously described, ball-bearing seat apertures 48" are formed within the inner wall of female retaining coupler 14" that defines male-member retaining bore 43". The location of seat apertures 48" also are positioned within retaining ring travel-limiting channel 46" and are arranged in a circular pattern about retaining channel 46" in a substantially equally spaced arrangement to evenly disperse the forces imparted on male insertion member 12" and female retaining coupler 14" when connected. The location of ball-bearing seat apertures 48" may be biased toward trailing retaining ring travel-limiting channel shoulder 45" that represents the locked side of ball bearings 58" as explained in more detail herein. It should be understood that the spatial orientation of the ball-bearing seat apertures relative to trailing retaining ring travel-limiting channel shoulder 45"

and leading retaining ring travel-limiting channel shoulder 47" may be varied including being situated equidistant from the shoulders and remain within the scope of the disclosure.

To maintain ball bearings 58" in ball-bearing seat apertures 48", a retraction sleeve 68" is superposed about female retaining coupler 14". Retraction sleeve 68" is substantially cylindrical in shape with a stepped inner wall to accommodate the different cross-sectional diameters of trailing end segment 42" and leading end segment 44". The cross-sectional diameters of the inner wall sections are set to permit retraction sleeve 68" to translate freely and laterally relative to female retaining coupler 14". Chamfer 49" functions as a stop to limit travel of the retraction sleeve toward the female coupler trailing end 25" as explained in more detail below.

The length of retraction sleeve 68" can be the same as, longer than, or shorter than, the length of female retaining coupler 14". If made longer than the axial length of the body of female retaining coupler 14", i.e., the distance between trailing end 25" and female tube stop shoulder 49", when positioned in either a locked or unlocked position, a trailing end of retraction sleeve 68" may be coplanar with trailing end 25" or a leading end of retraction sleeve 68" will be coplanar with female tube stop shoulder 49". This provides a visual aid to let the user know in which position, locked or unlocked, the retraction sleeve is in. It also facilitates grasping the retraction sleeve as the end of the retraction sleeve that extends beyond the body of female retaining coupler 14" allows fingers to overhang the extended edge without contacting the female retaining coupler to facilitate axial movement of the retraction sleeve to the other extreme position. Once in the other position, the end that was pushed will now be coplanar with an end of the female retaining coupler and the other end of the retraction sleeve will overhang the other end of the female retaining coupler to again alert the user as to which position the retraction sleeve is in.

Figure 14:
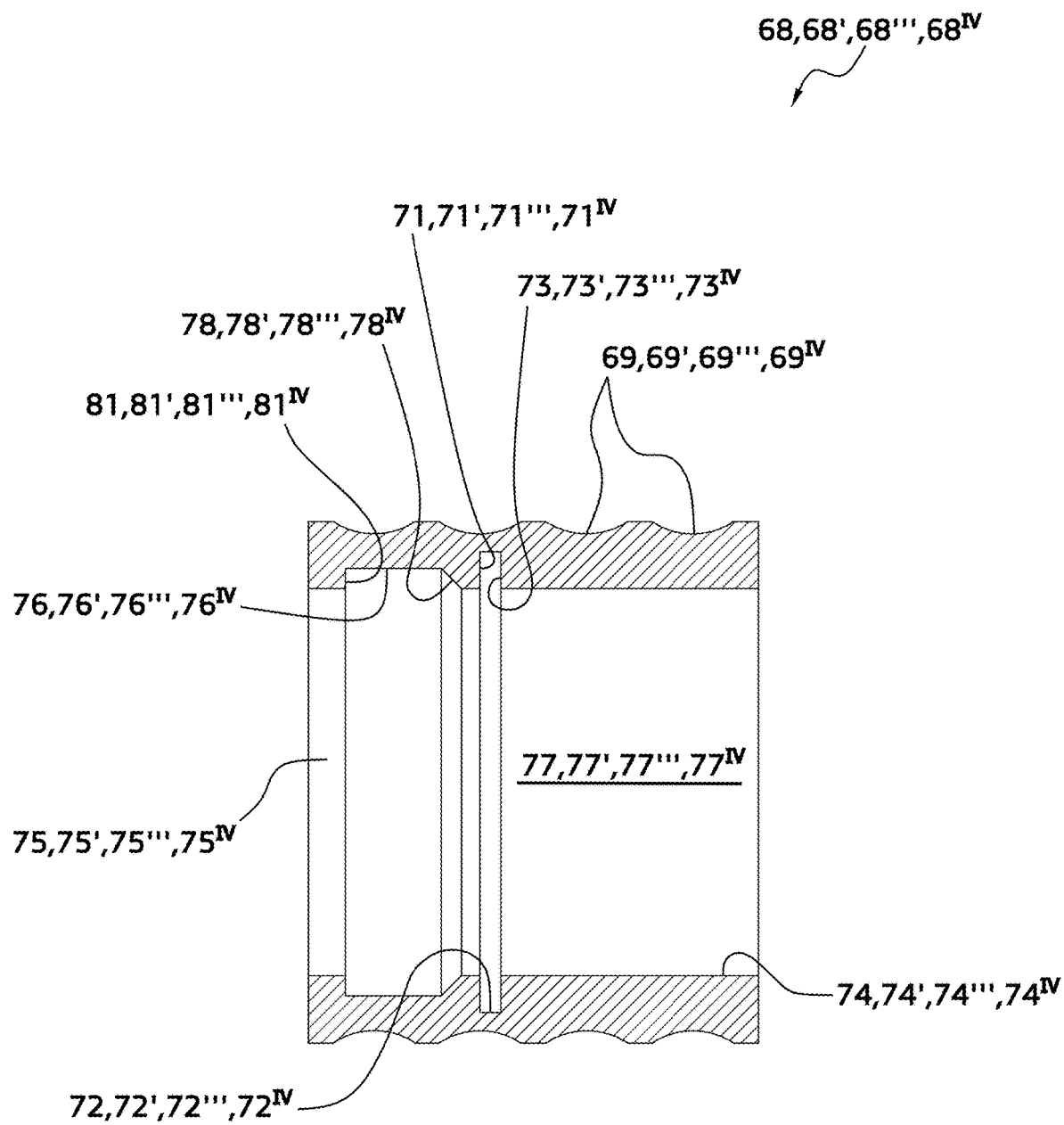
FIG. 14 is a side, sectional view of a retraction sleeve according to the embodiments of the disclosure shown in FIGS. 1, 15, 38 and 49.
Figure 15:
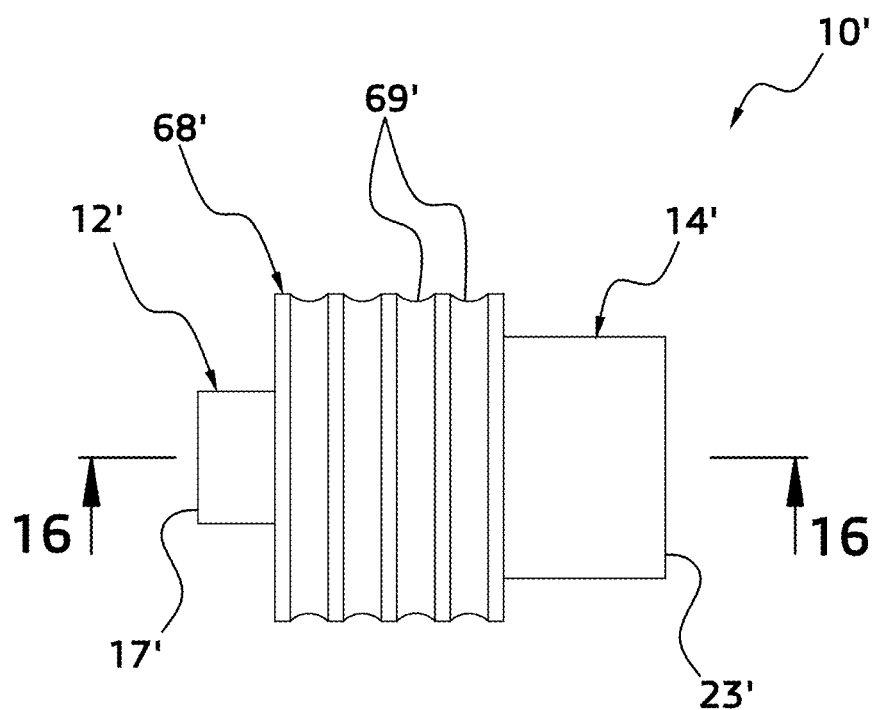
FIG. 15 is a side view of an assembled, locked quick connector according to another embodiment of the disclosure.
Figure 16:
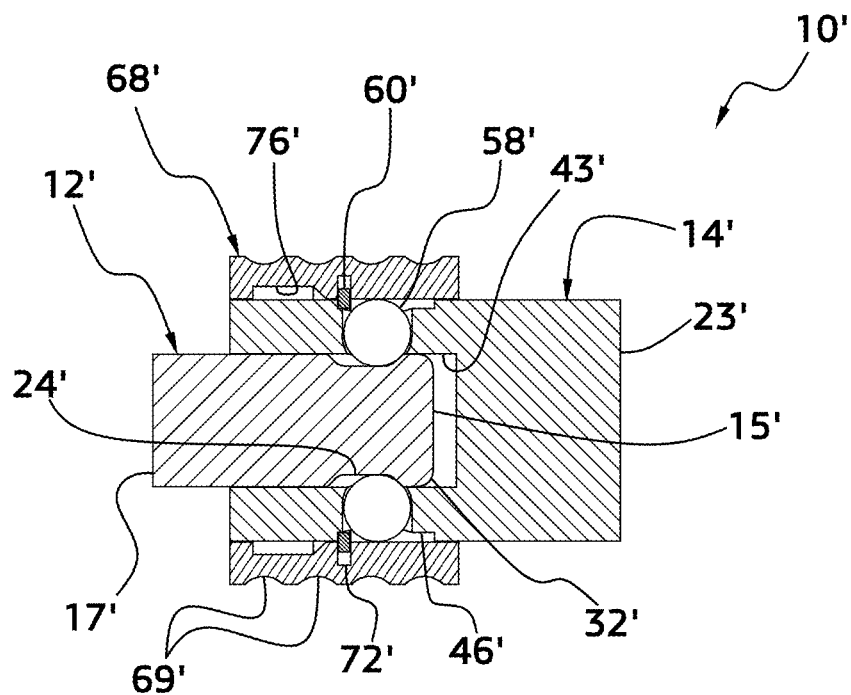
FIG. 16 is a side, sectional view of the quick connector shown in FIG. 15.
Figure 17:
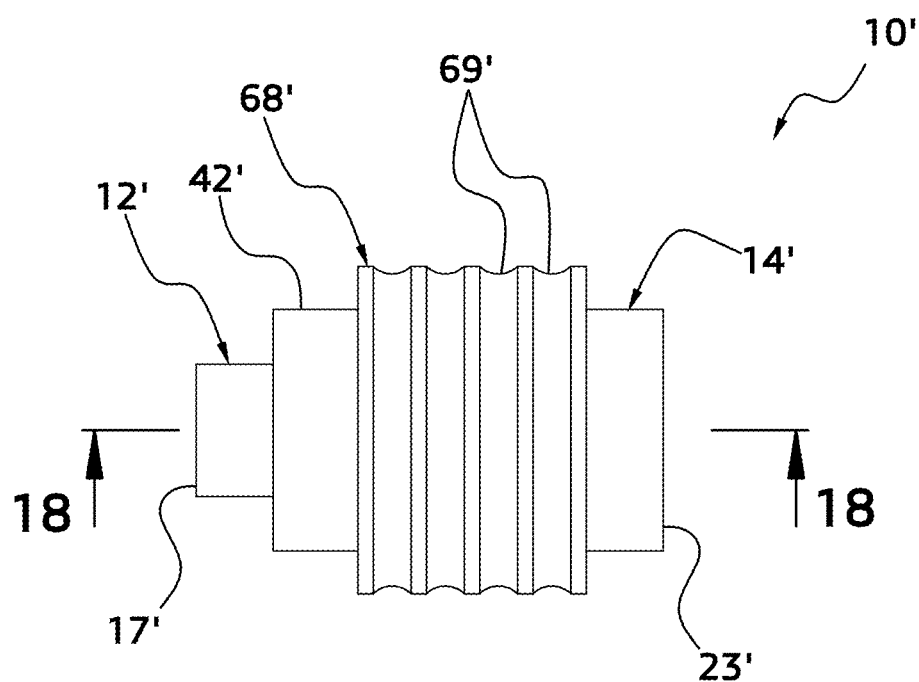
FIG. 17 is a side view of the quick connector shown in FIG. 15 in an unlocked condition.
Figure 18:
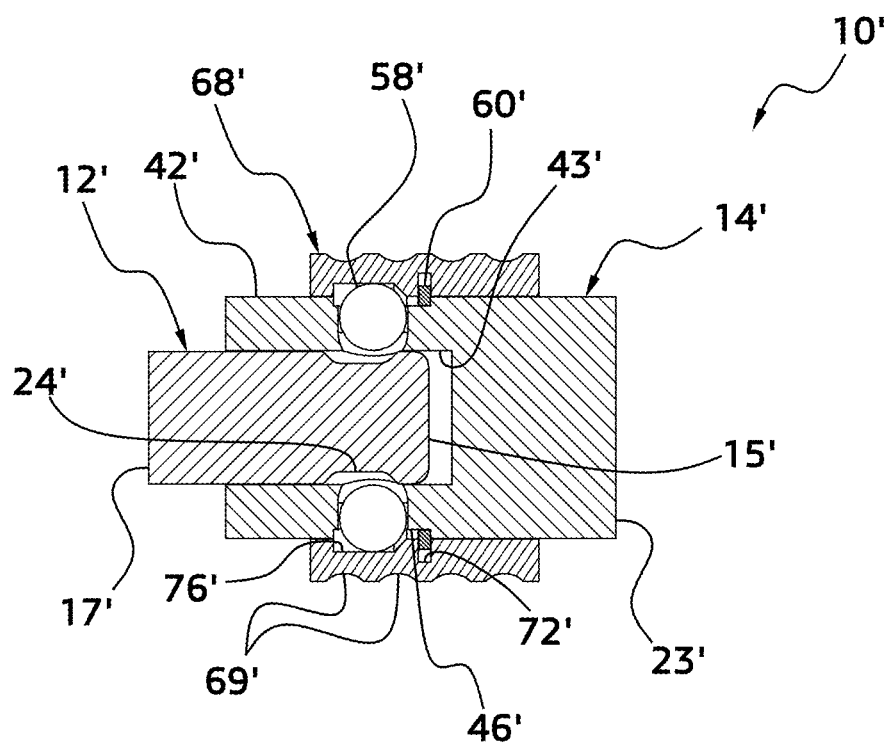
FIG. 18 is a side, sectional view of the quick connector shown in FIG. 15 in an unlocked condition.
Figures 19, 20, 21:
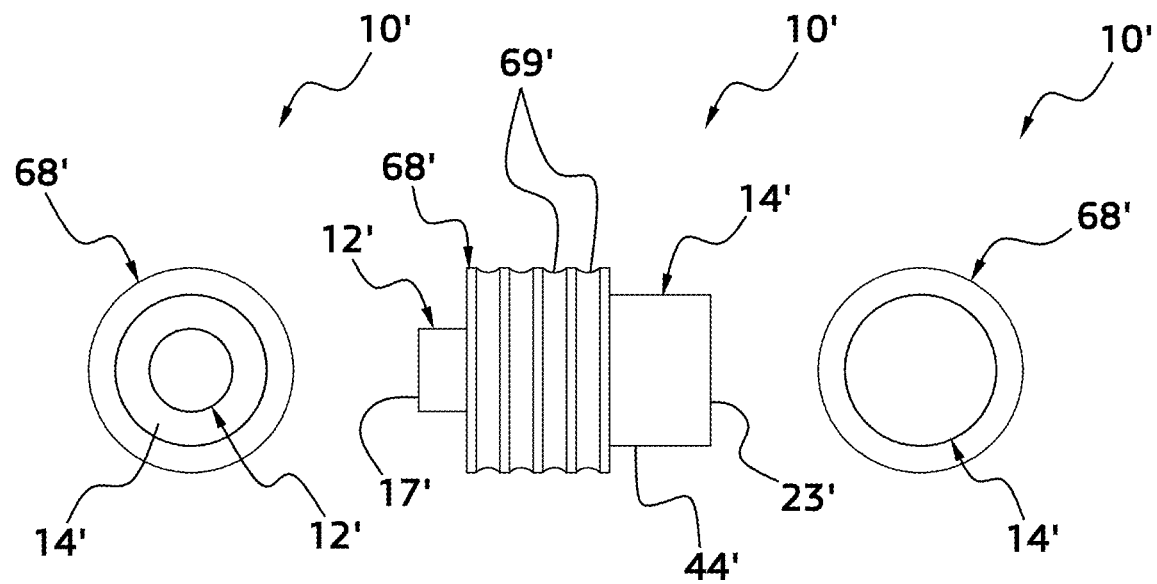
FIG. 19 is a side view of the quick connector shown in FIG. 15 in a locked position.
FIG. 20 is an end view of the quick connector shown in FIGS. 15 and 19 from a trailing end.
FIG. 21 is an end view of the quick connector shown in FIGS. 15 and 19 from a leading end.
Figures 22, 23, 24:
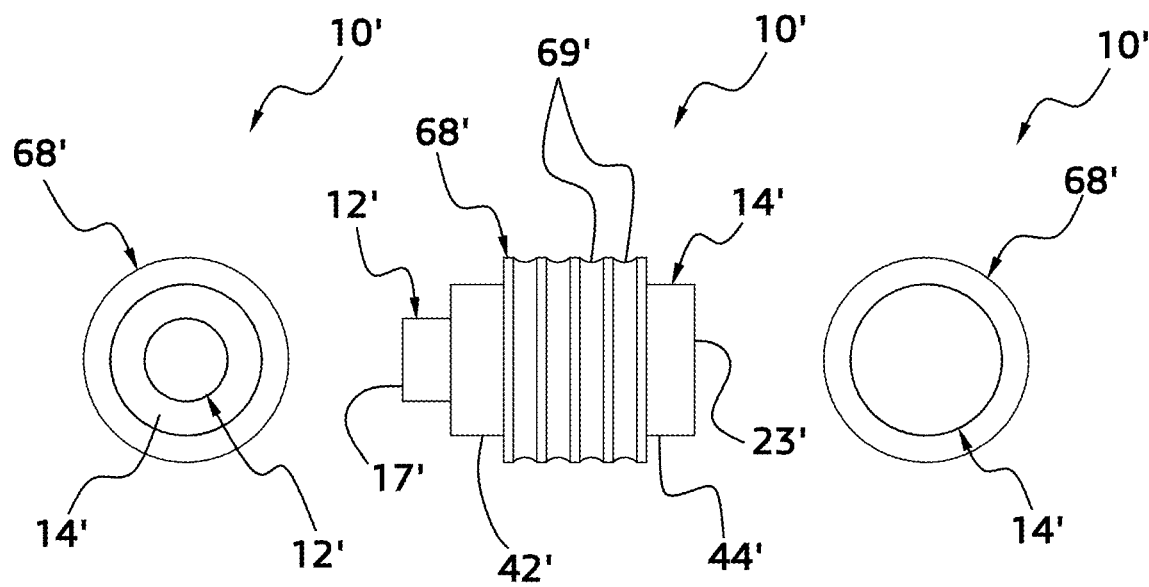
FIG. 22 is a side view of the quick connector shown in FIG. 15 in an unlocked position.
FIG. 23 is an end view of the quick connector shown in FIGS. 15 and 22 from a trailing end.
FIG. 24 is an end view of the quick connector shown in FIGS. 15 and 22 from a leading end.
Figure 25:
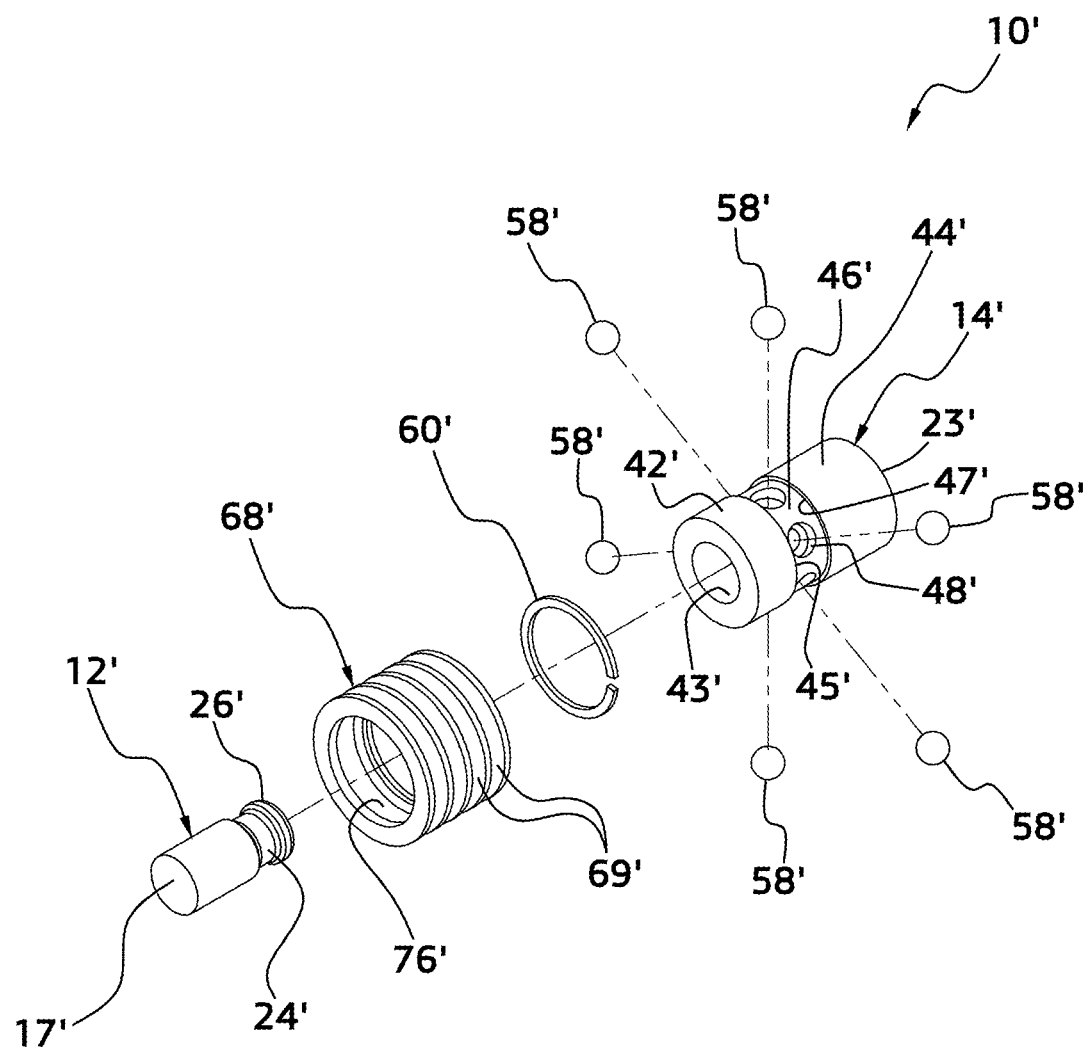
FIG. 25 is an exploded view of the quick connector shown in FIG. 15.
Figure 26:
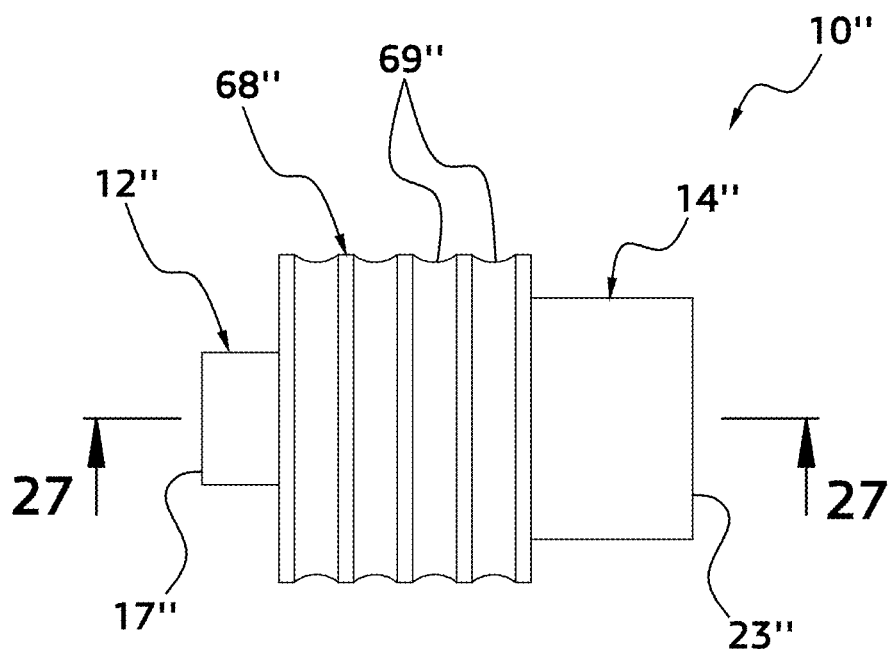
FIG. 26 is a side view of an assembled, locked quick connector according to yet another embodiment of the disclosure.
Figure 27:
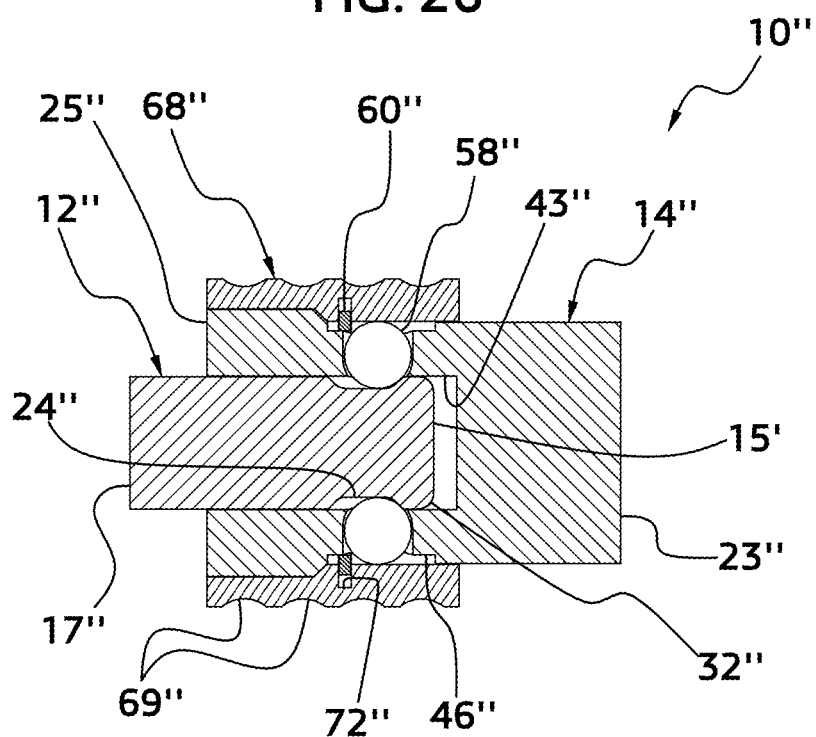
FIG. 27 is a side, sectional view of the quick connector shown in FIG. 26.
Figure 28:
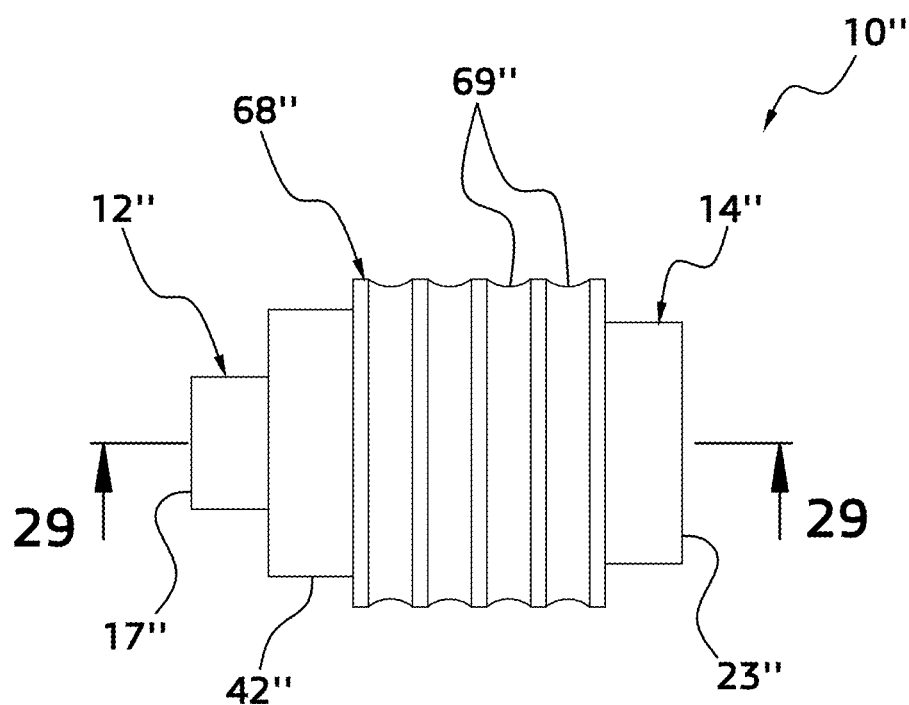
FIG. 28 is a side view of the quick connector shown in FIG. 26 in an unlocked condition.
Figure 29:
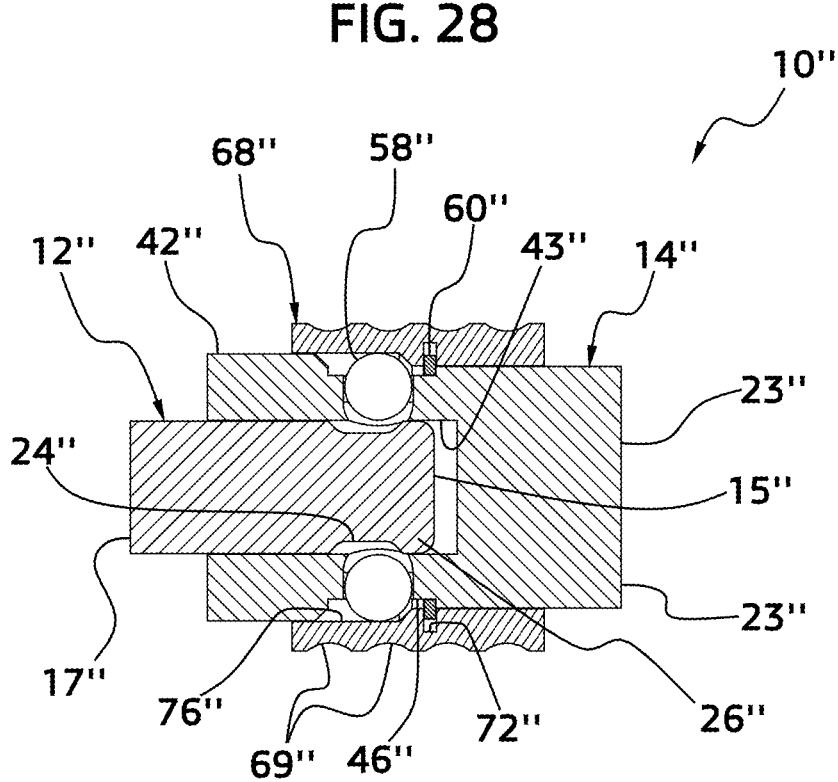
FIG. 29 is a side, sectional view of the quick connector shown in FIG. 26 in an unlocked condition.
Figures 30, 31, 32:
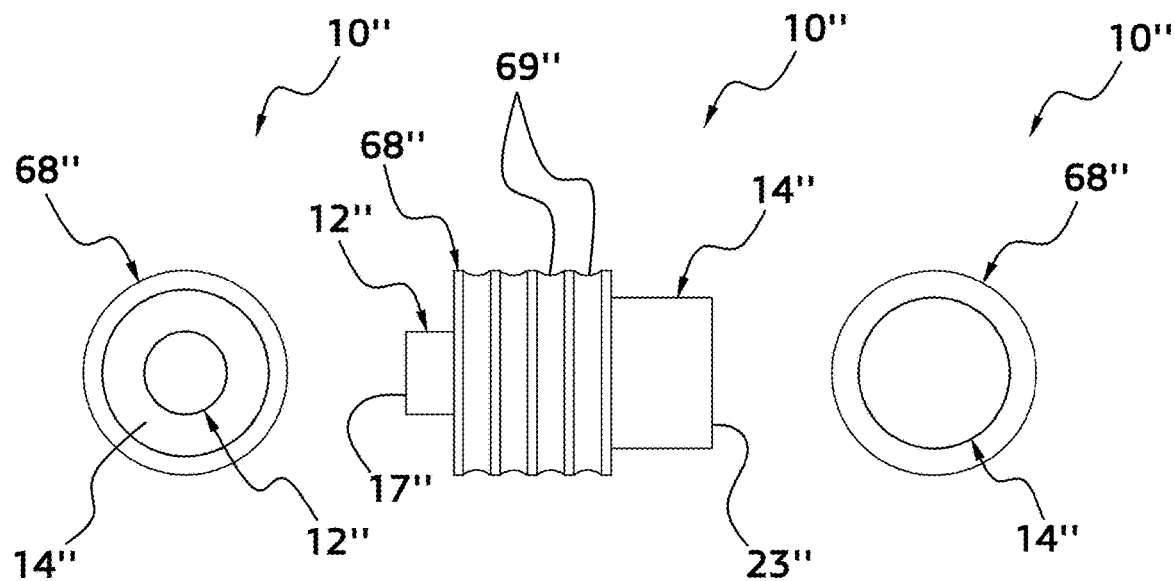
FIG. 30 is a side view of the quick connector shown in FIG. 26 in a locked position.
FIG. 31 is an end view of the quick connector shown in FIGS. 26 and 30 from a trailing end.
FIG. 32 is an end view of the quick connector shown in FIGS. 26 and 30 from a leading end.
Figures 33, 34, 35:
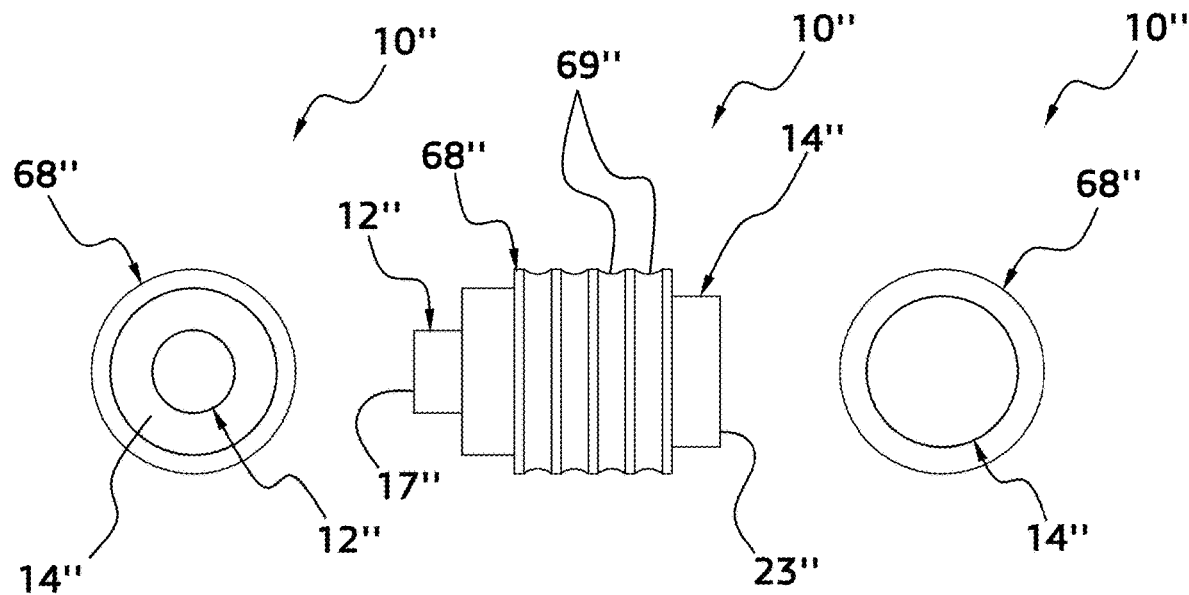
FIG. 33 is a side view of the quick connector shown in FIG. 26 in an unlocked position.
FIG. 34 is an end view of the quick connector shown in FIGS. 26 and 33 from a trailing end.
FIG. 35 is an end view of the quick connector shown in FIGS. 26 and 33 from a leading end.
Figure 36:
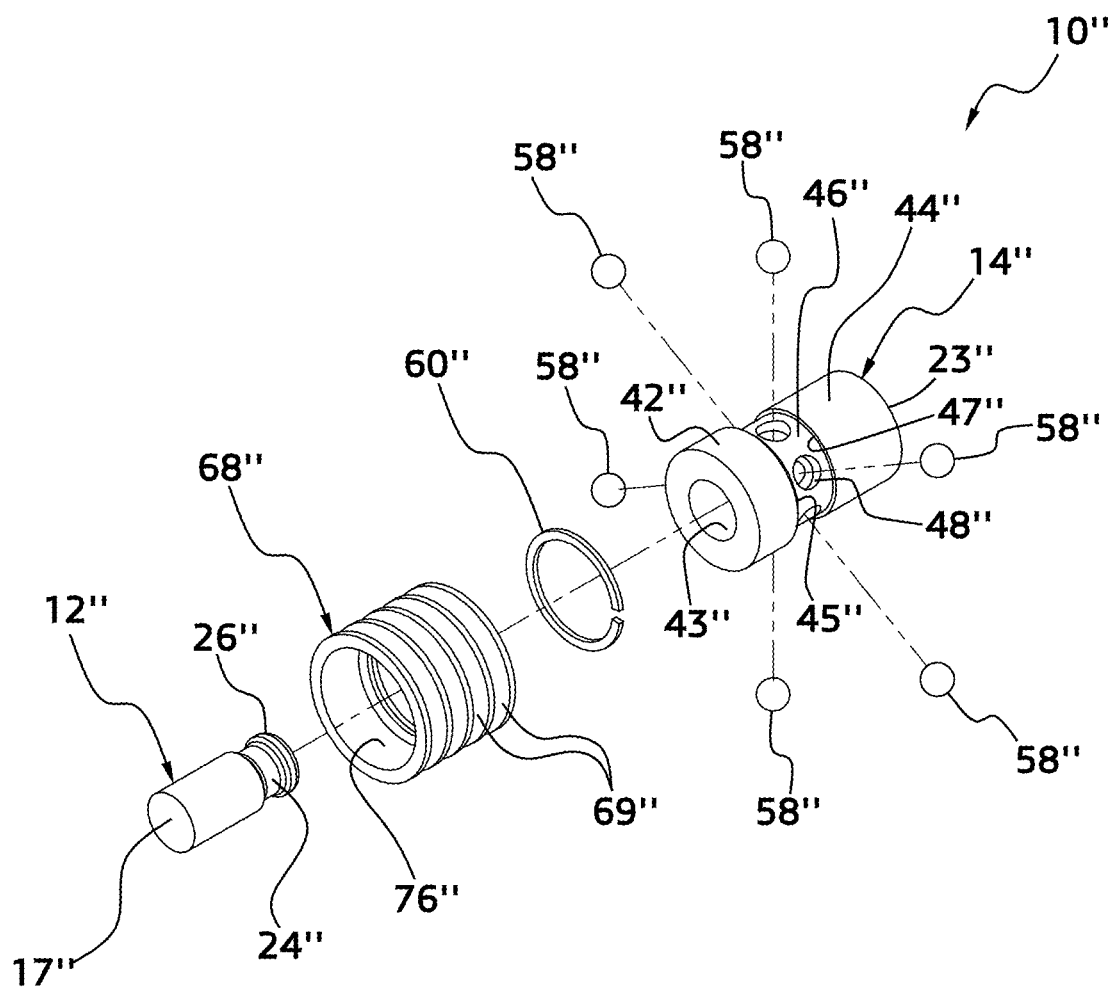
FIG. 36 is an exploded view of the quick connector shown in FIG. 26.

Similar to retraction sleeve 68 shown in FIGS. 14, retraction sleeve 68" is formed with a series of annular undulating outer surface structures 69", which also may be knurled, that facilitate digital grasp of the retraction sleeve for axial/lateral movement along female retaining coupler 14". A trailing end of retraction sleeve 68" defines a retraction sleeve trailing end aperture 75" dimensioned to have a cross-sectional diameter to fit snuggly over the circumference of trailing end segment 42" without impeding the axial translation of the retraction sleeve relative to female retaining coupler 14". A leading end of retraction sleeve 68" defines a retraction sleeve leading end aperture 79" dimensioned to have a cross-sectional diameter to fit snuggly over the circumference of leading end segment 44" without impeding the axial translation of the retraction sleeve relative to female retaining coupler 14". A retraction sleeve chamfer 78" transitions the larger cross-sectional diameter of retraction sleeve trailing end aperture 75" to the smaller cross-sectional diameter of retraction sleeve leading end aperture 79".

Trailing end aperture 75", due to its cross-sectional diameter being larger than the cross-sectional diameter of leading end aperture 79", functions as a retraction sleeve ball-bearing expansion channel. Retraction sleeve chamfer 78" functions to limit the axial travel of retraction sleeve 68" when it registers against chamfered surface 49" during lateral movement of the retraction sleeve toward female coupler trailing end 25". The cross-sectional diameter of trailing end aperture 75", when positioned radially above ball bearings 58", permits the ball bearings to move radially outwardly from ball-bearing seat apertures 48" so as to move out of ball-bearing receiving channel 24". This permits male insertion member 12" to be fully inserted into (or retracted out of) female retaining coupler 14" with leading end 15" being able to move axially past the ant-apex point of the ball bearings into the fully-seated, locking position or into a fully retracted position.

Retraction sleeve chamfer 78" has a dual function. Its first function is to limit the axial travel of retraction sleeve 68" when it registers against chamfered surface 49" during lateral movement of the retraction sleeve toward female coupler trailing end 25". Its second function is to facilitate axial movement of retraction sleeve 68" over ball bearings 58" from an unlocked position to a locked position. As stated more generally herein, chamfer 78" transitions trailing end aperture 75" to leading end aperture 79". More particularly, chamfer 78" transitions trailing end aperture 75" to a main retraction sleeve aperture 77" defined by retraction sleeve inner wall 74". Main retraction sleeve aperture 77" has substantially the same cross-sectional diameter as retraction sleeve leading end aperture 79". The retraction sleeve material that forms chamfer 78" also functions as a retaining-ring retention wall as explained in more detail below.

Extending radially outwardly from retraction sleeve inner wall 74" is an annular retaining-ring slot 72". Retaining-ring slot 72" is positioned adjacent to, or proximal to, the leading end of chamfer 78" and extends radially outwardly beyond the leading end of chamfer 78". The width and diameter of retaining-ring slot 72" is set to receive a retaining ring 60" and to permit the retaining ring to expand radially outwardly in the slot. In a relaxed positioned, the outer diameter of retaining ring 60" will be smaller than the diameter of retaining-ring slot 72". The inner diameter of retaining ring 60" is set such that retaining ring 60" will always register against annular retaining-ring walls, a trailing retaining-ring wall 71" and a leading retaining-ring wall 73" defining slot 72", that function as retaining-ring lateral restriction surfaces to maintain retaining ring 60" in a substantially stable lateral orientation relative to retraction sleeve 68" regardless whether retaining ring 60" is in either a relaxed or a radially expanded state.

Like retaining ring 60, retaining ring 60" is a thin, substantially circular or spiral metallic or polymer ring that has certain resiliency and deflection characteristics such as high tensile strength and fatigue resistance. Retaining ring 60" is a discontinuous ring (circular or spiral) as there is a break in the ring that permits the ring to be flexed and placed over a cylindrical body such as female retaining coupler 14. The retaining ring may have an inner diameter substantially the same as the cross-sectional diameter of retaining ring travel-limiting channel 46". The inner diameter may also be larger so as not to create any radial expansion or may have a smaller diameter to be under constant radial stress when placed over retaining ring travel-limiting channel 46". If the inner diameter of retaining ring 60" is set to be in constant registration with retaining channel 46" without any radial stress imparted by registration against retaining channel 46", the function of the retraction sleeve/retaining ring/retaining channel combination can be optimized for purposes of reliability and durability.

Trailing retaining ring travel-limiting channel shoulder 45" and leading retaining ring travel-limiting channel shoulder 47" that define the lateral borders of retaining channel 46", further function as lateral axial stops for retaining ring 60". By fixing the lateral orientation of retaining ring 60" to retraction sleeve 68", lateral movement of the retraction sleeve will result in a corresponding lateral movement of retaining ring 60" relative to female retaining coupler 14". Because quick-connect coupler 10" is constructed without an axial compression spring, the relative lateral position of retraction sleeve 68" to female coupler 14" can be set to one of two positions.

In a first, unlocked position, retraction sleeve 68" is positioned such that retaining ring 60" is positioned adjacent to and/or registered against, leading retaining ring travel-limiting channel shoulder 47". In this position, retaining ring 60" will be in a relaxed, unstrained condition. Trailing end aperture 75" will be positioned about, and in the same plane occupied by, ball bearings 58". With ball bearings 58" aligned with trailing end aperture 75", the ball bearings will be free to migrate radially out of ball-bearing seat apertures 48". This will further enable male insertion member 12" to be freely inserted into, or retracted from, the internal apertures of female retaining coupler 14" as the ball bearings will not create a mechanical barrier to male insertion member insertion or retraction.

Operationally, with retraction sleeve 68" in the first, unlocked position, male insertion member 12" can be inserted into female retaining coupler 14" until ball-bearing receiving channel 24" aligns with ball-bearings 58". When this alignment is achieved, ball bearings 58" will reseat in ball-bearing seat apertures 48" depending upon gravitational effects on the ball bearings. Those vertically above the male insertion member will drop and register against ball-bearing receiving channel 24" of male insertion member 12". Those below will remain registered against the surface of trailing end aperture 75".

To lock male insertion member 12" to female retaining coupler 14", retraction sleeve 68" is urged toward trailing end 25" of the female retaining coupler. As the retraction sleeve is advanced toward the trailing end, chamfer 78" will register against ball bearings 58" and urge the ball bearings into a fully seated position in ball-bearing seat apertures 48". The chamfered surface facilitates the movement of the ball bearings radially inwardly as the lateral movement of retraction sleeve 68" advances. In this position, ball bearings 58" will essentially be positioned registered against, or adjacent to, ball-bearing receiving channel 24". The shape of channel 24" and the force applied to the ball bearings by chamfer 78" captures the ball bearings between the leading and trailing ends of ball-bearing receiving channel 24" to lock the lateral orientation of male insertion member 12" to female retaining coupler 14". This combination of features creates a mechanical restriction to keep male insertion member 12" fully seated inside female retaining coupler 14". This "tightness" of the fit between the male insertion member and the female retaining coupler will be determined by the dimensional tolerances of the parts in registration, i.e., the ball bearings, ball bearing seat apertures and ball-bearing receiving channel.

To maintain the locked condition of the components, retraction sleeve 68" is advanced further toward female coupler trailing end 25" so that retaining ring 60" registers against the radiused surfaces of ball bearings 58". The lateral force applied to the retraction sleeve causes retaining ring 60" to radially expand within slot 72" to pass over the apexes of ball bearings 58". As retaining ring 60" passes the ball-bearing apexes, the retaining ring follows the radiused contours of the ball bearings down to its relaxed dimensional state. At this point, retaining ring 60" is located between trailing retaining ring travel-limiting channel shoulder 45" and ball bearings 58". Also at this point, chamfer 78" will register against chamfered surface 49" so as to limit lateral movement of retraction sleeve 68" toward female coupler trailing end 25". The registration of chamfer 78" against chamfered surface 49" will limit lateral travel of retraction sleeve 68" toward female coupler trailing end 25".

With retaining ring 60" adjacent trailing retaining ring travel-limiting channel shoulder 45", retraction sleeve 68" is now in its second position, the locked position. In this position, the apexes of ball bearings 58" are now registered against retraction sleeve leading end aperture 79" that urges the ball bearings into a fully seated position in ball-bearing seat apertures 48". In this orientation, ball bearings 58" create a mechanical restriction between female retaining coupler 14" and male insertion member 12" via an interference fit with ball-bearing receiving channel 24" to maintain the two components in a locked configuration.

In similar fashion to the unlocking process used to unlock quick-connect couplers 10 and 10', to unlock quick-connect coupler 10", retraction sleeve 68" is urged laterally toward female coupler leading end 23" to essentially reverse the locking process. A positive lateral force toward female coupler leading end 23" has to be applied to retraction sleeve 68" to force registration of the leading surface of retaining ring 60" against the trailing radiused surfaces of ball bearings 58". As the retraction sleeve is advanced further toward female coupler leading end 23", retaining ring 60" is forced to expand radially outwardly within slot 72" over the ball bearing surfaces. After passing the apexes of the ball bearings, retaining ring 60" will follow the leading radiused surface of ball bearings 58" back to an unexpanded relaxed condition between the ball bearings and leading retaining ring travel-limiting channel shoulder 47". In this position, trailing end aperture 75' will now again be positioned in alignment with the plane occupied by ball bearings 58" that permits the ball bearings to move radially outwardly away from ball-bearing seat apertures 48". Male insertion member 12" can now be freely removed from within female retaining coupler 14".

Referring now to FIGS. 38-48, in a further aspect of the disclosure, a quick-connect coupler, shown generally as 10''', includes in its most general aspect a male insertion member 12''' and a female retaining coupler 14'''. Quick-connect coupler 10''' is designed to function purely as a quick-connect coupler for applications that do not involve fluid transmission but simply involve the connection of two objects. As such, the quick-connect coupler of this embodiment does not require any fluid-tight or air-tight sealing components.

Male insertion member 12''' defines a generally elongate cylindrical shape and includes a leading end 15''' and a trailing end 80 described in more detail herein. An annular ball-bearing receiving channel 24''' is formed proximal to leading end 15'''. Ball-bearing receiving channel 24''' has a cross-sectional diameter smaller than the cross-sectional diameter of the main body of male insertion member 12'''. Leading and trailing ends of ball-bearing receiving channel 24''' may form shoulders orthogonal to the axial axis of male insertion member 12''' or may be formed with sloped or radiused surfaces to provide a smooth transition from the outer surface of male insertion member 12''' to the outer surface of ball-bearing receiving channel 24'''. Such radiused surfaces also may conform to the radiused shapes of ball bearings 58''' described in more detail below. Leading end 15''' may have an annular chamfer 32''' to facilitate insertion into female retaining coupler 14'''.

Female retaining coupler 14''' has a substantially cylindrical trailing end segment 42''' and a substantially cylindrical leading end segment 44''' along with a female coupler leading end 82, described in more detail herein, and a female coupler trailing end 25'''. The cross-sectional diameters of trailing end segment 42''' and leading end segment 44''' are substantially the same. These trailing and leading end segments combine with an intermittent retaining ring travel-limiting channel 46''', described in more detail below, to define a male-member retaining bore 43''' that does not extend through the entire length of female retaining coupler 14'''. Male-member retaining bore 43''' ends within leading end segment 44'''. It should be understood that the depth of retaining bore 43''' can be varied and remain within the scope of the disclosure. Formed in a circular pattern within the inner wall of female retaining coupler 14''' that defines male-member retaining bore 43''' are a plurality of ball-bearing seat apertures 48'''. The cross-sectional diameter of ball-bearing seat apertures 48''' are set to be smaller than the cross-sectional diameter of ball-bearings 58''', described in more detail below, positioned in the ball-bearing seat apertures from an outside surface of female retaining member 14'''. With this dimensional relationship, portions of the ball bearings, when seated in seat apertures 48''', extend into the space defined by male-member retaining bore 43'''. The importance of this configuration is explained in detail below.

Female retaining coupler 14''' has further portions that define a retaining ring travel-limiting channel 46''' that extends radially inwardly from an outer surface of female retaining coupler 14'''. Retaining ring travel-limiting channel 46''' is bordered by trailing end segment 42''' and a leading segment 44''' that has the same cross-sectional diameter as trailing end segment 42'''. The junction of trailing end segment 42''' and retaining ring travel-limiting channel 46''' forms a trailing retaining ring travel-limiting channel shoulder 45'''. The junction of leading segment 44''' and retaining ring travel-limiting channel 46''' forms a leading retaining ring travel-limiting channel shoulder 47'''. The planes occupied by both shoulders 45''' and 47''' may be substantially orthogonal to an axial axis of quick-connect coupler 10''', or may have a tapered or radiused profile. The former orthogonal configuration of the shoulders provides positive end-stops for the travel of a retraction sleeve disclosed in more detail below.

As previously described, ball-bearing seat apertures 48''' are formed within the inner wall of female retaining coupler 14''' that defines male-member retaining bore 43'''. The location of seat apertures 48''' also are positioned within retaining ring travel-limiting channel 46''' and are arranged in a circular pattern about retaining channel 46''' in a substantially equally spaced arrangement to evenly disperse the forces imparted on male insertion member 12''' and female retaining coupler 14''' when connected. The location of ball-bearing seat apertures 48''' may be biased toward trailing retaining ring travel-limiting channel shoulder 45''' that represents the locked side of ball bearings 58''' as explained in more detail herein. It should be understood that the spatial orientation of the ball-bearing seat apertures relative to trailing retaining ring travel-limiting channel shoulder 45''' and leading retaining ring travel-limiting channel shoulder 47''' may be varied including being situated equidistant from the shoulders and remain within the scope of the disclosure.

To maintain ball bearings 58''' in ball-bearing seat apertures 48''', a retraction sleeve 68''' is superposed about female retaining coupler 14'''. Retraction sleeve 68''' is substantially cylindrical in shape and dimensioned to have an inner wall diameter larger than the outer diameter of trailing end segment 42''' and leading segment 44'''. Similar to retraction sleeve 68 shown in FIG. 14, retraction sleeve 68''' is formed with a series of annular undulating outer surface structures 69''', which also may be knurled, that facilitate digital grasp of the retraction sleeve for axial movement along female retaining coupler 14'''. A trailing end of retraction sleeve 68''' defines a retraction sleeve trailing end aperture 75''' dimensioned to have a cross-sectional diameter to fit snuggly over the circumferences of trailing end segment 42''' and leading segment 44''' without impeding the axial translation of the retraction sleeve relative to the female retaining coupler.

The length of retraction sleeve 68''' can be the same as, longer than, or shorter than, the length of female retaining coupler 14'''. If made longer than the axial length of the body of female retaining coupler 14''', i.e., the distance between trailing end 25''' and female tube stop shoulder 49''', when positioned in either a locked or unlocked position, a trailing end of retraction sleeve 68''' may be coplanar with trailing end 25''' or a leading end of retraction sleeve 68''' will be coplanar with female tube stop shoulder 49'''. This provides a visual aid to let the user know in which position, locked or unlocked, the retraction sleeve is in. It also facilitates grasping the retraction sleeve as the end of the retraction sleeve that extends beyond the body of female retaining coupler 14''' allows fingers to overhang the extended edge without contacting the female retaining coupler to facilitate axial movement of the retraction sleeve to the other extreme position. Once in the other position, the end that was pushed will now be coplanar with an end of the female retaining coupler and the other end of the retraction sleeve will overhang the other end of the female retaining coupler to again alert the user as to which position the retraction sleeve is in.

Formed adjacent to, and in fluid communication with, trailing end aperture 75''' is a retraction sleeve ball-bearing expansion channel 76'''. Expansion channel 76''' extends radially outwardly from an inner wall of retraction sleeve 68''' and has a cross-sectional diameter greater than the cross-sectional diameter of retraction sleeve trailing end aperture 75'''. A retraction sleeve transition shoulder 81''' formed by the junction of retraction sleeve trailing end aperture 75''' and retraction sleeve ball-bearing expansion channel 76''' functions to limit the axial travel of ball bearings 58''' relative to female retaining coupler 14'''. The cross-sectional diameter of retraction sleeve ball-bearing expansion channel 76''', when positioned radially above ball bearings 58''', permits the ball bearings to move radially outwardly from ball-bearing seat apertures 48''' so as to move out of male-member retaining bore 43'''. This permits male insertion member 12''' to be fully inserted into female retaining coupler 14''' with leading end 15''' being able to move axially past the ant-apex point of the ball bearings into the fully-seated, locking position.

A leading end of retraction sleeve ball-bearing expansion channel 76''' is formed with a slope or chamfer 78''' that facilitates axial movement of retraction sleeve 68''' over ball bearings 58''' from a locked position to an unlocked position. Chamfer 78''' transitions expansion channel 76''' to a main retraction sleeve aperture 77''' defined by retraction sleeve inner wall 74'''. Main retraction sleeve aperture 77''' has substantially the same cross-sectional diameter as retraction sleeve trailing end aperture 75'''. The retraction sleeve material that forms chamfer 78''' also functions as part of a retaining-ring retention wall as explained in more detail below.

Extending radially outwardly from retraction sleeve inner wall 74''' is an annular retaining-ring slot 72'''. Retaining-ring slot 72''' is positioned proximal to the leading end of chamfer 78''' and extends radially outwardly beyond the leading end of chamfer 78'''. The width and diameter of retaining-ring slot 72''' is set to receive a retaining ring 60''' so as to limit the axial or lateral displacement of the retaining ring within retraction sleeve 68'' and to permit the retaining ring to expand radially outwardly in the slot. In a relaxed positioned, the outer diameter of retaining ring 60''' will be smaller than the diameter of retaining-ring slot 72''' and larger than the cross-sectional diameter of main retraction sleeve aperture 77'''. The thickness of retaining ring 60''' is set such that retaining ring 60''' will at least loosely register against annular retaining-ring walls, a trailing retaining-ring wall 71''' and a leading retaining-ring wall 73''' that define slot 72'''.

The retaining-ring walls function as retaining-ring lateral restriction surfaces to maintain retaining ring 60''' in a substantially stable lateral orientation relative to retraction sleeve 68''' regardless whether retaining ring 60''' is in either a relaxed or radially expanded state. The looseness of the registration of retaining ring 60''' with the retaining-ring walls is to ensure the retaining ring can freely expand radially and retract radially without the walls forming any type of restriction or impediment to these retaining-ring functions.

Like retaining ring 60, retaining ring 60''' is a thin, substantially circular or spiral metallic or polymer ring that has certain resiliency and deflection characteristics such as high tensile strength and fatigue resistance. Retaining ring 60''' is a discontinuous ring (circular or spiral) as there is a break in the ring that permits the ring to be flexed and placed over a cylindrical body such as female retaining coupler 14'''. The retaining ring may have an inner diameter substantially the same as the cross-sectional diameter of retaining ring travel-limiting channel 46'''. The inner diameter may also be larger so as not to create any radial expansion or may have a smaller diameter to be under constant radial stress when placed over retaining ring travel-limiting channel 46'''. If the inner diameter of retaining ring 60''' is set to be in constant registration with retaining channel 46''' without any radial stress imparted by registration against retaining channel 46''', the function of the retraction sleeve/retaining ring/retaining channel combination can be optimized for purposes of reliability and durability.

Trailing retaining ring travel-limiting channel shoulder 45''' and leading retaining ring travel-limiting channel shoulder 47''' that define the lateral borders of retaining channel 46''', further function as lateral axial stops for retaining ring 60'''. By fixing the lateral orientation of retaining ring 60''' to retraction sleeve 68''', movement of the retraction sleeve will result in a corresponding lateral movement of retaining ring 60''' relative to female retaining coupler 14'''. Because quick-connect coupler 10''' is constructed without an axial compression spring, the relative lateral position of retraction sleeve 68''' to female coupler 14''' can be set to one of two positions.

In a first, unlocked position, retraction sleeve 68''' is positioned such that retaining ring 60''' is positioned adjacent to and/or registered against, leading retaining ring travel-limiting channel shoulder 47'''. In this position, retaining ring 60''' will be in a relaxed, unstrained condition. Retraction sleeve ball-bearing expansion channel 76''' will be positioned about, and in the same plane occupied by, ball bearings 58'''. With ball bearings 58''' aligned with expansion channel 76''', the ball bearings will be free to migrate radially out of ball-bearing seat apertures 48'''. This will further enable male insertion member 12''' to be freely inserted into, or retracted from, the internal apertures of female retaining coupler 14'''.

Operationally, with retraction sleeve 68''' in the first, unlocked position, male insertion member 12''' can be inserted into female retaining coupler 14''' until ball-bearing receiving channel 24''' aligns with ball-bearings 58'''. When this alignment is achieved, ball bearings 58''' will reseat in ball-bearing seat apertures 48''' depending upon gravitational effects on the ball bearings. Those vertically above the male insertion member will drop and register against ball-bearing receiving channel 24' of male insertion member 12'''. Those below will remain registered against the surface of retraction sleeve ball-bearing expansion channel 76'''.

To lock male insertion member 12''' to female retaining coupler 14''', retraction sleeve 68''' is urged toward trailing end 25''' of the female retaining coupler. As the retraction sleeve is advanced toward the trailing end, chamfer 78''' will register against ball bearings 58''' and urge the ball bearings into a fully seated position in ball-bearing seat apertures 48'''. The chamfered surface facilitates the movement of the ball bearings radially inwardly as the lateral movement of retraction sleeve 68''' advances. In this position, ball bearings 58''' will essentially be positioned registered against, or adjacent to, ball-bearing receiving channel 24'''. The shape of channel 24''' and the force applied to the ball bearings by chamfer 78''' wedges the ball bearings between the leading and trailing ends of ball-bearing receiving channel 24''' to lock the lateral orientation of male insertion member 12''' to female retaining coupler 14'''. This combination of features creates a mechanical restriction to keep male insertion member 12''' fully seated inside female retaining coupler 14'''.

To maintain the locked condition of the components, retraction sleeve 68''' is advanced further toward female coupler trailing end 25''' so that retaining ring 60''' registers against the radiused surfaces of ball bearings 58'''. The lateral force applied to the retraction sleeve causes retaining ring 60''' to radially expand within slot 72''' to pass over the apexes of ball bearings 58'''. As retaining ring 60''' passes the ball-bearing apexes, the retaining ring follows the radiused contours of the ball bearings down to its relaxed dimensional state. At this point, retaining ring 60''' is located between trailing retaining ring travel-limiting channel shoulder 45''' and ball bearings 58'''. This is the second position of retraction sleeve 68'''. In this position, the apexes of ball bearings 58''' are now registered against retraction sleeve inner wall 74''' that urges the ball bearings into a fully seated position in ball-bearing seat apertures 48'''. In this orientation, ball bearings 58''' create a mechanical restriction between female retaining coupler 14''' and male insertion member 12''' via an interference fit with ball-bearing receiving channel 24''' to maintain the two components in a locked configuration.

In a similar fashion to quick-connect couplers 10, 10' and 10'', to unlock quick-connect coupler 10''', retraction sleeve 68''' is urged laterally toward female coupler leading end 82 to essentially reverse the locking process. Because a compression spring is not used to set the lateral resting position of the retraction sleeve, a positive lateral force has to be applied to retraction sleeve 68''' to force registration of the leading surface of retaining ring 60''' against the trailing radiused surfaces of ball bearings 58'''. As the retraction sleeve is advanced further toward female coupler leading end 82, retaining ring 60''' is forced to expand radially outwardly within slot 72''' over the ball bearing surfaces. After passing the apexes of the ball bearings, retaining ring 60''' will follow the leading radiused surface of ball bearings 58''' back to an unexpanded relaxed condition between the ball bearings and leading retaining ring travel-limiting channel shoulder 47'''. In this position, retraction sleeve ball-bearing expansion channel 76''' will now again be positioned in alignment with the plane occupied by ball bearings 58''' that permits the ball bearings to move radially outwardly away from ball-bearing seat apertures 48'''. Male insertion member 12''' can now be freely removed from within female retaining coupler 14'''.

Figure 37:
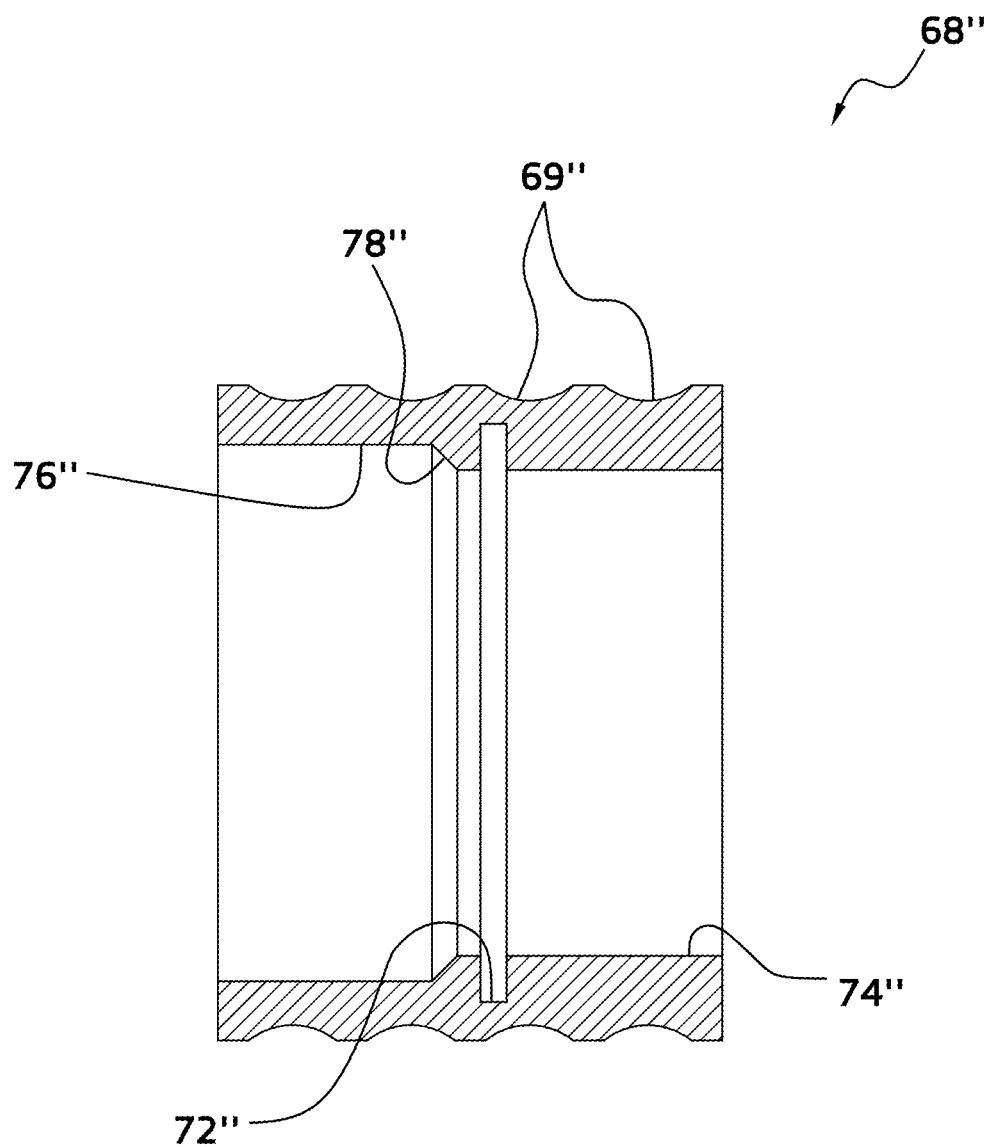
FIG. 37 is a side, sectional view of a retraction sleeve according to the embodiment of the disclosure shown in FIG. 26.
Figure 38:
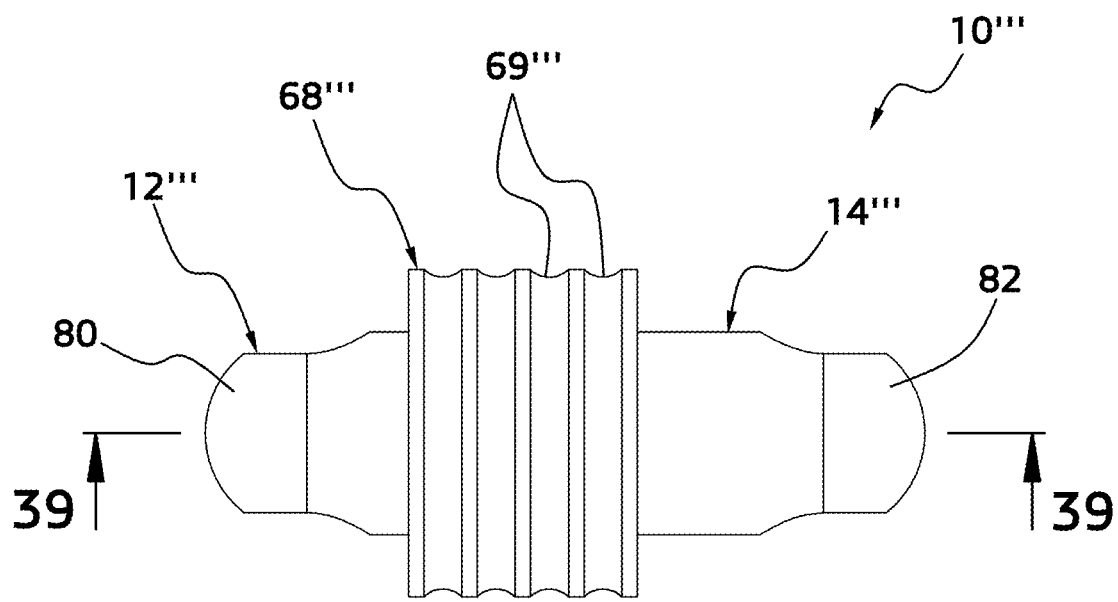
FIG. 38 is a side view of an assembled, locked quick connector according to a further embodiment of the disclosure.
Figure 39:
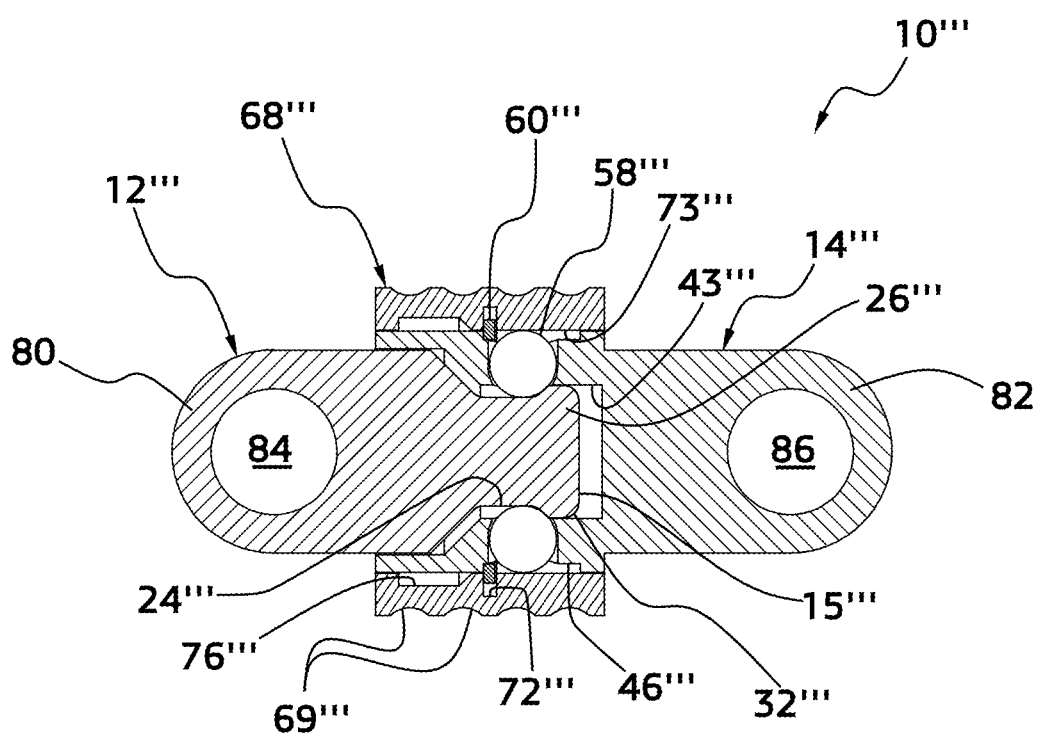
FIG. 39 is a side, sectional view of the quick connector shown in FIG. 38.
Figure 40:
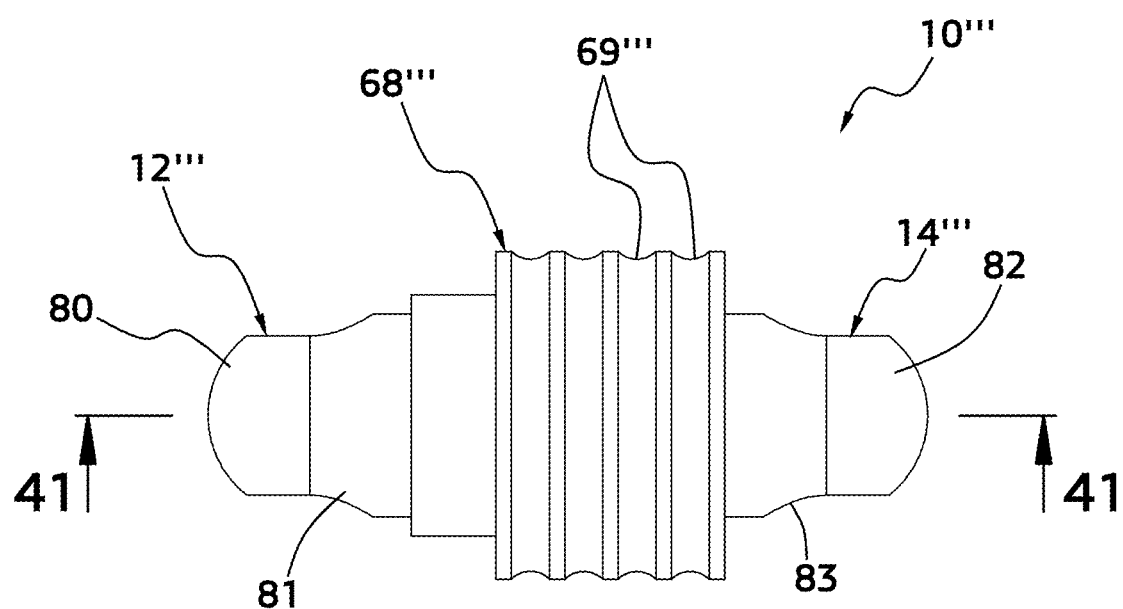
FIG. 40 is a side view of the quick connector shown in FIG. 38 in an unlocked condition.

In this embodiment, male insertion member tailing end is a modification of male insertion member trailing end 17' of male insertion member 12'. Male insertion member trailing end 80 is formed with a hemispherical end and may be modular or formed as a continuous trailing end of male insertion member 12'''. It should be understood that the shape of trailing end 80 may conform to any regular or irregular geometric shape and remain within the scope of the disclosure. A male insertion member trailing end through-bore 84 is formed in trailing end 80 to permit the attachment of rings, strings or other elements to quick-connect coupler 10'''. Trailing end through-bore 84 can be formed substantially orthogonal to the axial axis of male insertion member 12'''. The cross-sectional diameter of trailing end through-bore 84 can be set accommodate a particular application such as a key chain. In similar fashion, the cross-sectional diameter of male insertion member trailing end 80 may be dimensioned to be smaller than the cross-sectional diameter of male insertion member 12''' as shown in FIG. 37, or dimensioned to be larger than the cross-sectional diameter of male insertion member 12'''.

Figure 41:
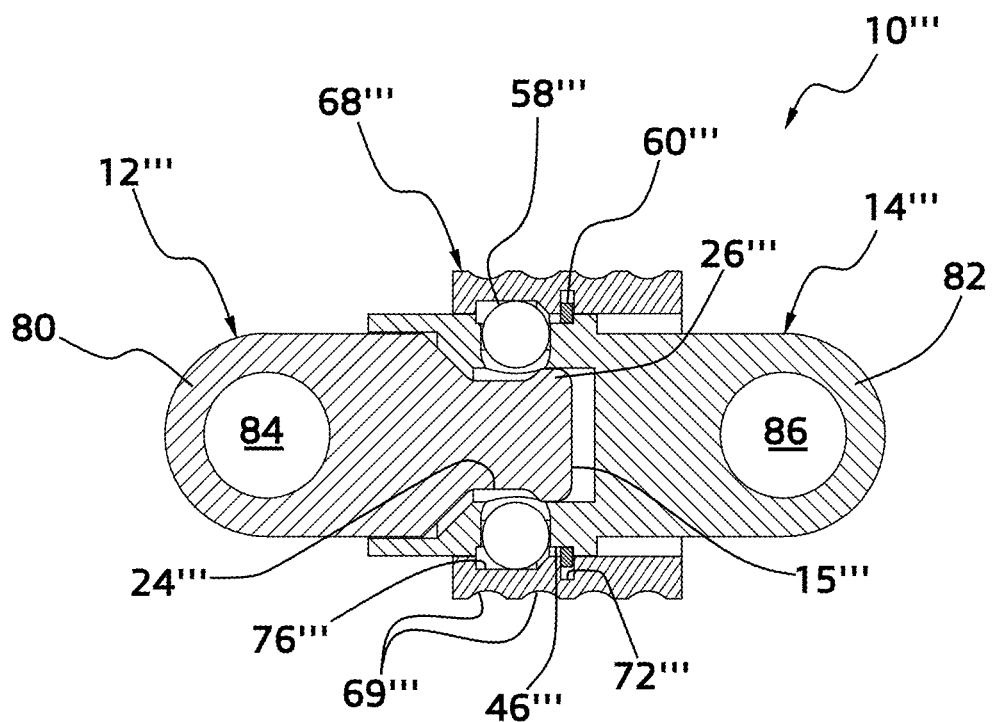
FIG. 41 is a side, sectional view of the quick connector shown in FIG. 38 in an unlocked condition.
Figures 42, 43, 44:
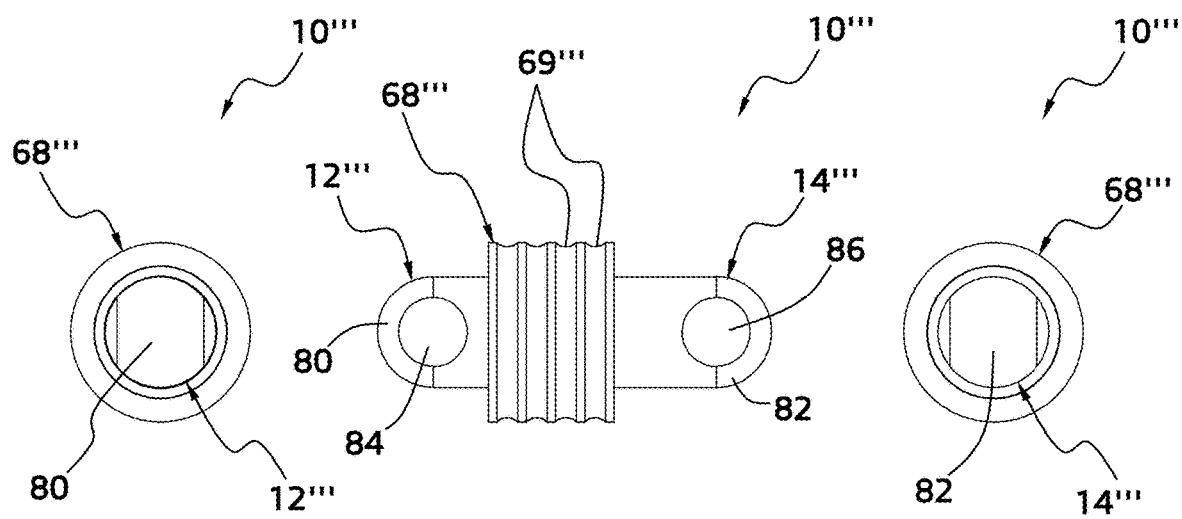
FIG. 42 is a side view of the quick connector shown in FIG. 38 in a locked position.
FIG. 43 is an end view of the quick connector shown in FIGS. 38 and 42 from a trailing end.
FIG. 44 is an end view of the quick connector shown in FIGS. 38 and 42 from a leading end.
Figures 45, 46, 47:
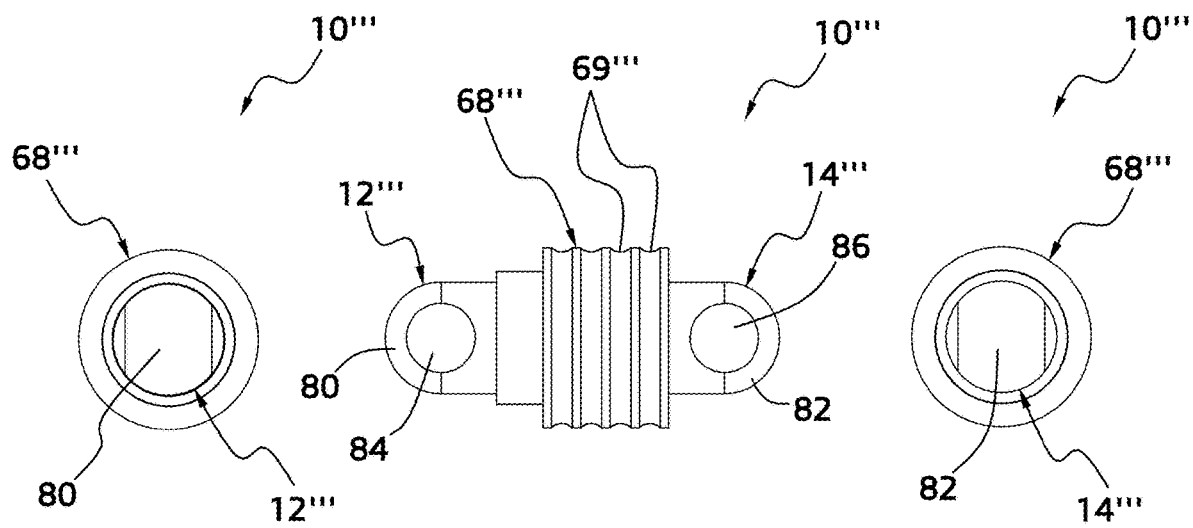
FIG. 45 is a side view of the quick connector shown in FIG. 38 in an unlocked position.
FIG. 46 is an end view of the quick connector shown in FIGS. 38 and 45 from a trailing end.
FIG. 47 is an end view of the quick connector shown in FIGS. 38 and 45 from a leading end.
Figure 48:
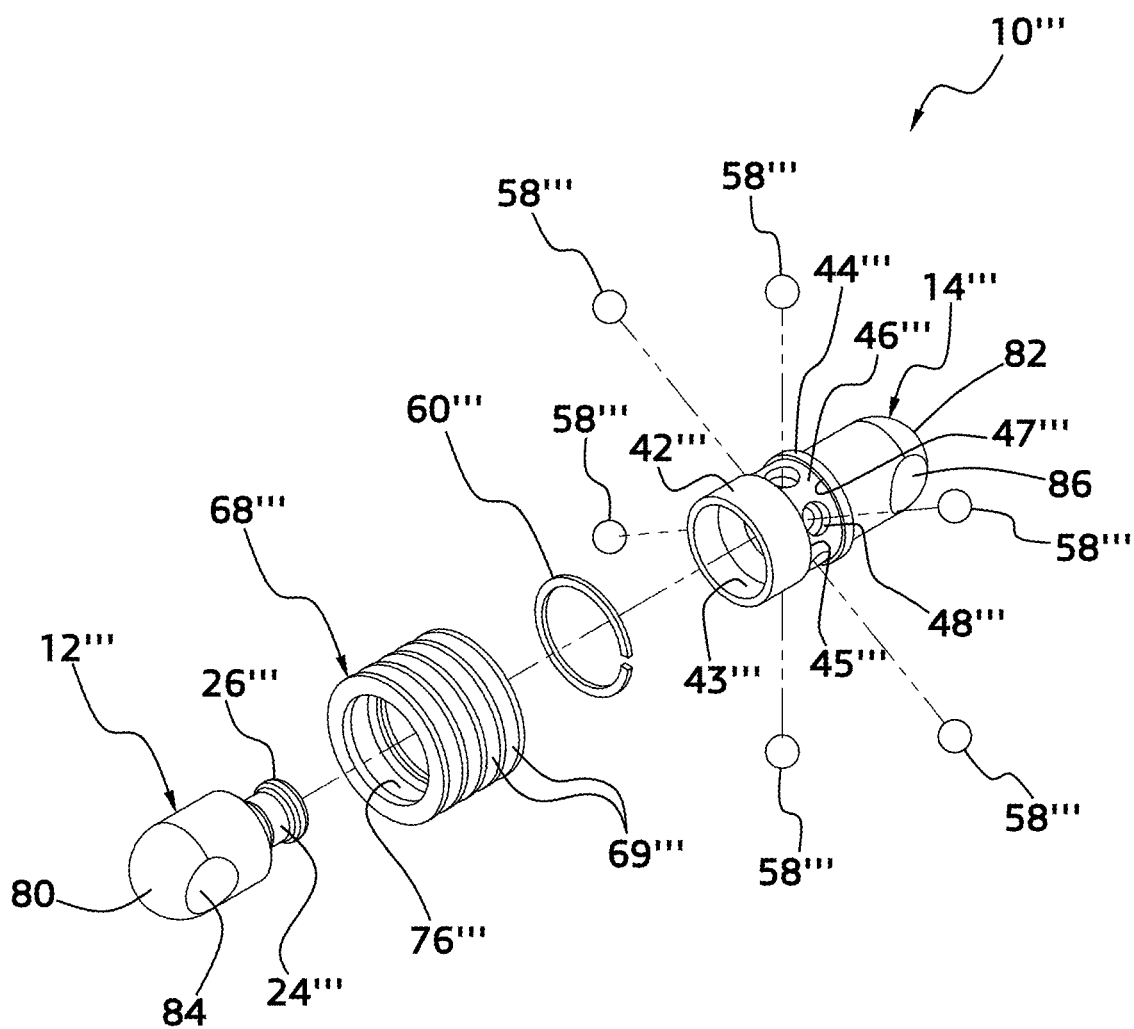
FIG. 48 is an exploded view of the quick connector shown in FIG. 38.
Figure 49:
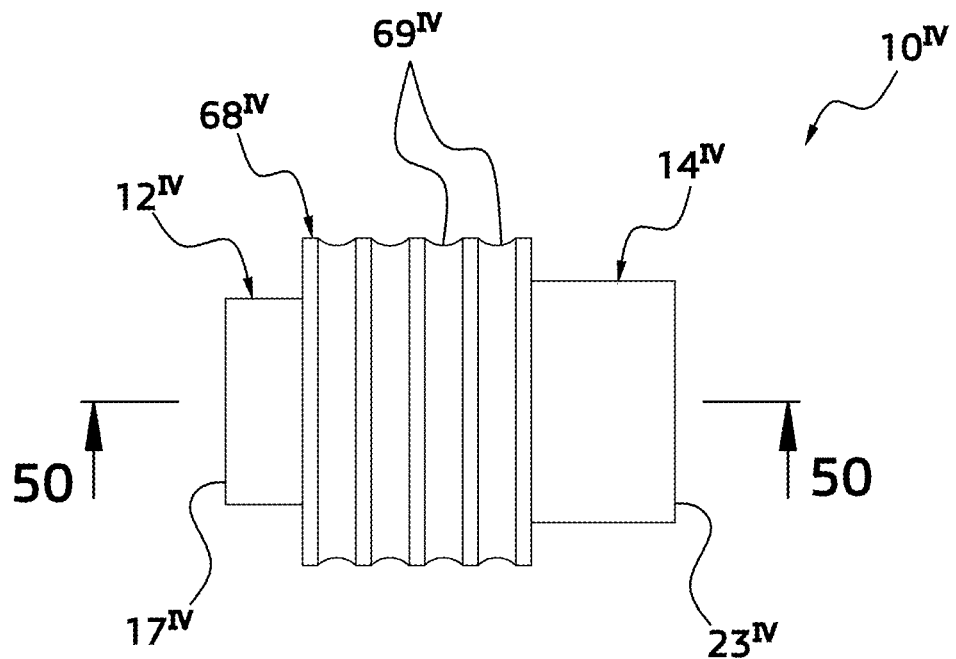
FIG. 49 is a side view of an assembled, locked quick connector according to yet further embodiment of the disclosure.
Figure 50:
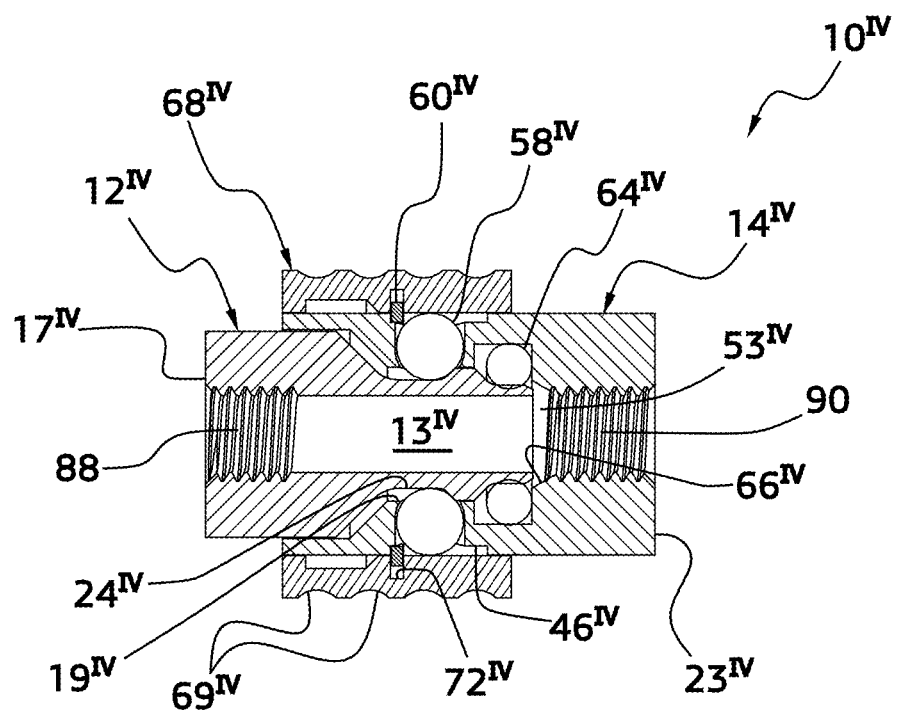
FIG. 50 is a side, sectional view of the quick connector shown in FIG. 49.
Figure 51:
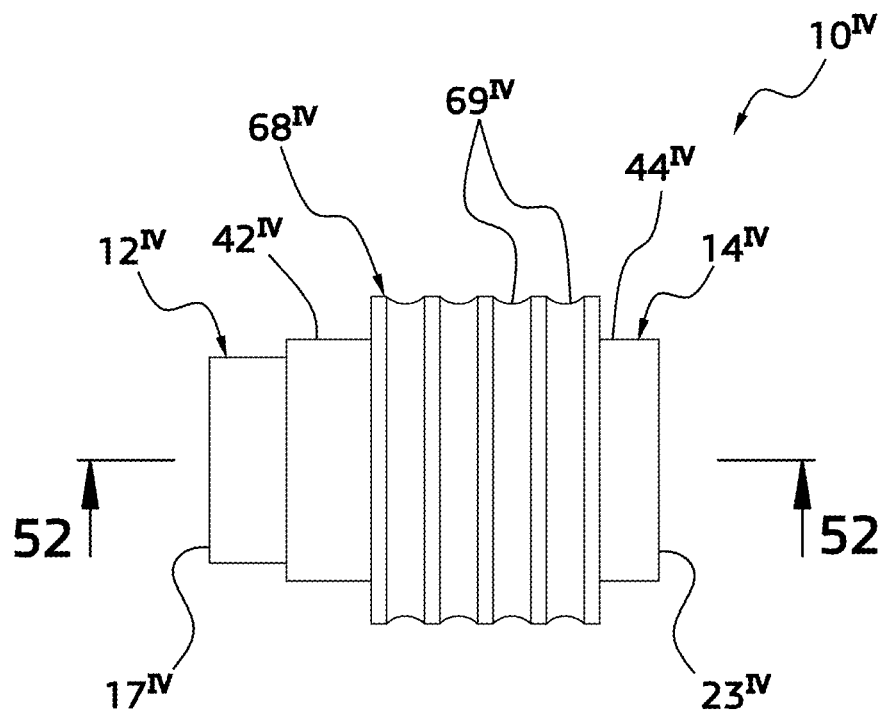
FIG. 51 is a side view of the quick connector shown in FIG. 49 in an unlocked condition.
Figure 52:
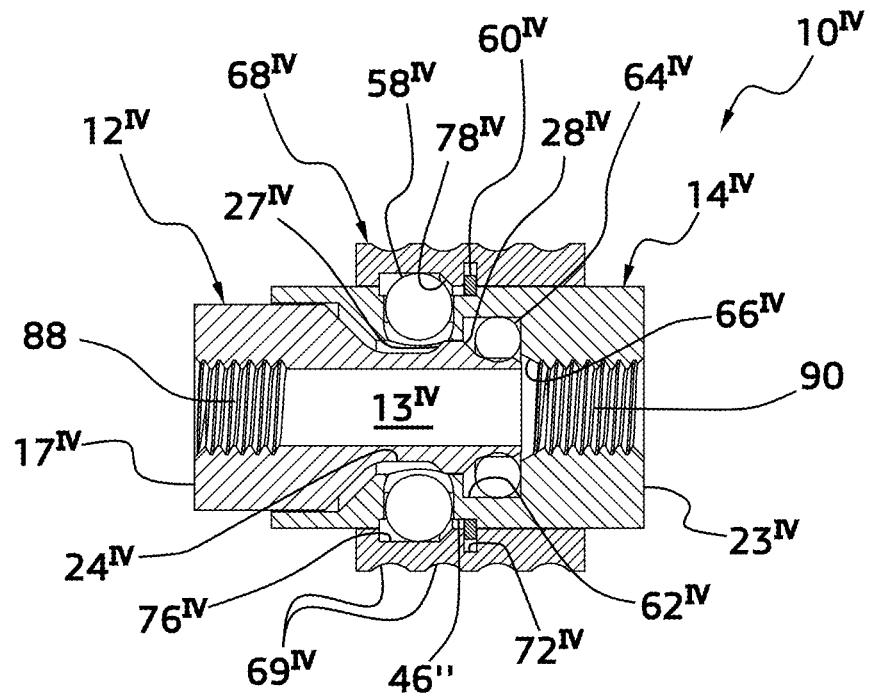
FIG. 52 is a side, sectional view of the quick connector shown in FIG. 49 in an unlocked condition.
Figures 53, 54, 55:
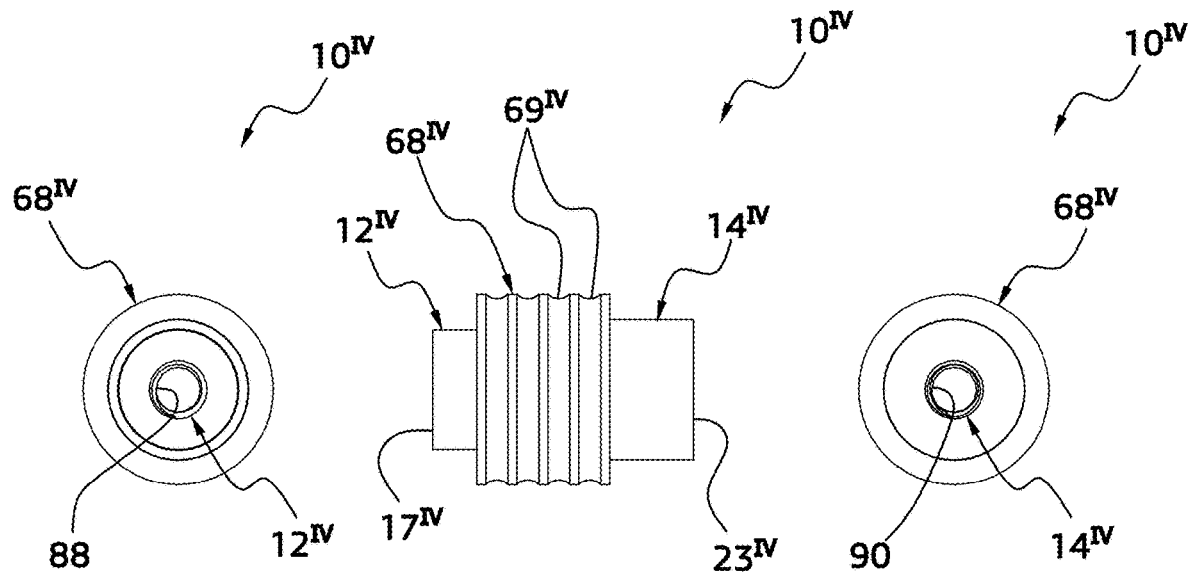
FIG. 53 is a side view of the quick connector shown in FIG. 49 in a locked position.
FIG. 54 is an end view of the quick connector shown in FIGS. 49 and 53 from a trailing end.
FIG. 55 is an end view of the quick connector shown in FIGS. 49 and 53 from a leading end.
Figures 56, 57, 58:
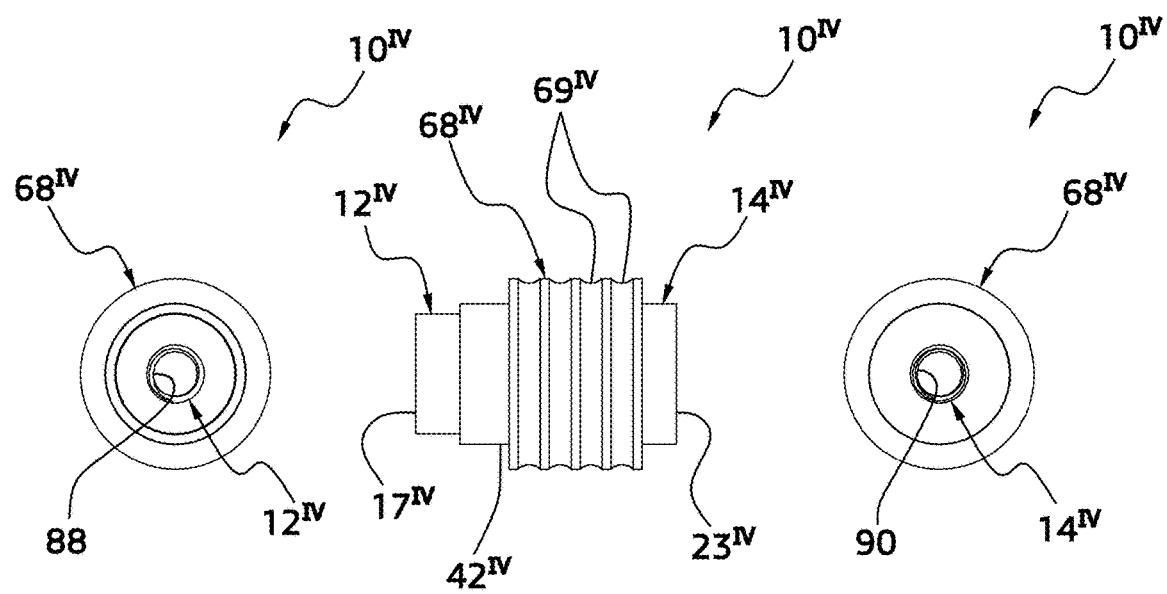
FIG. 56 is a side view of the quick connector shown in FIG. 49 in an unlocked position.
FIG. 57 is an end view of the quick connector shown in FIGS. 49 and 56 from a trailing end.
FIG. 58 is an end view of the quick connector shown in FIGS. 49 and 56 from a leading end.
Figure 59:
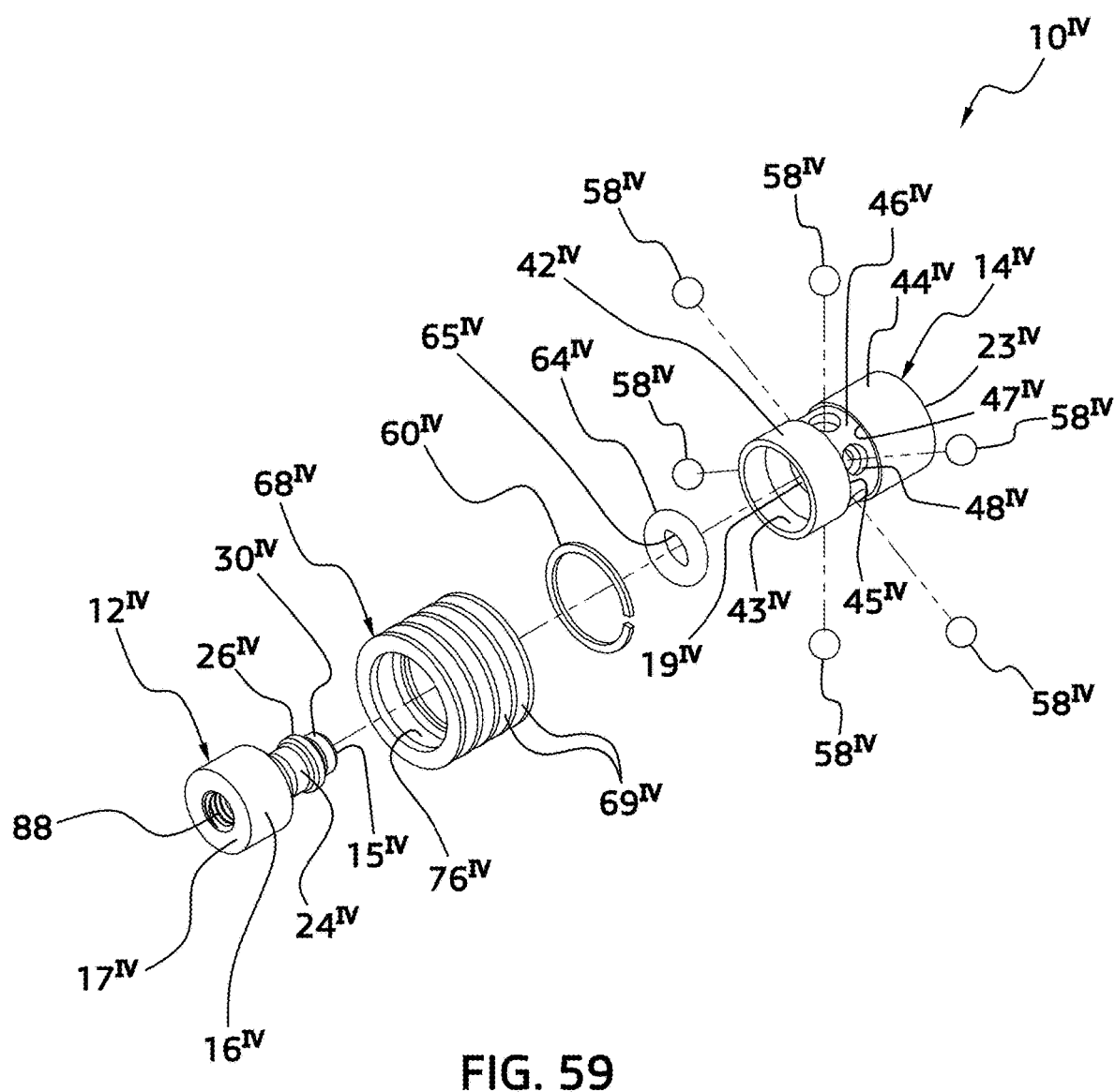
FIG. 59 is an exploded view of the quick connector shown in FIG. 49.

Also in this embodiment, female retaining coupler leading end 82 is a modification of female retaining coupler leading end 23' of female retaining coupler 14'. Female retaining coupler leading end 82 is formed with a hemispherical end and may be modular or formed as a continuous trailing end of female retaining coupler 14'''. Leading end 82 may have the same cross-sectional diameter as the body of female retaining coupler 14''' or may have a different cross-sectional diameter to match the cross-sectional diameter of male insertion member trailing end 80. In such a configuration, a shoulder will be formed between the main body of female retaining coupler 14''' and female retaining coupler leading end 82 as shown in FIG. 41. It should be understood that the shape of leading end 82 may conform to any regular or irregular geometric shape and remain within the scope of the disclosure. A female retaining coupler leading end through-bore 86 is formed in leading end 82 to permit the attachment of rings, strings or other elements to quick-connect coupler 10'''. Leading end through-bore 86 can be formed substantially orthogonal to the axial axis of female retaining coupler 14'''. The cross-sectional diameter of leading end through-bore 86 can be set accommodate a particular application such as a key chain. In similar fashion, the cross-sectional diameter of female retaining coupler leading end 82 may be dimensioned to be smaller than the cross-sectional diameter of female retaining coupler 12''' as shown in FIG. 37, or dimensioned to be larger than the cross-sectional diameter of female retaining coupler 14'''.

Referring to FIGS. 49-59, a quick-connect coupler, shown generally as 10$^{IV}$, includes in its most general aspect a male insertion member 12$^{IV}$ and a female retaining coupler 14$^{IV}$. Male insertion member 12$^{IV}$ defines a generally elongate cylindrical shape and has portions defining a male insertion member through-aperture 131$^{IV}$, as shown with particularity in FIG. 13. A trailing end of through-aperture 131$^{IV}$ is modified as disclosed in more detail herein. Male insertion member 12$^{IV}$ further includes a male member leading end 15$^{IV}$ and a male member trailing end 17$^{IV}$. A radially-extending annular seat flange 16$^{IV}$ includes a tapered or radiused leading edge 20$^{IV}$ and is positioned between the leading and trailing ends. Unlike seat flange 16 of quick-connect coupler 10, a back end of annular seat flange 16$^{IV}$ transitions to the main body of male insertion member 12$^{IV}$ that terminates at trailing end 17$^{IV}$ and shares the same cross-sectional diameter as the male insertion member main body.

Extending axially from seat flange 16$^{IV}$ and toward leading end 15$^{IV}$ is cylindrically-shaped, reduced-diameter male insertion member leading segment 24$^{IV}$ that has a smaller cross-sectional diameter than the cross-sectional diameter of the male insertion member main body. A secondary annular locking flange 26$^{IV}$ extends radially outwardly from leading segment 24$^{IV}$ between seat flange 16$^{IV}$ and leading end 15$^{IV}$. The cross-sectional diameter of secondary annular locking flange 26$^{IV}$, taken at its apex, is smaller than the cross-sectional diameter of seat flange 16$^{IV}$, also taken at its apex, and larger than the cross-sectional diameter of leading segment 24$^{IV}$.

A leading edge of locking flange 26$^{IV}$ has an annular taper or radius 28$^{IV}$ Slope 28$^{IV}$ may function as a secondary sealing surface as disclosed in more detail herein. A trailing side of locking flange 26$^{IV}$ may be formed with an annular taper or radius 27$^{IV}$ similar to, or the same as, radius 28$^{IV}$. If present, trailing taper 27$^{IV}$ functions as a registration surface for ball bearings, disclosed in more detail herein, to maintain the axial location of male insertion member 12$^{IV}$ within female retaining coupler 14$^{IV}$ also as disclosed in more detail herein. A proximal segment 30$^{IV}$ of male insertion member 12$^{IV}$ extends axially from locking flange 26$^{IV}$ to leading end 15$^{IV}$, is substantially cylindrical in shape, and has substantially the same or smaller cross-sectional diameter as leading segment 24$^{IV}$. Leading end 15$^{IV}$ may have an annular chamfer 32$^{IV}$ to facilitate insertion into female retaining coupler 14$^{IV}$.

In this embodiment, male insertion member aperture 131$^{IV}$ is modified by forming male insertion member internal threading 88 on the portions of male insertion member 12$^{IV}$ that form a distal or trailing end of aperture 131$^{IV}$. It should be understood that the threading also optionally may be formed on the outer surface of male insertion member 12$^{IV}$ (not shown), at its distal or trailing end and remain within the scope of the disclosure. The presence of internal threading 88 and/or external threading permits a tube, tube fitting or similar structure (not shown) having external or internal threading, respectively, corresponding to internal threading 88 or external threading to be joined to male insertion member 12$^{IV}$ such that any aperture or lumen internal to the tube or similar structure will be in fluid communication with male insertion member aperture 13$^{IV}$.

Female retaining coupler 14$^{IV}$ has a substantially cylindrical trailing end segment 42$^{IV}$ that has portions that define a first male-member retaining aperture 43$^{IV}$ A front or leading end of first male-member retaining aperture 43$^{IV}$ optionally may be formed with an annular radiused or tapered profile that transitions first male retaining aperture 43$^{IV}$ to a second male-member retaining aperture 19$^{IV}$ that has a smaller cross-sectional diameter than first male-member retaining aperture 43$^{IV}$.

Formed within the inner wall of female retaining coupler 14$^{iv}$ that defines second male-member retaining aperture 19$^{IV}$ are a plurality of ball-bearing seat apertures 48$^{IV}$. The cross-sectional diameter of ball-bearing seat apertures 48$^{IV}$ are set to be smaller than the cross-sectional diameter of ball-bearings 58$^{IV}$, described in more detail below, positioned in the ball-bearing seat apertures from an outside surface of female retaining member 14$^{IV}$. With this dimensional relationship, portions of the ball bearings, when seated in seat apertures $48^{IV}$, extend into the space defined by second male-member retaining aperture $19^{IV}$. The importance of this configuration is explained in detail below.

Female retaining coupler $14^{IV}$ has portions defining an annular sealing-ring channel $62^{IV}$ that extends radially outwardly from an inner surface of a leading segment $44^{IV}$. The cross-sectional diameter of sealing-ring channel $62^{IV}$ is set to be larger than the cross-sectional diameter of second male-member retaining aperture $19^{IV}$. This provides a space to insert a sealing ring $64^{IV}$, such as an O-ring, in such a manner that the annular walls that define sealing-ring channel $62^{IV}$ are spaced to receive the sealing ring and to prevent anything more than minimal lateral translation of sealing ring $64^{IV}$ relative to the axial axis of female retaining coupler $14^{IV}$. Once inserted into the sealing-ring channel, sealing ring $64^{IV}$ will remain in the aperture despite any insertion or retraction of male insertion member $12^{IV}$ into, or out of, female retaining coupler $14^{IV}$.

Sealing ring $64^{IV}$ has an inner opening $65^{IV}$ dimensioned to have a cross-sectional diameter smaller than the cross-sectional diameter of proximal segment $30^{IV}$. When male insertion member $12^{IV}$ is inserted into female retaining coupler $14^{IV}$, an inner sealing ring surface that defines inner opening $65^{IV}$ registers against the outer surface of proximal segment $30^{IV}$ to create a fluid-tight and/or air-tight seal between the sealing ring $64^{IV}$ and male insertion member $12^{IV}$. In coordination with the inner sealing ring surface, an outer sealing ring surface that defines the outer perimeter of sealing ring $64^{IV}$ registers against the outer annular surface of sealing-ring aperture $62^{IV}$ to provide a fluid-tight and/or air-tight seal between sealing ring $64^{IV}$ and female retaining coupler $14^{IV}$. The combination of the fluid-tight seal between male insertion member $12^{IV}$ and sealing ring $64^{IV}$ and the fluid-tight seal between female retaining coupler $14^{IV}$ and sealing ring $64^{IV}$ creates a fluid-tight seal between male insertion member $12^{IV}$ and female retaining coupler $14^{IV}$.

Female retaining coupler $14^{IV}$ has further portions that define an annular retaining ring travel-limiting channel $46^{IV}$ that extends radially inwardly from an outer surface of female retaining coupler $14^{IV}$. Retaining ring travel-limiting channel $46^{IV}$ is bordered by trailing end segment $42^{IV}$ and a leading end segment $44^{IV}$ that has the same cross-sectional diameter as trailing end segment $42^{IV}$. The junction of trailing end segment $42^{IV}$ and retaining ring travel-limiting channel $46^{IV}$ forms an annular trailing retaining ring travel-limiting channel shoulder $45^{IV}$. The junction of leading segment $44^{IV}$ and retaining ring travel-limiting channel $46^{IV}$ forms an annular leading retaining ring travel-limiting channel shoulder $47^{IV}$. The planes occupied by both shoulders $45^{IV}$ and $47^{IV}$ may be substantially orthogonal to an axial axis of quick-connect coupler $10^{IV}$, or may have a tapered or radiused profile. The former orthogonal configuration of the shoulders provides positive end-stops for the travel of a retraction sleeve disclosed in more detail below.

Leading segment $44^{IV}$ defines a female leading end aperture $53^{IV}$ formed with female retaining coupler internal threading 90 at a proximal or distal end of aperture $53^{IV}$. Female leading end aperture $53^{IV}$ is in fluid communication with sealing-ring channel $62^{IV}$, second male-member retaining aperture $19^{IV}$ and first male-member retaining aperture $43^{IV}$. Internal threading 90 permits the engagement of a tube or similar structure having threading formed on an exterior surface to engage with the threading of female coupler threaded aperture 90 to create a fluid-tight and/or air-tight seal between the tube and female retaining coupler $14^{IV}$.

Alternatively, external threading may be formed on an outer surface of leading segment $44^{IV}$ to receive a tube or similar structure having internal threading corresponding to the external threading of leading segment $44^{IV}$ to form a fluid-tight and/or air-tight seal.

A leading end of sealing-ring aperture $62^{IV}$ may be formed with a male-insertion-member receiving chamfer $66^{IV}$ that transitions the cross-sectional diameter of sealing-ring aperture $62^{IV}$ to the smaller cross-sectional diameter of female coupler threaded aperture 90. Male-insertion-member receiving chamfer $66^{IV}$ further functions as a registration surface or seat for male insertion member leading end $15^{IV}$. When male insertion member $12^{IV}$ is secured to female retaining coupler $14^{IV}$, female coupler threaded aperture 90 is in fluid communication with male insertion member through-aperture $131^{IV}$.

As previously described, ball-bearing seat apertures $48^{IV}$ are formed within the inner wall of female retaining coupler $14^{IV}$ that defines second male-member retaining aperture $19^{IV}$. The location of seat apertures $48^{IV}$ also are positioned within retaining ring travel-limiting channel $46^{IV}$ and are arranged in a circular pattern about retaining channel $46^{IV}$ in a substantially equally spaced arrangement to evenly disperse the forces imparted on male insertion member $12^{IV}$ and female retaining coupler $14^{IV}$ when connected. The location of ball-bearing seat apertures $48^{IV}$ may be biased toward trailing retaining ring travel-limiting channel shoulder $45^{IV}$ that represents the locked side of ball bearings $58^{IV}$, as explained in more detail herein. It should be understood that the spatial orientation of the ball-bearing seat apertures relative to trailing retaining ring travel-limiting channel shoulder $45^{IV}$ and leading retaining ring travel-limiting channel shoulder $47^{IV}$ may be varied including being situated equidistant from the shoulders and remain within the scope of the disclosure.

To maintain ball bearings $58^{IV}$ in ball-bearing seat apertures $48^{IV}$, a retraction sleeve $68^{IV}$ is superposed about female retaining coupler $14^{IV}$. Retraction sleeve $68^{IV}$ is substantially cylindrical in shape and dimensioned to have an inner wall diameter larger than the outer diameter of trailing end segment $42^{IV}$ and leading segment $44^{IV}$. As shown with particularity in FIG. 49, retraction sleeve $68^{IV}$ is formed with a series of annular undulating outer surface structures $69^{IV}$, which also may be knurled, that facilitate digital grasp of the retraction sleeve for axial movement along female retaining coupler $14^{IV}$. A trailing end of retraction sleeve $68^{IV}$ defines a retraction sleeve trailing end aperture $75^{IV}$ dimensioned to have a cross-sectional diameter to fit snuggly over the circumferences of trailing end segment $42^{IV}$ and leading end segment $44^{IV}$ without impeding the axial translation of the retraction sleeve relative to the female retaining coupler.

The length of retraction sleeve $68^{IV}$ can be the same as, longer than, or shorter than, the length of female retaining coupler $14^{IV}$. If made longer than the axial length of the body of female retaining coupler $14^{IV}$, i.e., the distance between trailing end $25^{IV}$ and female tube stop shoulder $49^{IV}$, when positioned in either a locked or unlocked position, a trailing end of retraction sleeve $68^{IV}$ may be coplanar with trailing end $25^{IV}$ or a leading end of retraction sleeve $68^{IV}$ will be coplanar with female tube stop shoulder $49^{IV}$. This provides a visual aid to let the user know in which position, locked or unlocked, the retraction sleeve is in. It also facilitates grasping the retraction sleeve as the end of the retraction sleeve that extends beyond the body of female retaining coupler $14^{IV}$ allows fingers to overhang the extended edge without contacting the female retaining coupler to facilitate axial movement of the retraction sleeve to the other extreme position. Once in the other position, the end that was pushed will now be coplanar with an end of the female retaining coupler and the other end of the retraction sleeve will overhang the other end of the female retaining coupler to again alert the user as to which position the retraction sleeve is in.

Formed adjacent to, and in fluid communication with, trailing end aperture $75^{IV}$ is a retraction sleeve ball-bearing expansion channel $76^{IV}$. Expansion channel $76^{IV}$ extends radially outwardly from an inner wall of retraction sleeve $68^{IV}$ and has a cross-sectional diameter greater than the cross-sectional diameter of retraction sleeve trailing end aperture $75^{IV}$. A retraction sleeve transition shoulder $81^{IV}$ formed by the junction of retraction sleeve trailing end aperture $75^{IV}$ and retraction sleeve ball-bearing expansion channel $76^{IV}$ functions to limit the axial travel of ball bearings $58^{IV}$ relative to female retaining coupler $14^{IV}$ The cross-sectional diameter of retraction sleeve ball-bearing expansion channel $76^{IV}$, when positioned radially above ball bearings $58^{IV}$, permits the ball bearings to move radially outwardly from ball-bearing seat apertures $48^{IV}$ so as to move out of second male-member receiving aperture $19^{IV}$. This permits the male insertion member $12^{IV}$ to be fully inserted into female retaining coupler $14^{IV}$ with secondary annular locking flange $26^{IV}$ being able to move axially past the ant-apex point of the ball bearings into the fully-seated, locking position.

A leading end of retraction sleeve ball-bearing expansion channel $76^{IV}$ is formed with a slope or chamfer $78^{IV}$ that facilitates axial movement of retraction sleeve $68^{IV}$ over ball bearings $58^{IV}$ from an unlocked position to a locked position. Chamfer $78^{IV}$ transitions expansion channel $76^{IV}$ to a main retraction sleeve aperture $77^{IV}$ defined by retraction sleeve inner wall $74^{IV}$. Main retraction sleeve aperture $77^{IV}$ has substantially the same cross-sectional diameter as retraction sleeve trailing end aperture $75^{IV}$. The retraction sleeve material that forms chamfer $78^{IV}$ also functions as part of a retaining-ring retention wall as explained in more detail below.

Extending radially outwardly from retraction sleeve inner wall $74^{IV}$ is an annular retaining-ring slot $72^{IV}$. Retaining-ring slot $72^{IV}$ is positioned proximal to the leading end of chamfer $78^{IV}$ and extends radially outwardly beyond the leading end of chamfer $78^{IV}$. The width and diameter of retaining-ring slot $72^{IV}$ is set to receive a retaining ring $60^{IV}$ so as to limit the axial or lateral displacement of the retaining ring within retraction sleeve $68^{IV}$ and to permit the retaining ring to expand radially outwardly in the slot. In a relaxed positioned, the outer diameter of retaining ring $60^{IV}$ will be smaller than the diameter of retaining-ring slot $72^{IV}$ and larger than the cross-sectional diameter of main retraction sleeve aperture $77^{IV}$. The thickness of retaining ring $60^{IV}$ is set such that retaining ring $60^{IV}$ will at least loosely register against annular retaining-ring walls, a trailing retaining-ring wall $71^{IV}$ and a leading retaining-ring wall $73^{IV}$ defining slot $72^{IV}$.

The retaining-ring walls function as retaining-ring lateral restriction surfaces to maintain retaining ring $60^{IV}$ in a substantially stable lateral orientation relative to retraction sleeve $68^{IV}$ regardless whether retaining ring $60^{IV}$ is in either a relaxed or radially expanded state. The looseness of the registration of retaining ring $60^{IV}$ with the retaining-ring walls is to ensure the retaining ring can freely expand radially and retract radially without the walls forming any type of restriction or impediment to these retaining-ring functions.

Retaining ring $60^{IV}$ is a thin, substantially circular or spiral metallic or polymer ring that has certain resiliency and deflection characteristics such as high tensile strength and fatigue resistance. Retaining ring $60^{IV}$ is a discontinuous ring (circular or spiral) as there is a break in the ring that permits the ring to be flexed and placed over a cylindrical body such as female retaining coupler $14^{IV}$. The retaining ring may have an inner diameter substantially the same as the cross-sectional diameter of retaining ring travel-limiting channel $46^{IV}$. The inner diameter may also be larger so as not to create any radial expansion or may have a smaller diameter to be under constant radial stress when placed over retaining ring travel-limiting channel $46^{IV}$. If the inner diameter of retaining ring $60^{IV}$ is set to be in constant registration with retaining channel $46^{IV}$ without any radial stress imparted by registration against retaining channel $46^{IV}$, the function of the retraction sleeve/retaining ring/retaining channel combination can be optimized for purposes of reliability and durability.

Trailing retaining ring travel-limiting channel shoulder $45^{IV}$ and leading retaining ring travel-limiting channel shoulder $47^{IV}$ that define the lateral borders of retaining channel $46^{IV}$, further function as lateral axial stops for retaining ring $60^{IV}$. By fixing the lateral orientation of retaining ring $60^{IV}$ to retraction sleeve $68^{IV}$, movement of the retraction sleeve will result in a corresponding lateral movement of retaining ring $60^{IV}$ relative to female retaining coupler $14^{IV}$. Because quick-connect coupler $10^{IV}$ is constructed without an axial compression spring, the relative lateral position of retraction sleeve $68^{IV}$ to female coupler $14^{IV}$ can be set to one of two positions.

In a first, unlocked position, retraction sleeve $68^{IV}$ is positioned such that retaining ring $60^{IV}$ is positioned adjacent to and/or registered against, leading retaining ring travel-limiting channel shoulder $47^{IV}$. In this position, retaining ring $60^{IV}$ will be in a relaxed, unstrained condition. Retraction sleeve ball-bearing expansion channel $76^{IV}$ will be positioned about, and in the same plane occupied by, ball bearings $58^{IV}$. With ball bearings $58^{IV}$ aligned with expansion channel $76^{IV}$, the ball bearings will be free to migrate radially out of ball-bearing seat apertures $48^{IV}$. This will further enable male insertion member $12^{IV}$ to be freely inserted into, or retracted from, the internal apertures of female retaining coupler $14^{IV}$.

Operationally, with retraction sleeve $68^{IV}$ in the first, unlocked position, male insertion member $12^{IV}$ can be inserted into female retaining coupler $14^{IV}$ until chamfer $32^{IV}$ of leading end $15^{IV}$ registers against male-insertion-member receiving chamfer $66^{IV}$ and/or tapered or radiused leading edge $20^{IV}$ registers against trailing retaining ring travel-limiting channel shoulder $45^{IV}$ to seat the male insertion member to the female retaining coupler. As male insertion member $12^{IV}$ is inserted into female retaining coupler $14^{IV}$, proximal segment $30^{IV}$ of male insertion member $12^{IV}$ slides within sealing ring $64^{IV}$ to create a seal. Also, when male insertion member $12^{IV}$ is fully seated inside female retaining coupler $14^{IV}$, ball bearings $58^{IV}$ will reseat in ball-bearing seat apertures $48^{IV}$ depending upon gravitational effects on the ball bearings. Those vertically above the male insertion member will drop and register against leading segment $24^{IV}$ of male insertion member $12^{IV}$. Those below will remain registered against the surface of retraction sleeve ball-bearing expansion channel $76^{IV}$.

To lock male insertion member $12^{IV}$ to female retaining coupler $14^{IV}$, retraction sleeve $68^{IV}$ is urged toward trailing end $25^{IV}$ of the female retaining coupler. As the retraction sleeve is advanced toward the trailing end, chamfer $78^{IV}$ will register against ball bearings $58^{IV}$ and urge the ball bearings into a fully seated position in ball-bearing seat apertures $48^{IV}$. The chamfered surface facilitates the movement of the ball bearings radially inwardly as the lateral movement of retraction sleeve $68^{IV}$ advances. In this position, ball bearings $58^{IV}$ will essentially be positioned registered against, or adjacent to, leading segment $24^{IV}$ and positioned between seat flange $16^{IV}$ and secondary annular locking flange $26^{IV}$. The combination of the flanges and the force applied to the ball bearings by chamfer $78^{IV}$ wedges the ball bearings between the flanges to lock the lateral orientation of male insertion member $12^{IV}$ to female retaining coupler $14^{IV}$. This combination of features creates a mechanical restriction to keep male insertion member $12^{IV}$ fully seated inside female retaining coupler $14^{IV}$ so that sealing ring $64^{IV}$ remains registered against proximal segment $30^{IV}$ to create the fluid-tight and/or air-tight seal between male insertion member $12^{IV}$ and female retaining coupler $14^{IV}$.

To maintain the locked condition of the components, retraction sleeve $68^{IV}$ is advanced further toward female coupler trailing end $25^{IV}$ so that retaining ring $60^{IV}$ registers against the radiused surfaces of ball bearings $58^{IV}$. The lateral force applied to the retraction sleeve causes retaining ring $60^{IV}$ to radially expand in slot $72^{IV}$ to pass over the apexes of ball bearings $58^{IV}$. As retaining ring $60^{IV}$ passes the ball-bearing apexes, the retaining ring follows the radiused contours of the ball bearings down to its relaxed dimensional state. At this point, retaining ring $60^{IV}$ is located between trailing retaining ring travel-limiting channel shoulder $45^{IV}$ and ball bearings $58^{IV}$. This is the second position of retraction sleeve $68^{IV}$. In this position, the apexes of ball bearings $58^{IV}$ are now registered against retraction sleeve inner wall $74^{IV}$ that urges the ball bearings into a fully seated position in ball-bearing seat apertures $48^{IV}$. In this orientation, ball bearings $58^{IV}$ create a mechanical restriction between male insertion member $12^{IV}$ and female retaining coupler $14^{IV}$ to maintain the two components in a locked configuration.

To unlock quick-connect coupler $10^{IV}$, retraction sleeve $68^{IV}$ is urged laterally toward female coupler leading end $23^{IV}$ to essentially reverse the locking process. Because a compression spring is not used to set the lateral resting position of the retraction sleeve, a positive lateral force has to be applied to retraction sleeve $68^{IV}$ to force registration of the leading surface of retaining ring $60^{IV}$ against the trailing radiused surfaces of ball bearings $58^{IV}$. As the retraction sleeve is advanced further toward female coupler leading end $23^{IV}$, retaining ring $60^{IV}$ is forced to expand radially outwardly within slot $72^{IV}$ over the ball bearing surfaces. After passing the apexes of the ball bearings, retaining ring $60^{IV}$ will follow the leading radiused surfaces of ball bearings $58^{IV}$ back to an unexpanded relaxed condition between the ball bearings and leading retaining ring travel-limiting channel shoulder $47^{IV}$. In this position, retraction sleeve ball-bearing expansion channel $76^{IV}$ will now again be positioned in alignment with the plane occupied by ball bearings $58^{IV}$ that permits the ball bearings to move radially outwardly away from ball-bearing seat apertures $48^{IV}$. Male insertion member $12^{IV}$ can now be freely removed from within female retaining coupler $14^{IV}$.

It should be understood that the trailing end of the male insertion member embodiments disclosed herein can be modified with any of the trailing end surfaces disclosed herein including barbed, internal (or external) threading ring-receiving aperture and the like, and including any other means for attaching a tube or other object known in the art, and remain within the scope of the disclosure. Likewise, the leading end of the female retaining coupler embodiments disclosed herein can be modified with any of the leading end surfaces disclosed herein including barbed, internal (or external threading) ring-receiving aperture and the like and remain within the scope of the disclosure. Moreover, the different outer surface shapes of the female retaining couplers and corresponding retraction sleeve combinations disclosed herein may be substituted from one embodiment to another and remain within the scope of the disclosure. It further should be understood that the quick-connect couplers disclosed herein may be combined with shut-off valves at either or both the leading ends and the trailing ends, as is well known in the art, and remain within the scope of the disclosure.

The materials used to construct the quick-connector coupler embodiments disclosed herein can be any engineering grade of polymers that can withstand the axial, radial and torsional forces that may be applied to the couplers, depending upon the application(s) made of the couplers. Metals, such as brass and/or steel also may be used to construct the various components of the couplers. It should be understood that any materials commonly used to construct quick-connect couplers as known in the art may be used to make any of the coupler embodiments disclosed herein and remain within the scope of the disclosure.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications and usages that come within the true spirit and scope of the disclosure.

What I claim as new and desire to secure by United States Letters Patent is:

1. A quick-connect coupler comprising:
   a female retaining coupler having a cylindrically-shaped trailing end segment, a cylindrically-shaped leading end segment and a cylindrical retaining ring travel-limiting channel positioned between the trailing end segment and the leading end segment, wherein a junction between the trailing end segment and the retaining ring travel-limiting channel forms an annular trailing retaining ring travel-limiting channel shoulder, wherein a junction between the leading end segment and the retaining ring travel-limiting channel forms an annular leading retaining ring travel-limiting channel shoulder, wherein a plurality of spaced ball-bearing seat apertures are formed in the retaining ring travel-limiting channel; wherein the trailing end segment forms a first male-member retaining aperture, wherein a portion of the female retaining coupler defining the retaining ring travel-limiting channel forms a second male-member retaining aperture, wherein the leading end segment forms a sealing ring aperture, and wherein the first male-member retaining aperture, the second male-member retaining aperture and the sealing ring aperture are in fluid communication;
   a male insertion member having portions defining a male insertion member through aperture, a male member leading end and a male member trailing end, wherein the male insertion member is dimensioned to be inserted into the female retaining coupler;
   a plurality of ball bearings, wherein each of the ball bearings is seated in one of the plurality of ball-bearing seat apertures;

a retraction sleeve having an annular retaining-ring receiving slot or groove, wherein the retraction sleeve is superposed about the female retaining member; and,
a retaining ring secured in the retaining-ring receiving slot or groove, wherein the retaining ring resisters against the trailing retaining ring travel-limiting channel shoulder when the retraction sleeve is in a locked side or position of the plurality of ball bearings, and wherein the retaining ring resisters against the leading retaining ring travel-limiting channel shoulder in an unlocked side or position of the plurality of ball bearings.

2. The quick-connect coupler of claim 1 wherein the female coupler further comprises an annular radiused or tapered retaining aperture slope formed on a front or leading end of the first male-member retaining aperture, wherein the first male-member retaining aperture has a larger cross-sectional diameter than a cross-sectional diameter of the second male-member retaining aperture, and wherein the radiused or tapered retaining aperture slope transitions the larger diameter first male-member retaining aperture to the smaller diameter second male-member retaining aperture.

3. The quick-connect coupler of claim 2 wherein the female retaining coupler further comprises a female intermediate segment extending axially from a leading end of the leading end segment, a radially extending barb formed at a leading end of the female intermediate segment, and a female leading segment extending axially from the barb, wherein the female intermediate segment and the female leading segment define a female leading end aperture, wherein the female leading end aperture is in fluid communication with the sealing-ring aperture, the second male-member retaining aperture and first male-member retaining aperture.

4. The quick-connect coupler of claim 3 further comprising a sealing ring secured in the sealing ring aperture of the female retaining coupler.

5. The quick-connect coupler of claim 4 wherein the retraction sleeve has portions defining an expansion channel having a cross-sectional diameter larger than a cross-sectional diameter of the trailing end segment of the female retaining coupler, and further defining a retraction sleeve leading end aperture having a cross-sectional diameter larger than a cross-sectional diameter of the leading end segment of the female retaining coupler, wherein the expansion channel cross-sectional diameter is larger than the cross-sectional diameter of the retraction sleeve leading end aperture, and wherein the expansion channel and the retraction sleeve leading end aperture are in fluid communication.

6. The quick-connect coupler of claim 5 wherein a leading end of the expansion channel is formed with an annular expansion channel slope or chamfer that transitions the larger cross-sectional diameter of the expansion channel to the smaller cross-sectional diameter of the retraction sleeve trailing end aperture.

7. The quick-connect coupler of claim 6 wherein a top surface of the retraction sleeve further comprises a plurality of undulating outer surface structures.

8. The quick-connect coupler of claim 7 wherein the male insertion member comprises a radially-extending annular seat flange having an apex and having a tapered or radiused leading end, wherein the seat flange is positioned between the leading end and the trailing end of the male insertion member, and wherein the male insertion member further comprises a radially-extending secondary annular locking flange having an apex, wherein the secondary annular locking flange extends radially outwardly from the male insertion member between the seat flange and the male insertion member leading end, and wherein a cross-sectional diameter of the seat flange taken at an its apex of the seat flange is larger than a cross-sectional diameter of the secondary annular locking flange taken at an apex of the secondary annular locking flange.

9. The quick-connect coupler of claim 8 wherein the male insertion member further comprises a male insertion member leading segment positioned between the seat flange and the secondary annular locking flange, and wherein the male insertion member further comprises a proximal male insertion member segment that extends axially from the secondary annular locking flange toward the male insertion member leading end.

10. The quick-connect coupler of claim 9 wherein the male insertion member further comprises a cylindrically-shaped intermediate male-member segment, an annular barb extending radially outwardly from a distal or trailing end of intermediate male-member segment, and a cylindrically-shaped male insertion member trailing-end segment that extends axially from a trailing end of the barb.

11. A quick-connect coupler comprising:
a female retaining coupler having a cylindrically-shaped body having a female coupler leading end and a female coupler trailing end with a retaining ring travel-limiting channel formed on an outer surface of the female retaining coupler, wherein a junction between the female coupler trailing end and the retaining ring travel-limiting channel forms an annular trailing retaining ring travel-limiting channel shoulder, wherein a junction between the female coupler leading end and the retaining ring travel-limiting channel forms an annular leading retaining ring travel-limiting channel shoulder, wherein the female retaining coupler defines a male-member receiving bore that extends at least partially though the female retaining coupler, and wherein a plurality of spaced ball-bearing seat apertures are formed in the retaining ring travel-limiting channel and extend into the male-member receiving bore;
a male insertion member having a male member leading end, a male member trailing end and a male member ball-bearing receiving channel formed on an outer surface of the male insertion member proximal to the male member leading end, wherein the male insertion member is dimensioned to be inserted into the female retaining coupler male-member receiving bore;
a plurality of ball bearings, wherein each of the ball bearings is seated in one of the plurality of ball-bearing seat apertures;
a retraction sleeve having an annular retaining-ring receiving slot or groove, wherein the retraction sleeve is superposed about the female retaining member; and,
a retaining ring secured in the retaining-ring receiving slot or groove, wherein the retaining ring registers against the trailing retaining ring travel-limiting channel shoulder when the retraction sleeve is in a locked side or position of the plurality of ball bearings, and wherein the retaining ring registers against the leading retaining ring travel-limiting channel shoulder in an unlocked side or position of the plurality of ball bearings.

12. The quick-connect coupler of claim 11 wherein the retraction sleeve has portions defining a ball-bearing expansion channel having a cross-sectional diameter larger than a cross-sectional diameter of the female coupler trailing end, and further defining a retraction sleeve trailing end aperture having a cross-sectional diameter larger than a cross-sectional diameter of the female coupler leading end, wherein the ball-bearing expansion channel cross-sectional diameter is larger than the cross-sectional diameter of the retraction sleeve trailing end aperture, and wherein the ball-bearing expansion channel and the retraction sleeve trailing end aperture are in fluid communication.

13. The quick-connect coupler of claim 12 wherein a leading end of the ball-bearing expansion channel is formed with an annular expansion channel slope or chamfer that transitions the larger cross-sectional diameter of the ball-bearing expansion channel to the smaller cross-sectional diameter of the retraction sleeve trailing end aperture.

14. The quick-connect coupler of claim 13 wherein a top surface of the retraction sleeve further comprises a plurality of undulating and/or knurled outer surface structures.

15. The quick-connect coupler of claim 11 wherein the male member trailing end is formed with a hemispherical end and may be modular or formed as a continuous trailing end of the male insertion member, wherein a male insertion member trailing end through-bore is formed in the male member trailing end.

16. The quick-connect coupler of claim 15 wherein the female coupler leading end is formed with a hemispherical end and may be modular or formed as a continuous leading end of the female retaining coupler, wherein a female retaining coupler trailing end through-bore is formed in the female coupler leading end.

17. A quick-connect coupler comprising:
a female retaining coupler having a stepped cylindrically-shaped body having an annular trailing end segment and an annular leading end segment, wherein the trailing end segment has a cross-sectional diameter larger than a cross-sectional diameter of the leading end segment, the female retaining coupler further comprising an annular retaining ring travel-limiting channel formed on an outer surface of the female retaining coupler between the trailing end segment and the leading end segment, wherein the retaining ring travel-limiting channel has a cross-sectional diameter smaller than the cross-sectional diameter of the leading end segment, wherein a junction between the trailing end segment and the retaining ring travel-limiting channel is formed as an annular sloped or chamfered surface that transitions the larger-diameter trailing end segment to the smaller cross-sectional diameter retaining ring travel-limiting channel, wherein a leading end of the chamfered surface forms an annular trailing retaining ring travel-limiting channel shoulder, wherein a junction of the leading end segment and the retaining ring travel-limiting channel forms an annular leading retaining ring travel-limiting channel shoulder, wherein the female retaining coupler defines a male-member receiving bore that extends at least partially though the female retaining coupler, and wherein a plurality of spaced ball-bearing seat apertures are formed in the retaining ring travel-limiting channel and extend into the male-member receiving bore;

a male insertion member having a male member leading end, a male member trailing end and a male member ball-bearing receiving channel formed on an outer surface of the male insertion member proximal to the male member leading end, wherein the male insertion member is dimensioned to be inserted into the male-member receiving bore;

a plurality of ball bearings, wherein each of the ball bearings is seated in one of the plurality of ball-bearing seat apertures;

a retraction sleeve having a cylindrically-shaped outer wall and a stepped inner wall having an annular retraction sleeve trailing end aperture dimensioned with a cross-sectional diameter to fit snuggly over the circumference of the female coupler trailing end segment and an annular retraction sleeve leading end aperture dimensioned with a cross-sectional diameter to fit snuggly over the circumference of the leading end segment, wherein a retraction sleeve chamfer is formed between the trailing end aperture and the leading end aperture to transition the larger cross-sectional diameter of the trailing end aperture to the smaller cross-sectional diameter of the leading end aperture, wherein the retraction sleeve further comprises an annular retaining-ring receiving slot or groove, wherein the retraction sleeve is superposed about the female retaining coupler; and, a retaining ring secured in the retaining-ring receiving slot or groove.

18. The quick-connect connector of claim 17 wherein a top surface of the retraction sleeve further comprises a plurality of undulating outer surface structures.

19. The quick-connect coupler of claim 17 wherein the male member trailing end is formed with a shape selected from the group consisting of a hemispherical end with a male member trailing end through-bore formed therein, a barbed end, an internally threaded end, an externally threaded end and combinations thereof.

20. The quick-connect coupler of claim 17 wherein the female coupler leading end is formed with a shape selected from the group consisting of a hemispherical end with a female member leading end through-bore formed therein, a barbed end, an internally threaded end, an externally threaded end and combinations thereof.

* * * * *